(12) United States Patent
Kageyama et al.

(10) Patent No.: US 8,089,557 B2
(45) Date of Patent: Jan. 3, 2012

(54) VIDEO SIGNAL PROCESSING APPARATUS, VIDEO SIGNAL PROCESSING METHOD AND VIDEO DISPLAY APPARATUS

(75) Inventors: Masahiro Kageyama, Hino (JP); Koichi Hamada, Yokohama (JP); Kenichi Yoneji, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 729 days.

(21) Appl. No.: 12/244,826

(22) Filed: Oct. 3, 2008

(65) Prior Publication Data

US 2009/0091653 A1    Apr. 9, 2009

(30) Foreign Application Priority Data

Oct. 4, 2007   (JP) ................... 2007-260485
Oct. 4, 2007   (JP) ................... 2007-260488

(51) Int. Cl.
*H04N 7/01*    (2006.01)
*H04N 11/20*   (2006.01)

(52) U.S. Cl. ........ 348/458; 348/441; 348/448; 348/452; 348/739; 382/298; 382/299; 382/300; 345/698

(58) Field of Classification Search ................... 348/458, 348/441, 448, 452, 739; 382/298, 299, 300; 345/698
See application file for complete search history.

(56) References Cited

U.S. PATENT DOCUMENTS

| 6,023,535 | A |  | 2/2000 | Aoki |  |
| 6,507,859 | B1 |  | 1/2003 | Omori et al. |  |
| 2003/0052996 | A1 | * | 3/2003 | Thompson et al. | 348/448 |
| 2005/0219269 | A1 | * | 10/2005 | Sakashita | 345/685 |

FOREIGN PATENT DOCUMENTS

| JP | 07-245592 | 9/1995 |
| JP | 08-336046 | 12/1996 |
| JP | 09-069755 | 3/1997 |
| JP | 2000-216682 | 8/2000 |

OTHER PUBLICATIONS

S. Aoki, "Super Resolution Processing by Plural Number of Lower Resolution Images", Ricoh Technical Report pp. 19-15, No. 24, Nov. 1998.
S. Ando, "A Velocity Vector Field Measurement System Based on Spatio-Temporal Image Derivative", pp. 1330-1336, vol. 22, No. 12, 1986.
Kobayashi et al., "Calculation Methods of a Phase-Only Correlation Function for Images based on Discrete Cosine Transform", IEICE Technical Report, pp. 73-78, ITS2005-92, IE2005-299, Feb. 2006.

* cited by examiner

*Primary Examiner* — Jefferey Harold
*Assistant Examiner* — Mustafizur Rahman
(74) *Attorney, Agent, or Firm* — Antonelli, Terry, Stout & Kraus, LLP.

(57) ABSTRACT

A video signal processing apparatus, for achieving high resolution, with using a small number of frames, as an input videos signal, comprises: an input unit, into which a video frame is inputted; and a resolution converter unit for obtaining an output video frame by increasing a number of pixels building up the input video frame, wherein the resolution converter unit has a same-brightness direction estimation unit, which is configured to produce a sampling phase difference for each video data, by estimating a same-brightness direction for each video data on the input video frame, and the resolution converter unit conducts a high resolution process of video with using the sampling phase difference, which is produced by the same-brightness direction estimation unit.

12 Claims, 55 Drawing Sheets

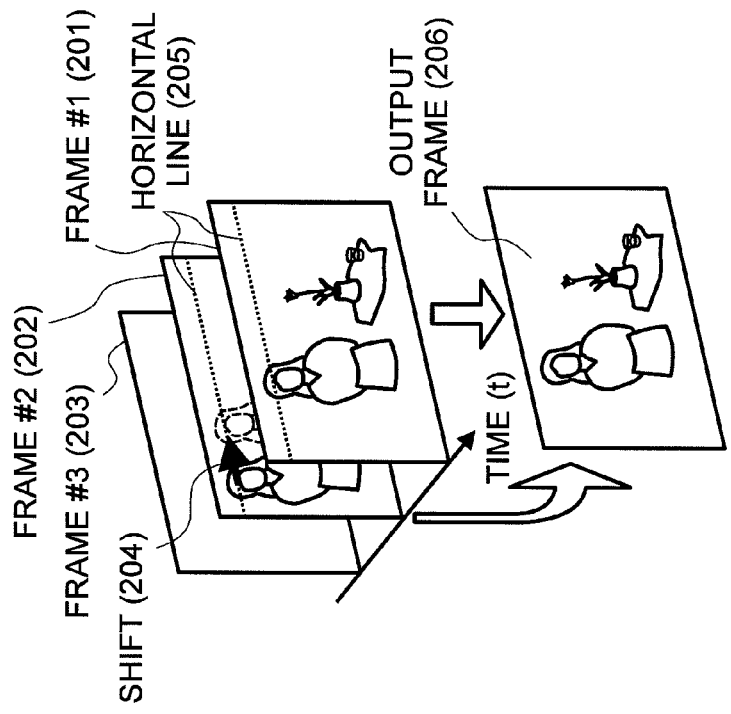

PHASE RELATIONSHIP OF EACH COMPONENT

PHASE RELATIONSHIP OF ORIGINAL COMPONENTS

PHASE RELATIONSHIP OF ALIASING COMPONENTS

PHASE RELATIONSHIP OF EACH COMPONENT

PHASE RELATIONSHIP OF ORIGINAL COMPONENTS

PHASE RELATIONSHIP OF ALIASING COMPONENTS

"FREQUENCY-GAIN" CHARACTERISTIC

"FREQUENCY-GAIN" CHARACTERISTIC

"FREQUENCY-PHASE DIFFERENCE" CHARACTERISTIC

TAP COEFFICIENT C

FIG.9A (1) SUM OF ORIGINAL COMPONENTS ON Re AXIS=1
(2) SUM OF ORIGINAL COMPONENTS ON Im AXIS=0
(3) SUM OF ALIASING COMPONENTS ON Re AXIS=0
(4) SUM OF ALIASING COMPONENTS ON Im AXIS=0

FIG.9B (1) $C0+C2=1$
(2) $C1+C3=0$
(3) $C0+C2 \cdot \cos\theta - C3 \cdot \sin\theta = 0$
(4) $C1+C2 \cdot \sin\theta + C3 \cdot \cos\theta = 0$

FIG.9C $C0=1/2$
$C1=-(1+\cos\theta)/(2\sin\theta)$
$C2=1/2$
$C3=(1+\cos\theta)/(2\sin\theta)$

FIG.9D

| $\theta$ | C0 | C1 | C2 | C3 |
|---|---|---|---|---|
| 0 | 0.5 | — | 0.5 | — |
| $\pi/8$ | 0.5 | -2.51 | 0.5 | 2.51 |
| $2\pi/8$ | 0.5 | -1.21 | 0.5 | 1.21 |
| $3\pi/8$ | 0.5 | -0.75 | 0.5 | 0.75 |
| $4\pi/8$ | 0.5 | -0.5 | 0.5 | 0.5 |
| $5\pi/8$ | 0.5 | -0.33 | 0.5 | 0.33 |
| $6\pi/8$ | 0.5 | -0.21 | 0.5 | 0.21 |
| $7\pi/8$ | 0.5 | -0.1 | 0.5 | 0.1 |
| $8\pi/8$ | 0.5 | 0 | 0.5 | 0 |
| $9\pi/8$ | 0.5 | 0.1 | 0.5 | -0.1 |
| $10\pi/8$ | 0.5 | 0.21 | 0.5 | -0.21 |
| $11\pi/8$ | 0.5 | 0.33 | 0.5 | -0.33 |
| $12\pi/8$ | 0.5 | 0.5 | 0.5 | -0.5 |
| $13\pi/8$ | 0.5 | 0.75 | 0.5 | -0.75 |
| $14\pi/8$ | 0.5 | 1.21 | 0.5 | -1.21 |
| $15\pi/8$ | 0.5 | 2.51 | 0.5 | -2.51 |

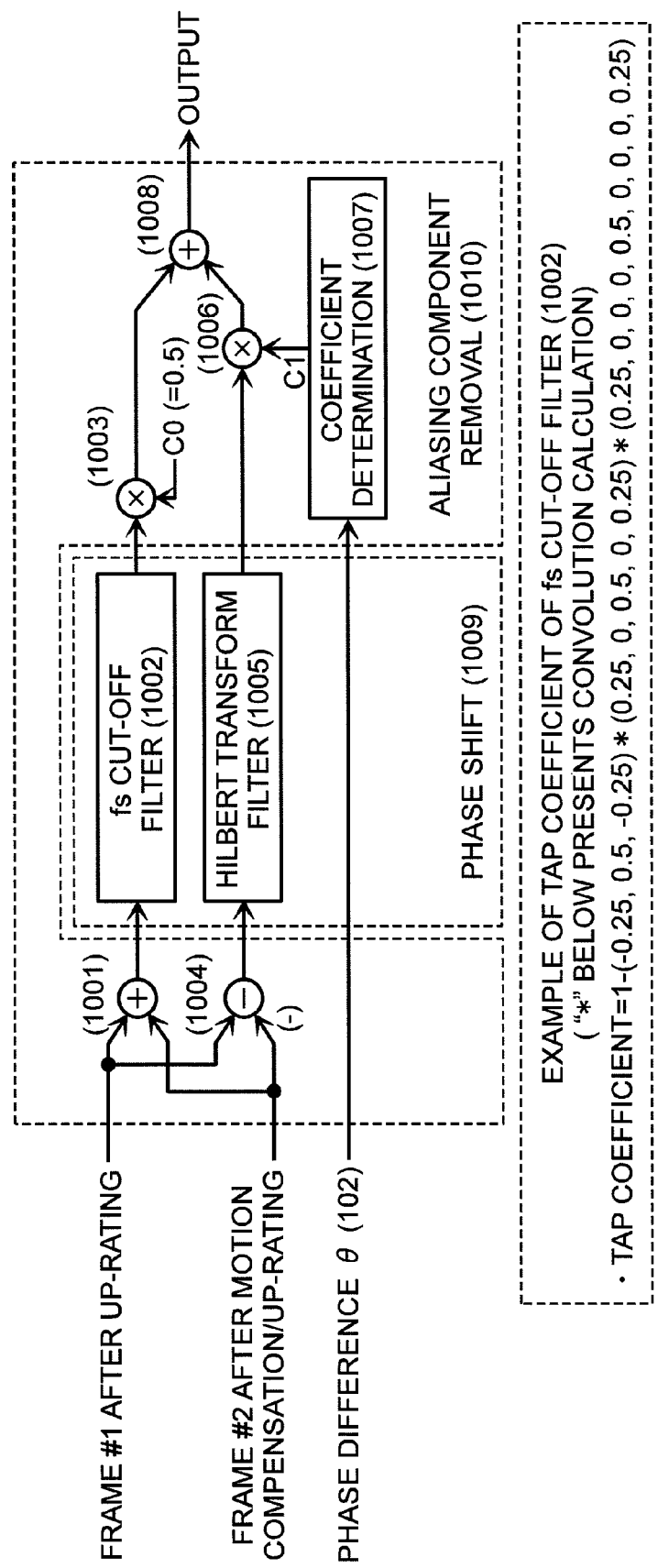

FIG.13

| θ | C0 | C1 | C4 |
|---|---|---|---|
| 0 | 0.5 | 0 | 1.0 |
| π/8 | 0.5 | -2.51 | 0.5 |
| 2π/8 | 0.5 | -1.21 | 0 |
| 3π/8 | 0.5 | -0.75 | 0 |
| 4π/8 | 0.5 | -0.5 | 0 |
| 5π/8 | 0.5 | -0.33 | 0 |
| 6π/8 | 0.5 | -0.21 | 0 |
| 7π/8 | 0.5 | -0.1 | 0 |
| 8π/8 | 0.5 | 0 | 0 |
| 9π/8 | 0.5 | 0.1 | 0 |
| 10π/8 | 0.5 | 0.21 | 0 |
| 11π/8 | 0.5 | 0.33 | 0 |
| 12π/8 | 0.5 | 0.5 | 0 |
| 13π/8 | 0.5 | 0.75 | 0 |
| 14π/8 | 0.5 | 1.21 | 0 |
| 15π/8 | 0.5 | 2.51 | 0.5 |

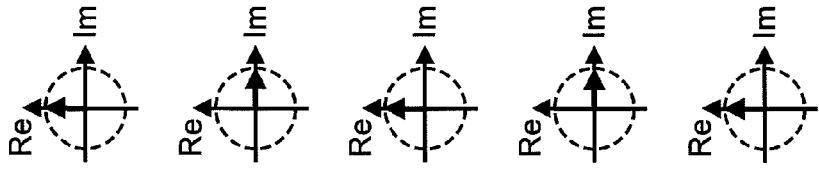
FIG.17A INPUT VIDEO
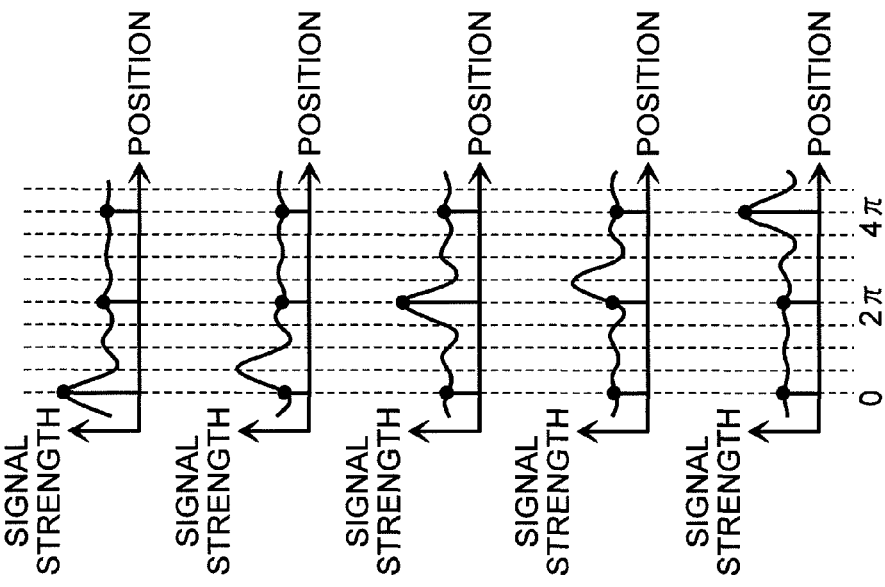
FIG.17B SAMPLING PHASE
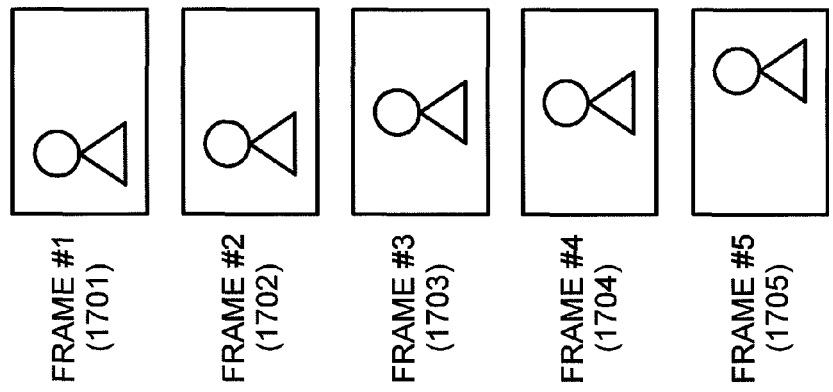
FIG.17C PHASE RELATIONSHIP OF ALIASING COMPONENT

HORIZONTAL PHASE SHIFT

VERTICAL PHASE SHIFT

OBLIQUE (LOWER RIGHT) PHASE SHIFT

OBLIQUE (UPPER RIGHT) PHASE SHIFT

FIG.34A
INPUT VIDEO
FIG.34B
OUTPUT VIDEO
FRAME #1 (3401)
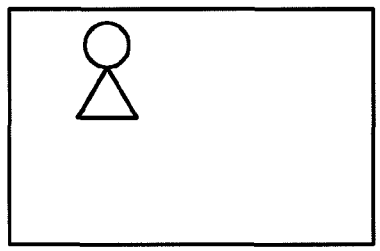
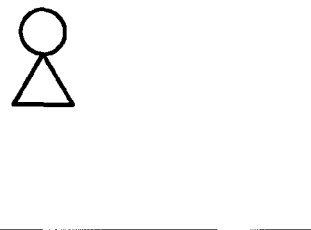
FRAME #2 (3402)
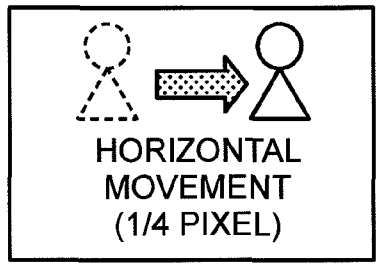
HORIZONTAL MOVEMENT (1/4 PIXEL)
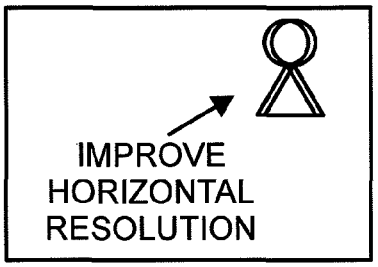
IMPROVE HORIZONTAL RESOLUTION
FRAME #3 (3403)
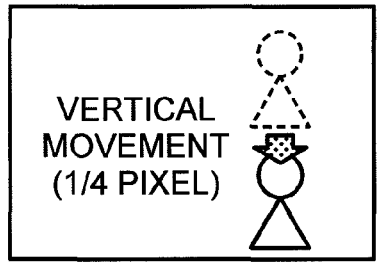
VERTICAL MOVEMENT (1/4 PIXEL)
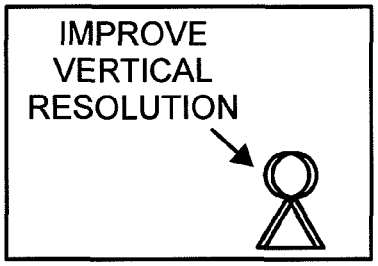
IMPROVE VERTICAL RESOLUTION
FRAME #4 (3404)
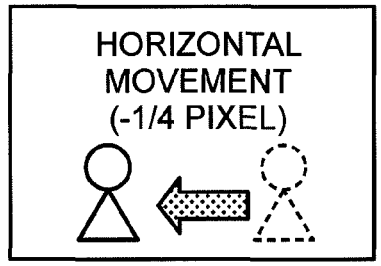
HORIZONTAL MOVEMENT (-1/4 PIXEL)
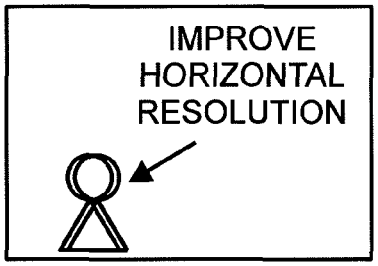
IMPROVE HORIZONTAL RESOLUTION
FRAME #5 (3405)
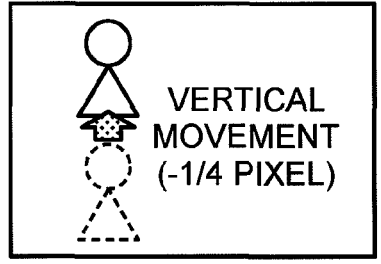
VERTICAL MOVEMENT (-1/4 PIXEL)
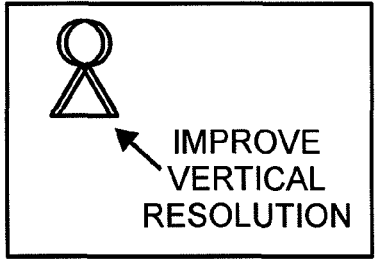
IMPROVE VERTICAL RESOLUTION

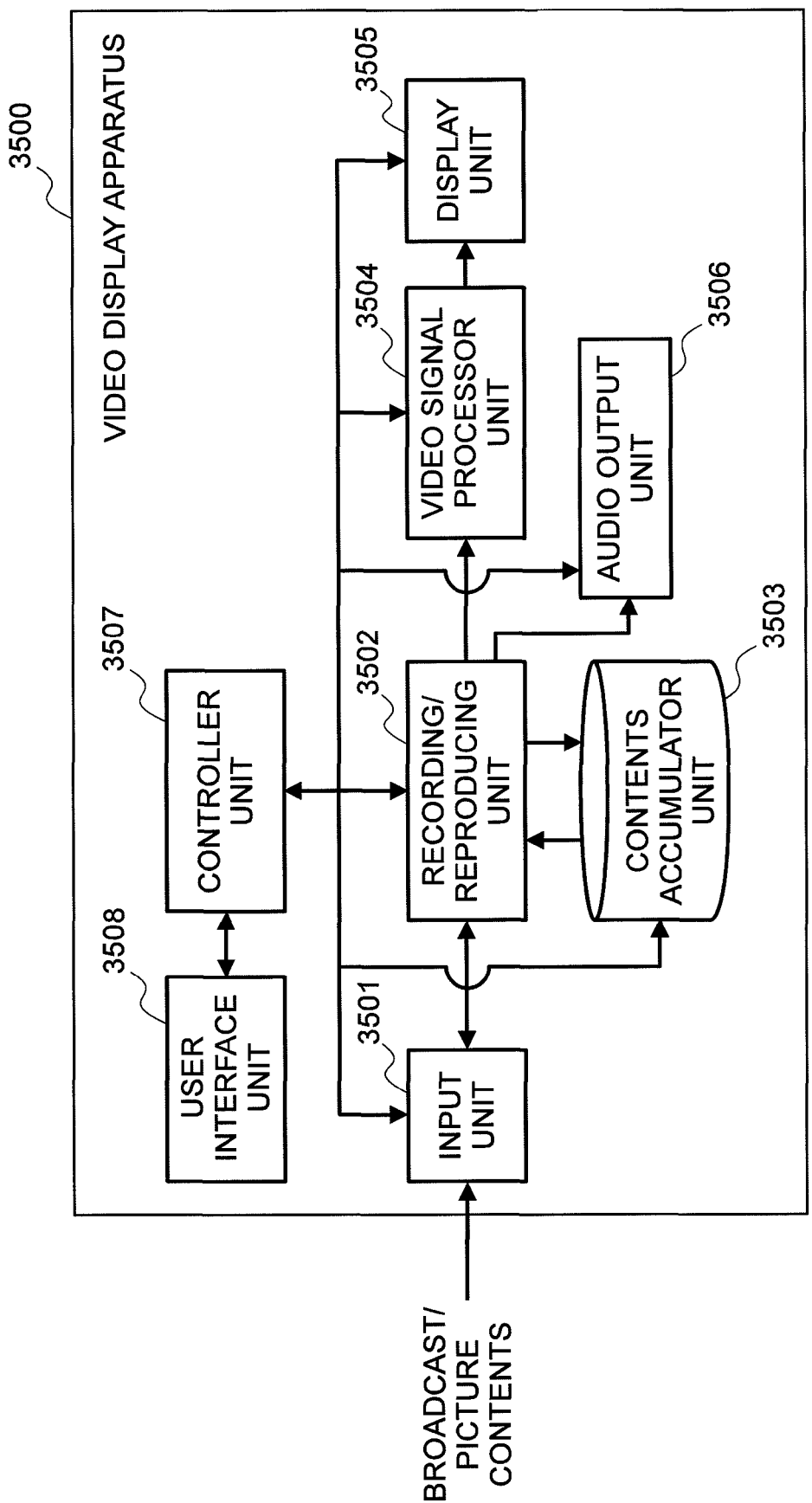

INTERLACE SCAN

PROGRESSIVE SCAN

FRAME (3705)

FIG.40D $$M = \begin{pmatrix} m_{11} & m_{12} & m_{13} & m_{14} \\ m_{21} & m_{22} & M_{23} & m_{24} \\ m_{31} & m_{32} & m_{33} & m_{34} \\ m_{41} & m_{42} & m_{43} & m_{44} \end{pmatrix}$$

FIG.40E $$m_{1j} = \begin{pmatrix} 1 & 0 & 0 & 0 \\ 0 & 1 & 0 & 0 \\ 0 & 0 & 1 & 0 \\ 0 & 0 & 0 & 1 \end{pmatrix}$$

FIG.40F $$m_{2j} = \begin{pmatrix} \cos(\theta Hj) & -\sin(\theta Hj) & 0 & 0 \\ \sin(\theta Hj) & \cos(\theta Hj) & 0 & 0 \\ 0 & 0 & \cos(\theta Hj) & -\sin(\theta Hj) \\ 0 & 0 & \sin(\theta Hj) & \cos(\theta Hj) \end{pmatrix}$$

FIG.40G $$m_{3j} = \begin{pmatrix} \cos(\theta Vj) & 0 & -\sin(\theta Vj) & 0 \\ 0 & \cos(\theta Vj) & 0 & -\sin(\theta Vj) \\ \sin(\theta Vj) & 0 & \cos(\theta Vj) & 0 \\ 0 & \sin(\theta Vj) & 0 & \cos(\theta Vj) \end{pmatrix}$$

FIG.40H $m_{4j} = m_{2j} \times m_{3j}$

FIG.40I $$\begin{pmatrix} C1ReRe \\ C1ImRe \\ C1ReIm \\ C1ImIm \\ C2ReRe \\ C2ImRe \\ C2ReIm \\ C2ImIm \\ C3ReRe \\ C3ImRe \\ C3ReIm \\ C3ImIm \\ C4ReRe \\ C4ImRe \\ C4ReIm \\ C4ImIm \end{pmatrix} = M^{-1} \begin{pmatrix} 1 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \end{pmatrix}$$

FIG.46A

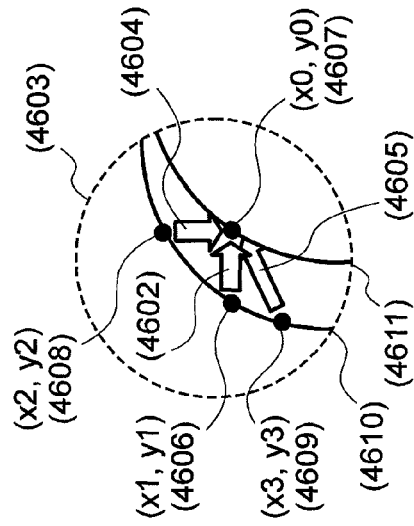

FIG.46B

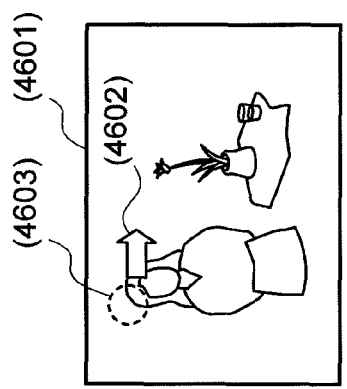

ORIGINAL HORIZONTAL PHASE DIFFERENCE $\theta H$ (2102) = x0-x1
ORIGINAL VERTICAL PHASE DIFFERENCE $\theta V$ (2103) = y0-y1

FIG.46D

PHASE CONVERSION INTO SAME BRIGHTNESS DIRECTION
(x1, y1) ⇒ (x2, y2)

FIG.46E

HORIZONTAL PHASE DIFFERENCE AFTER PHASE CONVERSION $\theta H'$ (4502) = x0-x2 = $\theta H$ (2102) + (x1-x2) = $\theta H + \Delta \theta H$
VERTICAL PHASE DIFFERENCE AFTER PHASE CONVERSION $\theta V'$ (4503) = y0-y2 = $\theta V$ (2103) + (y1-y2) = $\theta V + \Delta \theta V$

FIG.48

| $\theta H$ (or $\theta V$) | C0 | C1 | C2 | C3 | RESULT OF PHASES DETERMINATION (4701) (EXAMPLE) |
|---|---|---|---|---|---|
| 0 | 0.5 | -- | 0.5 | -- | PHASE CONVERSION |
| $\pi/8$ | 0.5 | -2.51 | 0.5 | 2.51 | NO PHASE CONVERSION |
| $2\pi/8$ | 0.5 | -1.21 | 0.5 | 1.21 | NO PHASE CONVERSION |
| $3\pi/8$ | 0.5 | -0.75 | 0.5 | 0.75 | NO PHASE CONVERSION |
| $4\pi/8$ | 0.5 | -0.5 | 0.5 | 0.5 | NO PHASE CONVERSION |
| $5\pi/8$ | 0.5 | -0.33 | 0.5 | 0.33 | NO PHASE CONVERSION |
| $6\pi/8$ | 0.5 | -0.21 | 0.5 | 0.21 | NO PHASE CONVERSION |
| $7\pi/8$ | 0.5 | -0.1 | 0.5 | 0.1 | NO PHASE CONVERSION |
| $8\pi/8$ | 0.5 | 0 | 0.5 | 0 | NO PHASE CONVERSION |
| $9\pi/8$ | 0.5 | 0.1 | 0.5 | -0.1 | NO PHASE CONVERSION |
| $10\pi/8$ | 0.5 | 0.21 | 0.5 | -0.21 | NO PHASE CONVERSION |
| $11\pi/8$ | 0.5 | 0.33 | 0.5 | -0.33 | NO PHASE CONVERSION |
| $12\pi/8$ | 0.5 | 0.5 | 0.5 | -0.5 | NO PHASE CONVERSION |
| $13\pi/8$ | 0.5 | 0.75 | 0.5 | -0.75 | NO PHASE CONVERSION |
| $14\pi/8$ | 0.5 | 1.21 | 0.5 | -1.21 | NO PHASE CONVERSION |
| $15\pi/8$ | 0.5 | 2.51 | 0.5 | -2.51 | NO PHASE CONVERSION |

FIG.53A
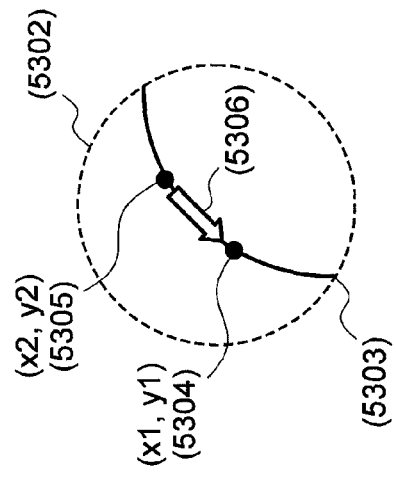
FIG.53B
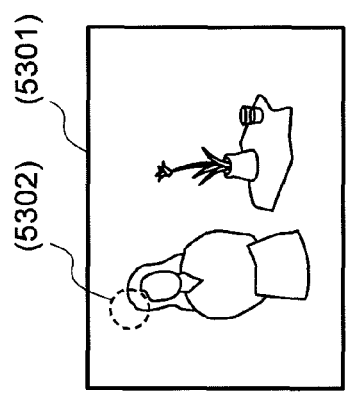
FIG.53C
ORIGINAL HORIZONTAL PHASE DIFFERENCE θH (2102) = x1-x1 = 0
ORIGINAL VERTICAL PHASE DIFFERENCE θV (2103) = y1-y1 = 0
FIG.53D
PHASE CONVERSION INTO SAME BRIGHTNESS DIRECTION
(x1, y1) ⇒ (x2, y2)
FIG.53E
HORIZONTAL PHASE DIFFERENCE AFTER PHASE CONVERSION θH' (4502) = x1-x2 = ΔθH (4707)
VERTICAL PHASE DIFFERENCE AFTER PHASE CONVERSION θV' (4503) = y1-y2 = ΔθV (4708)

VIDEO SIGNAL PROCESSING APPARATUS, VIDEO SIGNAL PROCESSING METHOD AND VIDEO DISPLAY APPARATUS

BACKGROUND OF THE INVENTION (1) Field of the Invention

The present invention relates to a technology for obtaining a high-resolution video signal from a video signal, and in particular, it relates to a technology for achieving the high resolution, with increasing a number of pixels building up a video frame and removing unnecessary aliasing, while composing or combing a plural number of video frames.

(2) Description of the Related Art

In recent years, advancement is made on large sizing of the screen, for television receivers, and accompanying with this, it is common that the video signal inputted from broadcasting, communication and/or storage medium, etc., is not displayed on it as it is, but is displayed with increasing the pixel numbers in the horizontal/vertical directions through digital signal processing. In this instance, however, it is impossible to increase the resolution only by increasing the pixel number, through an interpolation low-pass filter using sinc function or spline function, being well-know in general.

Then, as is already described in the following Patent Documents 1 and 2, and Non-Patent Document 1, there is proposed a technology (hereinafter, the conventional art) for increasing the pixel number while achieving the high resolution at the same time, by composing or synthesizing a plural number of picture or video frames (hereinafter, being called only "frame", in brief).

[Patent Document 1] Japanese Patent Laying-Open No. Hei 8-336046 (1996);

[Patent Document 2] Japanese Patent Laying-Open No. Hei 9-69755 (1997); and

[Non-Patent Document 1] Shin AOKI "Super Resolution Processing by Plural Number of Lower Resolution image", Ricoh Technical Report pp. 19-25, No. 24, NOVEMBER, 1998;

SUMMARY OF THE INVENTION

With those conventional arts, the high resolution can be obtained through three processes, (1) position estimation, (2) broadband interpolation, and (3) a weighted sum. Herein, the (1) position estimation is a process for assuming or estimating difference in the sampling phase (or sampling position) for each video data, with using the each video data of the plural number of video frames inputted. The (2) broadband interpolation is a process for increasing the pixel number (i.e., sampling points) of the each video data, including the aliasing components therein, through interpolation, with use of a wideband low-pass filter for transmitting all of the high-frequency components of an original signal, thereby obtaining high resolution of the video data. The (3) weighted sum is a process for negating the aliasing components generated when sampling the pixels, by taking the weighted sum depending on the sampling phase of each high-density data, so as to remove them, and at the same time restoring the high-frequency components of the original signal.

FIGS. 2A to 2E show this high-resolution technology, in brief. As is shown in FIG. 2A, herein it is assumed that a frame #1 (201), a frame #2 (202) and a frame #3 (203) on different time axes are inputted, to be composed with, thereby obtaining an output frame (206). For the purpose of simplification, first of all, consideration is paid upon case where the target moves into the horizontal direction (204), i.e., achieving the high resolution through a linear signal processing on a horizontal line (205). In this instance, as is shown in FIGS. 2B and 2D, between the frame #2 (202) and the frame #1 (201) is generated a positional difference depending on an amount of moving (204) of the target. This positional difference is obtained through the (1) position estimation mentioned above, thereby to make such motion compensation (207) upon the frame #2 (202) that no positional difference is generated, as is shown in FIG. 2C, and at the same time, phase difference θ is obtained between the sampling phases (209) and (210) of pixels (208) for each frame. Through conducting the (2) broadband interpolation and the (3) weighted sum mentioned above, upon this phase difference θ (211), a new pixel (212) can be produced at a position just between the original pixels (208) (i.e., phase difference θ=π); thereby achieving the high resolution. The (3) weighted sum will be mentioned later.

However, in actual, it must be also considered that the movement of the target includes, not only the parallel movement, but also accompanying movements of rotation, expansion and reduction, etc.; however, in case where the time distance between the frames is very small and/or when the target moves slowly, it is possible to consider those movements with approximating them into a local parallel movement.

In case when achieving the high resolution of 2-times in the one-dimensional direction with the conventional technologies mentioned in the Patent Documents 1 and 2, and Non-Patent Document 1, as is shown in FIGS. 3A to 3C, it is necessary to use signals of at least three (3) pieces of frame pictures or videos when conducting the weighted sum of the above (3). Herein, FIGS. 3A to 3C are views for showing frequency spectrums of each component, within the one-dimensional frequency region. In those figures, distance from the frequency axis shows signal strength, while rotation angle around the frequency axis shows the phase thereof. With the weighted sum of the above (3), detailed explanation thereof will be given below.

As was mentioned above, when conducting an interpolation upon pixels through a wideband low-pass filter for transmitting the frequency band (frequency band from 0 to sampling frequency fs) being 2-times of the Nyquist frequency, by the wideband interpolation of the above (2), sum can be obtained of the component same to the original signal (hereinafter, being called "original component") and the aliasing component depending on the sampling phase. In this instance, when conducting the wideband interpolation of the above (2) upon the signals of three (3) pieces of frame videos, as is shown in FIG. 3A, it is well-known that all phases of the original components (301), (302) and (303) of each frame are coincident with one another, and that the phases of aliasing components (304), (305) and (306) rotate depending on the sampling phase of the each frame. For easy understanding of phase relationship between the respective ones, the phase relationship of the original components of the each frame is shown in FIG. 3B, and the relationship of the aliasing components of the each frame in FIG. 3C.

Herein, by conducting the weighted sum of the above (3) upon three (3) pieces of the signals of frame pictures or videos, while appropriately selecting the coefficients to be multiplied thereon, it is possible to remove the aliasing components (304), (305) and (306) of each frame, negating one another, and thereby to extract only the original component. In this instance, for the purpose of making the vectrial sum of aliasing components (304), (305) and (306) of the each frame zero (0), i.e., bringing both components on Re axis (i.e., a real axis) and Im axis (i.e., an imaginary axis) into zero (0), at least three (3) pieces of the aliasing components are necessary. Accordingly, for realizing the 2-times high resolution, i.e., for removing one (1) piece of the aliasing component, it is necessary to use the signals of at least three (3) pieces of frame video.

In the similar manner, as is described in those Patent Documents 1 and 2, and Non-Patent Document 1, for achieving the high resolution upon two-dimensional input signals, including the vertical signal and the horizontal signal, since the aliasing component comes in from two (2) directions, i.e., the vertical direction and the horizontal direction, then three (3) aliasing components overlap on one another if the band width of the original signal is widen by two (2) times, in both the vertical and horizontal directions, and then it is necessary to use 2M+1 pieces digital data (=seven (7) pieces of the frame video signals) for canceling those.

Accordingly, with the conventional technology, frame memory and the signal processing circuit becomes large in the scales thereof, and therefore not economic. Also, the necessity for conducting the position estimation, correctly, upon a large number of frame videos separated on timing, brings the structures to be complex. Thus, with the conventional technology, it is difficult to obtain the high resolution of the moving pictures, such as, on the television broadcast signal, for example.

Also, the present television broadcast signal applies an interlace scanning therein, mainly, but in the Patent Documents 1 and 2 and the Non-Patent Document 1, there is not disclosure nor teaching about the high resolution for an interlace scanning signal itself and an interlace progressive scanning conversion (I-P conversion).

Also, in the present digital television broadcasting with using the terrestrial waves or satellite (i.e., BS, CS), programs are put on the air through a video signal of HD (high Definition), in addition to the conventional video signal of SD (Standard Definition). However, all of the programs are not yet replaced by the video signals, which are picked up by a HD camera, and therefore, it is well known to convert the video signal, which is picked up by a SD camera, into a signal having the same pixel number to that of HD (i.e., up converting), through a SD/HD converter, so as to broadcast it while exchanging for each of programs or scenes.

With the conventional receiver, video of high resolution is reproduced when the received signal is the video signal, which is picked up by the HD camera, and video of low resolution is reproduced when it is the video signal after the SD/HD conversion (i.e., the up conversion), and therefore the resolution is switched over, frequency, in each of the programs or scenes, and thereby bringing about a problem of causing it to be difficult to be seen.

Also, with the conventional arts mentioned above, since the high-resolution process is conducted with using the difference of the sampling phase (i.e., the sampling position), there is a drawback that the effect of the high resolution cannot be obtained, with the signal that does not generate the difference in the sampling phase; thus, in an area where an object is standing still, or in an area where the motion of the object is just times of an integer of the pixel distance.

The present invention provides a technology for converting the video signal into one being high in the resolution thereof, preferably.

Thus, according to the present invention, it is possible to achieve the high resolution of the video signal, more preferably.

BRIEF DESCRIPTION OF THE DRAWINGS

Those and other features, objects and advantages of the present invention will become more apparent from the following description when taken in conjunction with the accompanying drawings wherein:

FIGS. 2A to 2E are views for explaining operations of a general video signal processing for high resolution;

FIGS. 9A to 9D are views for explaining the embodiment 1, according to the present invention;

FIG. 10 is a view for explaining an embodiment 3, according to the present invention;

FIG. 13 is a view for explaining the third embodiment, according to the present invention;

FIGS. 17A to 17C are views for explaining difference in the operations thereof, between the present invention and the prior arts;

FIGS. 34A and 34B are views for explaining difference in the operations, between one embodiment of the present invention and the prior arts;

FIG. 35 is a view for explaining an embodiment 13, according to the present invention;

FIGS. 46A to 46E are views for explaining the embodiment 21 according to the present invention;

FIG. 48 is a view for explaining the embodiment 21 according to the present invention;

FIGS. 53A to 53E are views for explaining the embodiment 25 according to the present invention;

DETAILED DESCRIPTION OF THE PREFERRED EMBODIMENTS

Figure 1:
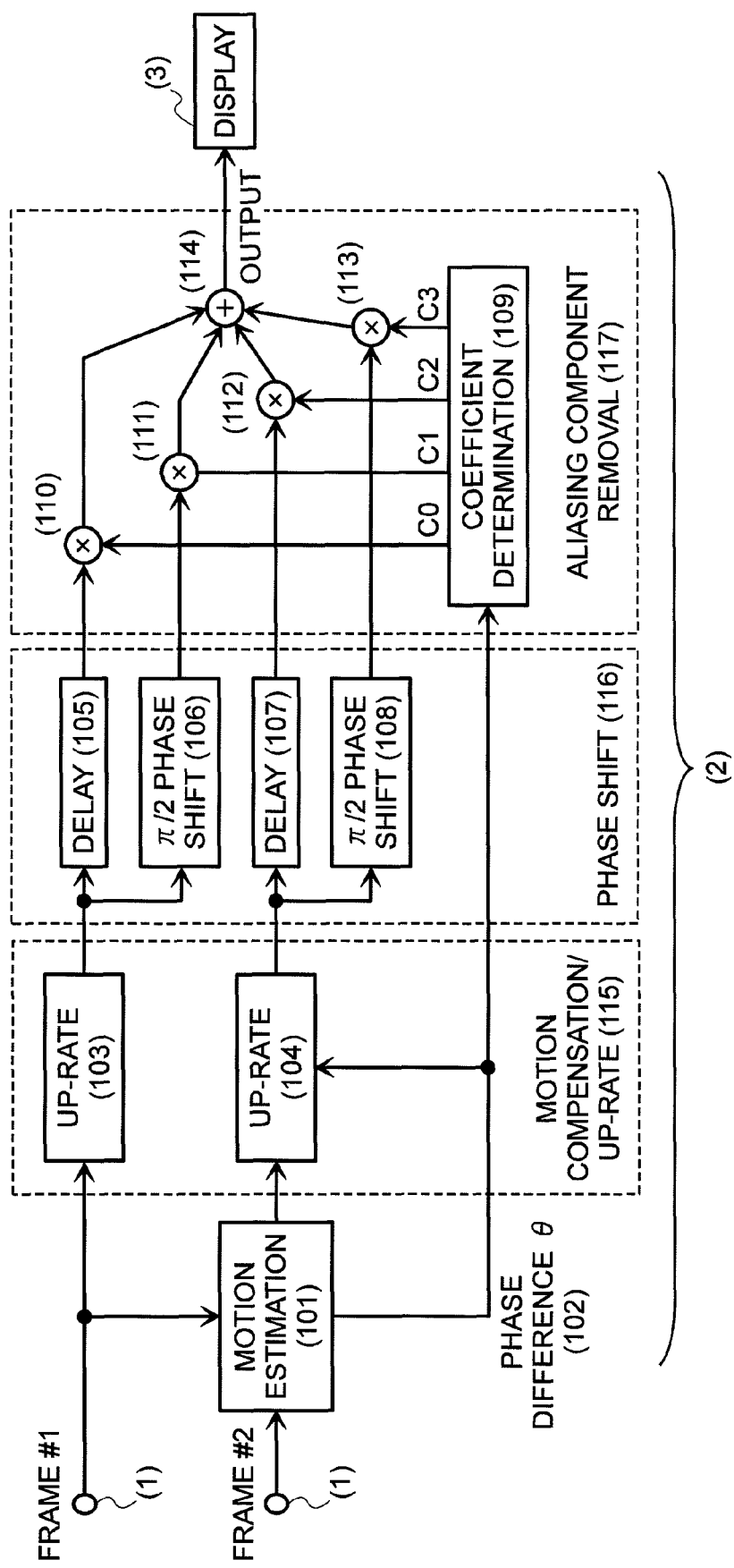
FIG. 1 is a block diagram for showing the configuration of a video signal processing apparatus, according to an embodiment 1 of the present invention.
Figure 3A:
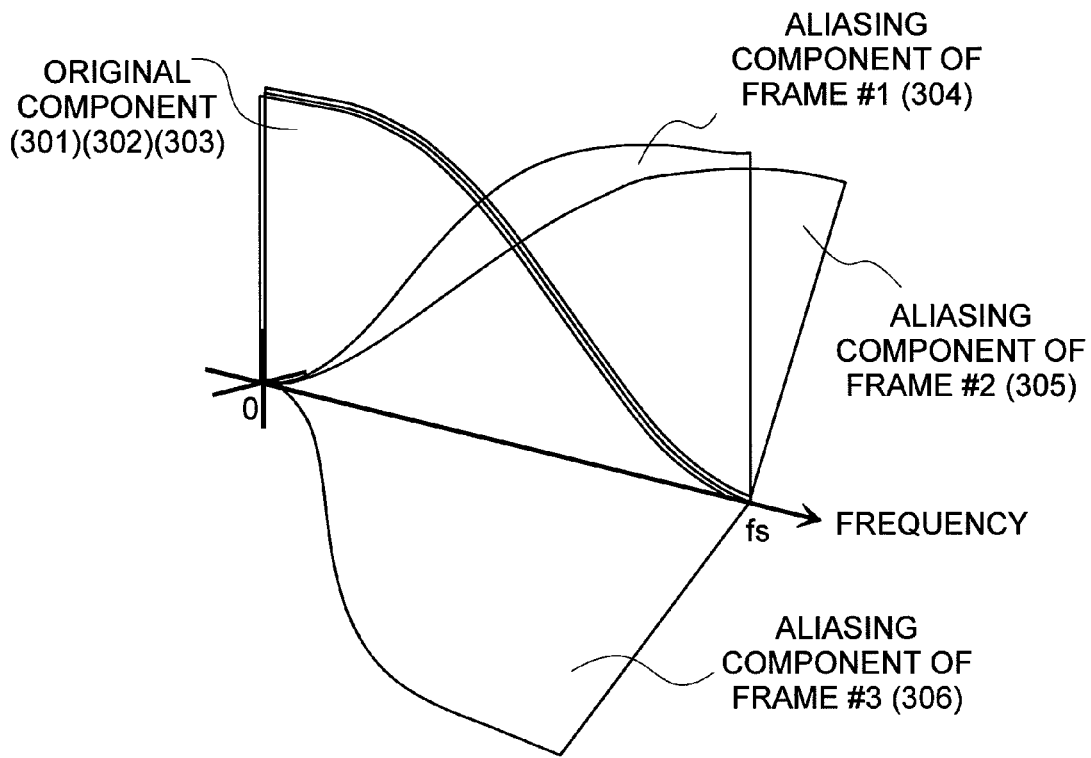
FIGS. 3A to 3C are views for explaining the operations of the prior art.
Figure 3B:
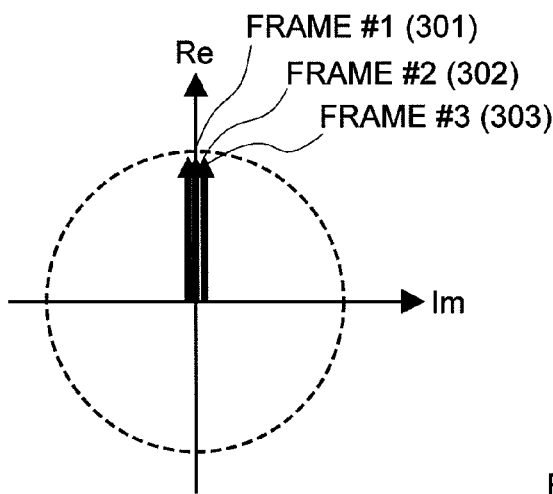
Figure 3C:
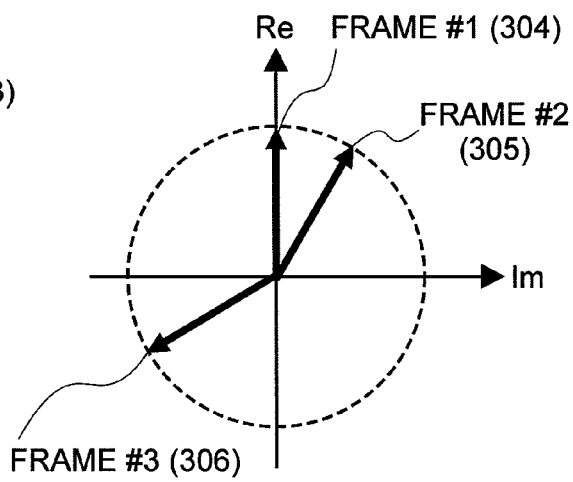

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

Hereinafter, embodiments according to the present invention will be fully explained by referring to the attached drawings.

Also, in every one of drawings attached herewith, it is assumed that a constituent element attached with the same reference numeral has the same function thereto.

Also, the expression "phase" in each description and drawing of the present specification includes a meaning of "position" on 2-dimensional image or picture, when being used in an explanation relating to 2-dimensional image space. That position means a position having an accuracy of a small number of poxes.

And, the expression "up-rate" in each description and drawing of the present specification includes also a meaning "up-rating process" therein. Also, the expression "up-convert" in each description and drawing of the present specification includes a meaning "up-converting process" therein. Both of those mean a conversion process for enlarging the number of pixels of the video (e.g., a pixel number increasing process) or a conversion process for enlarging the video (e.g., an image enlarging conversion process).

Also, the expression "down-rate" in each description and drawing of the present specification includes a meaning "down-rating process" therein. And, the expression "down-convert" in each description and drawing of the present specification includes a meaning "down-converting process" therein. Both of those mean a conversion process for reducing or decreasing the number of pixels of the video (e.g., a pixel number decreasing process) or a conversion process for reducing the video (e.g., an image reducing conversion process).

Also, the expression "motion compensation" in each description and drawing of the present specification includes a meaning of conducting alignment by calculating out a difference between special positions, i.e., phase difference or sampling difference.

In the description of each embodiment, which will be given below, for the (1) position estimation mentioned above, it is enough to apply such a method as described in either one of the following Reference Documents 1 and 2. Also, for the (2) broadband interpolation mentioned above, it is enough to apply a general low pass filter having a passing band doubled (2 times) to Nyquist frequency, as is described in the Non-Patent Document 1 mentioned above.

[Reference Document 1] Shigeru ANDO "A Velocity Vector Field Measurement System Based on Spatio-Temporal Image Derivative", Papers of Measurement Automatic Control Academic Society, pp. 1300-1336, Vol. 22, No. 12, 1986; and

[Reference Document 2] Hiroyuki KOBAYASHI et al. "Calculation Method of a Phase-Only Correction Function for Images Based on Discrete Cosine Transform", IEICE Technical Report ITS2005-299 (2006-02), pp. 73-78.

Also, the description "SR signal" in the following embodiments is an abbreviation of "Super Resolution signal".

Hereinafter, explanation will be made on the embodiments according to the present invention, by referring to the drawings attached herewith.

Embodiment 1

FIG. 1 shows an embodiment 1 of the video signal processing apparatus, according to the present invention, and the distinctive features thereof will be mentioned. The video signal processing apparatus, according to the present embodiment, will be applied into a video displaying apparatus, such as, a television receiver, etc., for example. In the present embodiment mentioned below, explanation will be made on the example of the video displaying apparatus, as the video signal processing apparatus.

In FIG. 1, the video signal processing apparatus, according to the present embodiment, comprises an input portion (1), into which are inputted a frame line of moving pictures, such as, a television broadcast signal or the like, for example, a resolution converter portion (2) for obtaining high resolution of frames, which are inputted from that input portion, and further a display portion for displaying a picture upon basis of the frames, which are high resolved within that resolution converter portion (2). As this display portion (3) is applied a plasma display panel, a liquid crystal panel or an electron/electrolysis discharge type display panel. Hereinafter, detailed explanation will be made on the resolution converter portion (2).

In FIG. 1, first of all, by means of a position estimation portion (101), upon basis of a sampling phase (sampling position) of pixel of a processing target on a frame #1 inputted into the input portion (1), estimation is made on a position of pixel corresponding on a frame #2, and thereby obtaining the sampling phase difference θ (102) thereof for each pixel.

Next, by means of up-raters (103) and (104) of a motion compensation/up-rate portion (115), motion compensation is made upon the frame #2 with using information of the phase difference θ (102), so as to fit to the frame #1 in the position, as well as, increase the pixel numbers of the frames #1 and #2 up to two (2) times higher, respectively; thereby obtaining high density. In a phase-shift portion (116), the phase of this data high-densified is shifted by only a predetermined amount. Herein, as a means for shifting the phase of data by the predetermined amount, it is possible to use π/2 phase shifters (106) and (108). Also, for the purpose of compensation of delay, which is caused within those π/2 phase shifters (106) and (108), signals of the frames #1 and #2, which are high-densified, are delayed by means of delay devices (105) and (107).

In an aliasing component removal portion (117), each of output signals of the delay devices (105) and (107) and Hilbert Transformers (106) and (108) is multiplied by an coefficient C0, C2, C1 or C3, which is produced upon basis of the phase difference θ (102) in a coefficient determining portion (109), respectively, within a multiplier (110), (112), (111) or (113), and then those signals are added with in an adder (114); thereby obtaining an output. This output is supplied to the display portion 3. Further, the position estimation portion (101) can be achieved with using the prior art mentioned above, as it is. Details of the up-raters (103) and (104), the π/2 phase shifters (106) and (108), and the aliasing component removal portion (117) will be mentioned later.

Figure 4A:
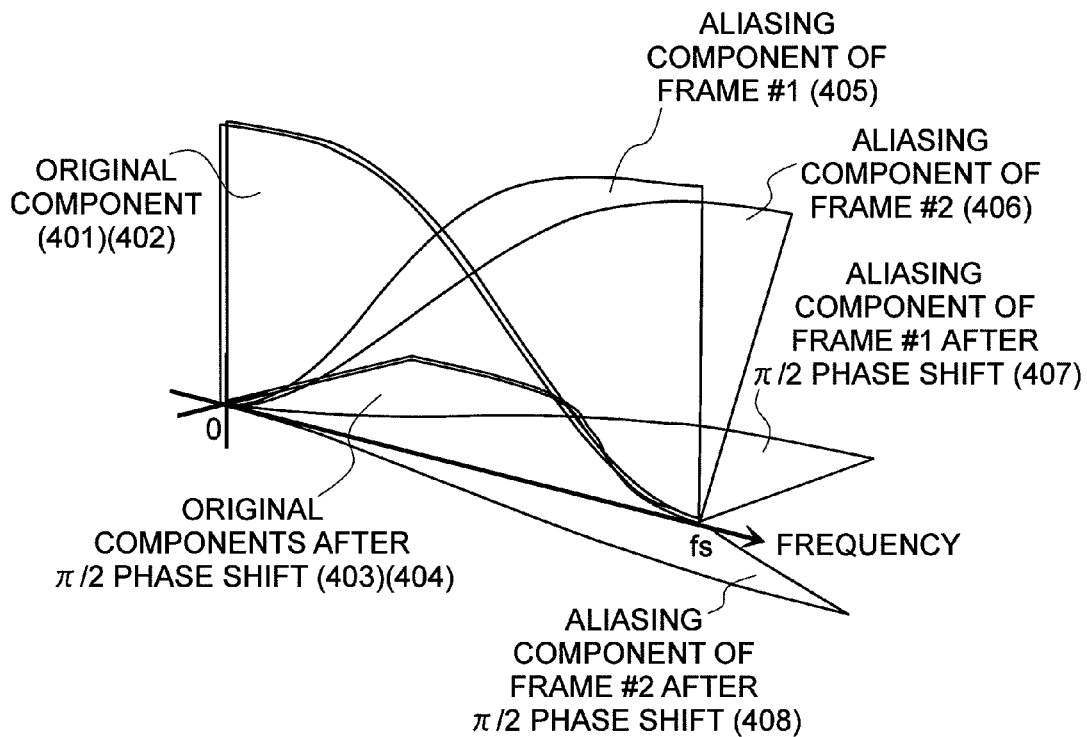
FIGS. 4A to 4C are views for explaining the operations in the embodiment 1, according to the present invention.
Figure 4B:
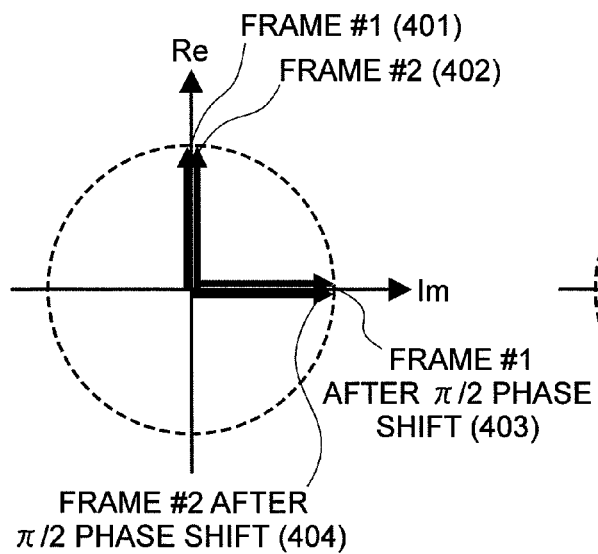
Figure 4C:
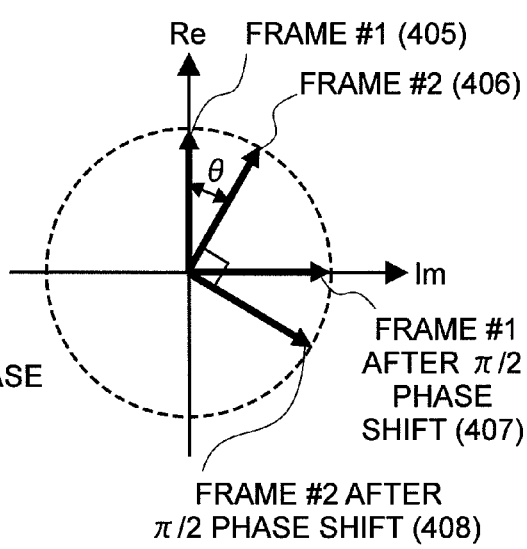

FIGS. 4A to 4C shows operations of the embodiment 1 of the present invention. Those figures show the respective outputs of the delay devices (105) and (107) and the π/2 phase shifters (106) and (108), which are shown in FIG. 1, within one-dimensional frequency region thereof. In FIG. 4A, each of the signals of frames #1 and #2 comes to be that obtained by adding an original component (401) or (402) and aliasing component (405) or (406), each of which is aliased from the original sampling frequency (fs). In this instance, the aliasing component (406) is rotated by the phase difference θ (102) mentioned above.

On the other hand, each of the signals of frames #1 and #2, after the up-rating, which are outputted from the π/2 phase shifters (106) and (108), comes to be that obtained by adding the original component (403) or (404) after the π/2 phase shifting and the aliasing component (407) or (408), after the π/2 phase shifting. FIGS. 4B and 4C show the original components and the aliasing components, respectively, extracting them, for the purpose of easy understanding of phase relationships for each of the components shown in FIG. 4A.

Herein, if taking a weighted sum while determining the coefficients to be multiplied with each of the components, so that the component on Re axis be 1 and the component on Im axis be 0, when taking a vector sum of the four (4) components shown in FIG. 4B, and also both components on the Re axis and the Im axis be 0 when taking a vector sum of the four (4) components shown in FIG. 4C, then it is possible to extract only the original component with canceling the aliasing component therefrom. Thus, a video signal processing apparatus can be obtained for achieving the high resolution 2 times in the one-dimensional direction, with using only two (2) pieces of frame pictures. Details of the method for determining the coefficients will be mentioned later.

Figure 5:
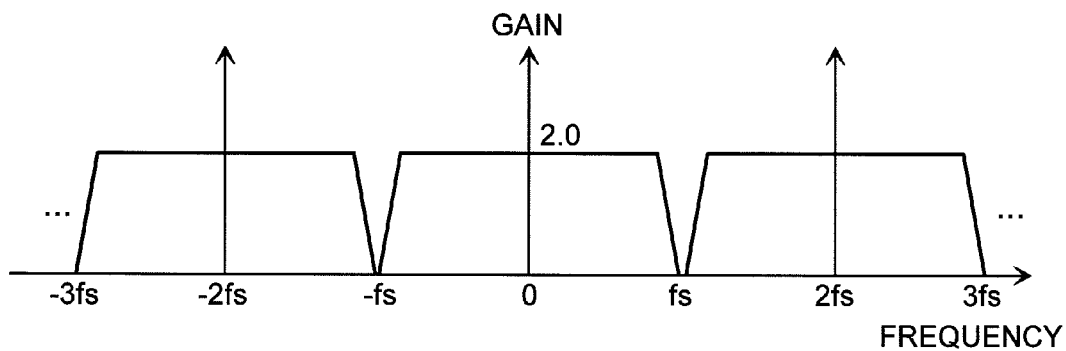
FIG. 5 is a view for explaining the embodiment 1, according to the present invention.

FIG. 5 shows the operations of the up-raters (103) and (104) to be applied within the embodiment 1, according to the present invention. In this FIG. 5, the horizontal axis shows the frequency and the vertical axis the gain (i.e., a value of ratio on an amplitude of the output signal to that of the input signal), i.e., the "frequency-gain" characteristics of the up-raters (103) and (104). Herein, within the up-raters (103) and (104), the high densification can be achieved by inserting a sampling point (=zero point) for a new pixel, at just middle position of the distance between the original pixels, while applying the frequency being two (2) times high (2fs) with respect to the sampling frequency (fs) of the original signal as a new sampling frequency, and also applying such a filter having bandwidth for passing through all the frequencies from −fs to +fs at gain 2.0. In this instance, as is shown in the FIG. 5, a characteristic can be obtained, repeating at every frequency of n×2fs (n: an integer), due to the symmetry of the digital signal.

Figure 6:
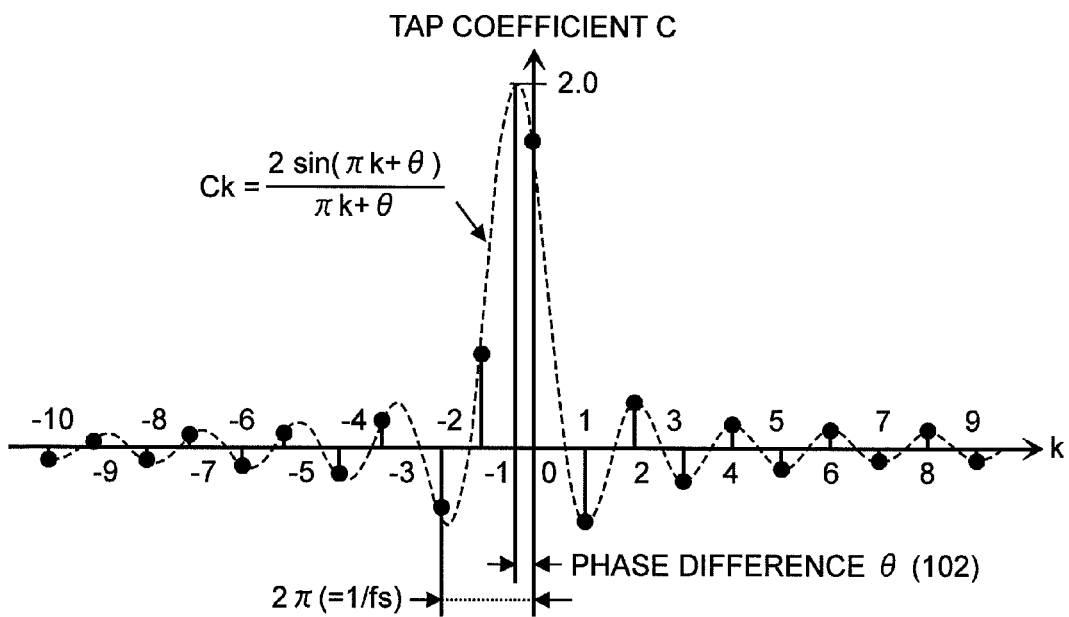
FIG. 6 is a view for explaining the embodiment 1, according to the present invention.

FIG. 6 shows the details of the up-raters (103) and (104) to be applied in the embodiment 1 of the present invention. This FIG. 6 shows tap coefficients of the filter, which can be obtained through the Fourier transformation of the frequency characteristics shown in FIG. 5. In this instance, each the tap coefficient Ck (however, k is an integer) is a sinc function, which is well-known in general, and it comes to be Ck=2 sin(πk−θ)/(πk−θ) by shifting (−0) for compensating the phase difference θ (102) of sample for each pixel. However, in the up-tater (103), it is enough to make Ck=2 sin(πk)/(πk) by putting the phase difference θ (102) into 0. Also, by expressing the phase difference θ (102) by the phase difference of a an integer pixel unit (2π)+the phase difference of a decimal pixel unit, it is possible to achieve the compensation upon the phase difference of integer pixel unit through a simple pixel shifting while using filters of the up-raters (106) and (108) mentioned above for compensation upon the phase difference of the decimal pixel unit.

Figure 7A:
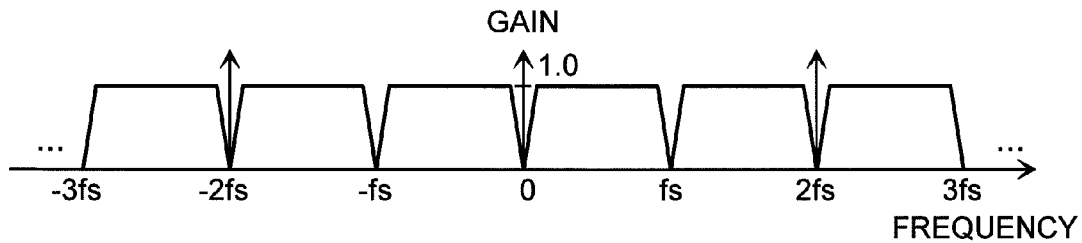
FIGS. 7A and 7B are views for explaining the embodiment 1, according to the present invention.
Figure 7B:
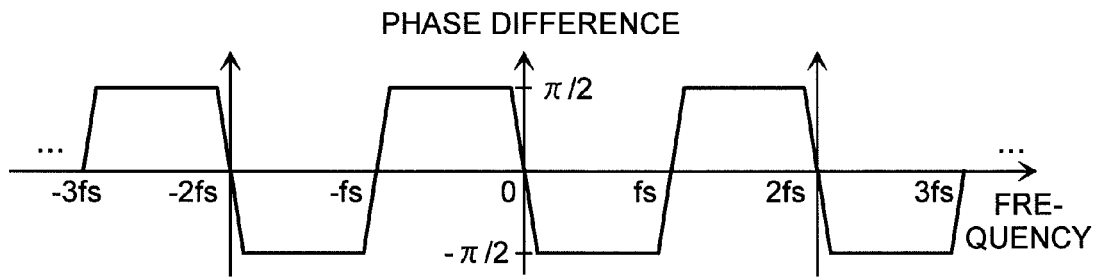

FIGS. 7A and 7B show examples of the operations of the π/2 phase shifters (106) and (108) to be applied in the embodiment 1 of the present invention. As the π/2 phase shifters (106) and (108), it is possible to use the Hilbert Transformers (106) and (108) which are well known in general.

In FIG. 7A, the horizontal axis shows the frequency while the vertical axis the gain (i.e., a value of ratio on an amplitude of the output signal to that of the input signal), i.e., the "frequency-gain" characteristics of the Hilbert Transformers. Herein, within the Hilbert Transformers, applying the frequency being two (2) times high (2fs) with respect to the sampling frequency (fs) of the original signal as a new sampling frequency, and having a bandwidth at gain 1.0 for all the frequency components, except for 0 between −fs and +fs.

Also, in FIG. 7B, the horizontal axis shows the frequency while the vertical axis the phase difference (i.e., the difference in the phase of an output signal with respect to the phase of an input signal), and it represents the "frequency-gain" characteristics of the Hilbert Transformers. Herein, the frequency component between 0 and fs is delayed in the phase by only $\pi/2$, while the frequency component between 0 and $-fs$ is advanced in the phase by only $\pi/2$. In this instance, as is shown in the figures, a characteristic can be obtained, repeating at every frequency of n×2fs (n: an integer), due to the symmetry of the digital signal.

Figure 8:
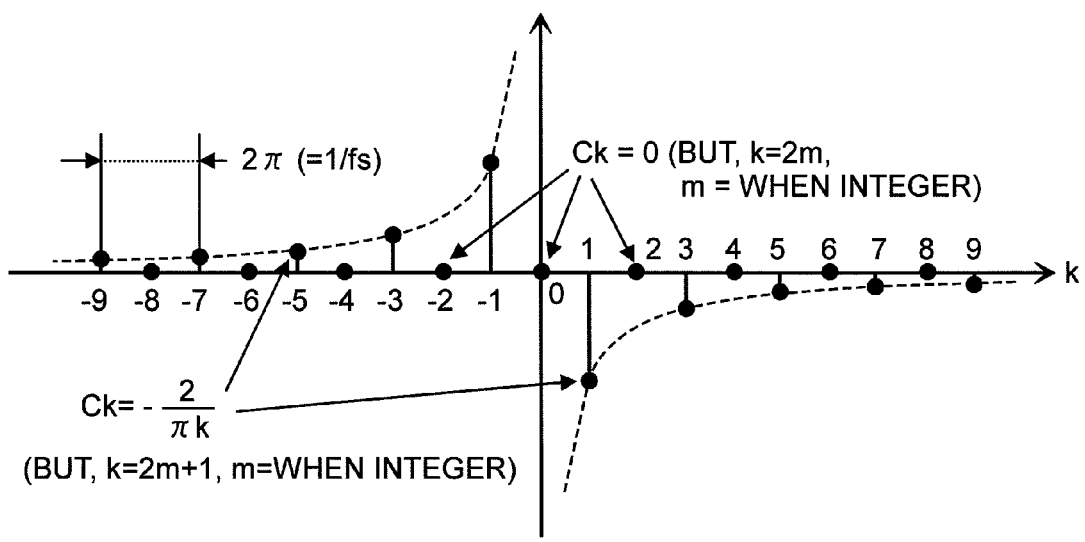
FIG. 8 is a view for explaining the embodiment 1, according to the present invention.

FIG. 8 shows an example of constructing the $\pi/2$ phase shifters (106) and (108), to be applied in the embodiment 1 of the present invention, with the Hilbert Transformers. The same figure shows tap coefficient of a filter, which can be obtained through the Fourier inversion of the frequency characteristics shown in FIGS. 7A and 7B. In this instance, it is enough to make each the tap coefficient Ck=0 when k=2m (however, m is an integer), or Ck=$-2/(\pi k)$ when k=2 m+1.

However, as the $\pi/2$ phase shifters (106) and (108), to be applied in the embodiment 1 of the present invention, it is also possible to apply differentiators thereto. In this case, when differentiating general equation $\cos(\omega t+\alpha)$ by t and multiplying by $1/\omega$, then $d(\cos(\omega t+\alpha))/dt*(1/\omega)=-\sin(\omega t+\alpha)=\cos(\omega t+\alpha+\pi/2)$, i.e., it is possible to achieve the function of $\pi/2$ phase shifting. Thus, it is also possible to obtain the $\pi/2$ phase shifting function by applying a filter having $1/\omega$ "frequency-amplitude" characteristic after taking the difference between the value of pixel to be target and that of the pixel neighboring thereto.

FIGS. 9A to 9D show the operations of the coefficient determining portion (109) to be applied in the first embodiment of the present invention and the details thereof. As is shown in FIG. 9A, if determining the coefficients to be multiplied with each component in such a manner that the component on the Re axis be 1 while the component on the Im axis 0 when obtaining the vector sum of the four (4) components shown in FIG. 4B, as well as, both components on the Re axis and the Im axis be 0 when obtaining the vector sum of the four (4) components shown in FIG. 4C, then it is possible to achieve the video signal processing apparatus enabling to obtain the high resolution of two (2) times in the one-dimensional direction with using only two (2) pieces of the frame pictures.

Herein, as shown in FIG. 1, it is assumed that the coefficient to the output of the delay device (105) (i.e., sum of the original component and the aliasing component of the frame #1 after the up-rating) is C0, the coefficient to the output of the $\pi/2$ phase shifter (106) (i.e., sum of results of the $\pi/2$ phase shifting on each the original component and the aliasing component of the frame #1 after the up-rating) C1, the coefficient to the output of the delay device (107) (i.e., sum of an original component of the frame #2 after up-rating and the aliasing component) C2, and the coefficient to the output of the Hilbert Transformer (106) (i.e., sum of results of the $\pi/2$ phase shifting on each the original component and the aliasing component of the frame #2 after the up-rating) C3, respectively.

In this instance, when making them to satisfy the condition shown in FIG. 9A, then simultaneous equations can be obtained as shown in FIG. 9B, from the phase relationships of the respective components shown in FIGS. 4B and 4C, and then dissolving those equations can lead the result as shown in FIG. 9C.

The coefficient determining portion (109), according to the present embodiment, outputs the coefficients C0, C1, C2 and C3, which can satisfy any one of those shown in FIGS. 9A, 9B and 9C.

As an example, the values of the coefficients C0, C1, C2 and C3 are shown in FIG. 9C, when changing the phase difference θ (102) from 0 to $2\pi$ at every $\pi/8$. This corresponds to the case when conducting motion estimation upon a signal of the original frame #2 with accuracy of 1/16 pixel, and thereby conducting the motion compensation upon the frame #1. In case where the value of the phase difference θ (102) is less than zero (0), or equal or greater than $2\pi$, it is enough to bring the phase difference θ (102) to be within a region from 0 to $2\pi$, by adding or subtracting a value, which is obtained by multiplying an integer on $2\pi$, to/from the value of the phase difference θ (102), with using periodicity of the sin function or the cosine function.

However, the up-raters (103) and (104) and the $\pi/2$ phase shifters (106) and (107) necessitate an infinity number of taps for obtaining an ideal characteristics thereof, however there is no problem from a practical viewpoint if simplifying them by cutting the number of taps down to a finite number of taps. In this instance, it is possible to apply a general window function (such as, a hanning window function and a hamming window function, for example). By bringing the coefficients for each of taps of the simplified Hilbert Transformer into values, being bilaterally symmetric around C0, i.e., C($-k$)=$-$Ck (k: an integer), it is possible to shift the phase by a predetermined amount.

Next, differences will be explained, in particular, in the operations between the present invention and the prior arts mentioned above, by referring to FIGS. 17A to 17C. In FIG. 17A, among frames from a frame #1 (1701) to a frame #5 (1705), input pictures are prepared such that an object to be photographed moves into the right-hand direction. In this instance, as is shown in FIG. 17B, the object is shifted, intentionally, in such a manner that the position of corresponding pixels shifts by 1/4 pixel (=$\pi/2$) between the frame #1 (1701) and the frame #2 (1702), by 1 pixel (=$2\pi$) between the frame #1 (1701) and the frame #3 (1703), by 5/4 pixel (=$5\pi/2$) between the frame #1 (1701) and the frame #4 (1704), and by 2 pixel (=$4\pi$) between the frame #1 (1701) and the frame #5 (1705), respectively, judging from the sampling phases of the respective frames. In this instance, the phases of the respective aliasing components can be presented as shown in FIG. 17C, upon basis of the phase of the aliasing components contained in the signals on the frame #1 (1701). In case when conducting the 2-times high resolution upon this input picture (a), according to the prior art, since the vector sum of the aliasing components cannot be made zero (0) even with using any three (3) pieces of frames within the frames #1 (1701) to #5 (1705), therefore it is impossible to achieve the high resolution. On the other hand, with applying the present embodiment, since the vector sum of the aliasing components can be made zero (0) with two (2) pieces of frames neighboring to each other (for example, the frame #1 (1701) and the frame #2 (1702), it is possible to achieve the high resolution. Thus, with using the input picture shown in FIG. 17A as a test patter, it is possible to confirm the operation condition of the present embodiment.

In the explanation given in the above, although it is made by picking up the high resolution in the horizontal direction, but each of the embodiments of the present invention should not be limited to this, i.e., it is also possible to apply them into, for achieving the high resolution in the vertical direction, or an oblique direction, too.

With the video signal processing apparatus, according to the embodiment 1 mentioned above, two (2) signals are produced from each of the video signals, by conducting the phase sifting upon each video signals of two (2) pieces of input video frames, less than that of the prior arts. With this, it is possible to produce four (4) signals from the video signals of the two (2) pieces of input video frames. Herein, upon basis of the phase difference between those two (2) pieces of the input video frames, coefficients are calculated for each of those four (4) signals, so as to compose them while canceling the aliasing components of those four (4) signals. Thus, for each of the pixels to be produced, a sum is calculated upon the products obtained by multiplying each coefficient on a pixel value of the corresponding pixel, which is owned by each of the four (4) signals mentioned above; thereby producing a new pixel value for the high-resolution video or picture. Conducting this, for each of the pixels of the video or picture to be produced, enables to produce the high-resolution video or picture.

With this, for the video signal processing apparatus according to the embodiment 1, it is possible to produce the high-resolution video or picture from the input video having less aliasing components therein, with using two (2) pieces of the input video frames, less than that of the prior arts.

Also, the video signal processing apparatus according to the embodiment 1, because of using two (2) pieces of the input video frames therein, less than that in the prior arts, then it is possible to reduce an amount or volume of video processing necessary thereto. With this, it is possible to achieve the video signal processing apparatus, for producing the video higher in the resolution than the input video, having less aliasing components therein, but with a cost lower than that of the prior arts.

Embodiment 2

Next, explanation will be made on an embodiment 2 of the present invention, by referring to FIGS. 18 and 14.

The embodiment 2 relates to the video signal processing method for achieving the processing, being equivalent to the video signal processing in the video signal processing apparatus according to the embodiment 1, by means of the controller portion cooperating with the software.

First of all, explanation will be given on the video signal processing apparatus for achieving the video signal processing method according to the present embodiment, by referring to FIG. 18 attached herewith. The video signal processing apparatus shown in FIG. 18 comprises an input portion (1), to which a video signal is inputted, such as, a television broadcast signal, etc., for example, a memory portion (11) for memorizing software therein, for processing the signal inputted from the input portion (1), a controller portion (10) for conducting the video signal processing upon the signal inputted from the input portion (1) cooperating with the software memorized in the memory portion (11), a frame buffer #1 (21) and a frame buffer #2 (22), each to be used as a buffer by the controller unit (10) in the processing of that video signal, and a buffer #3 (23) for frame buffering the signal after video signal processing, to be outputted from the controller portion (10) to an output portion (3).

Figure 18:
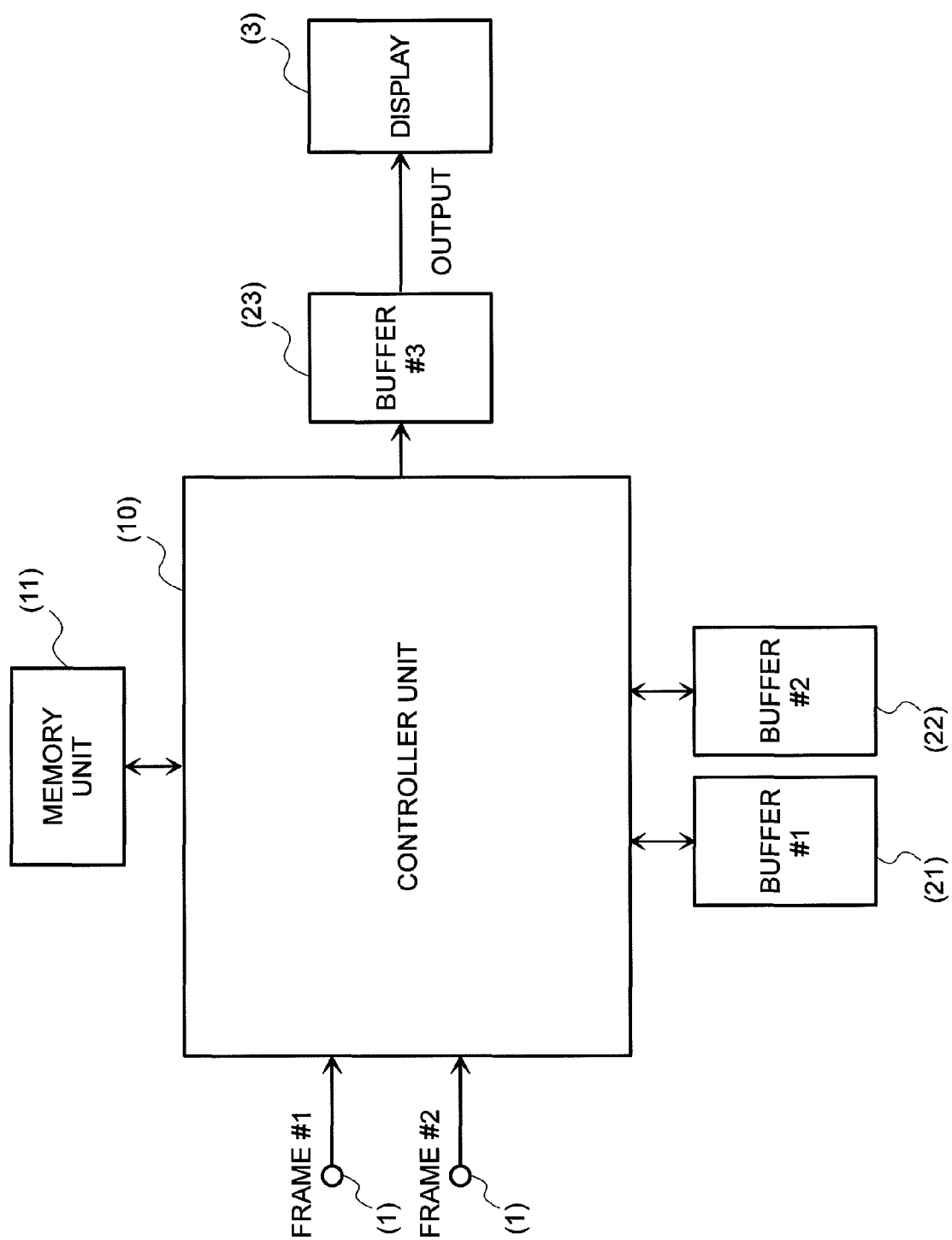
FIG. 18 is a view for explaining the embodiment 2, according to the present invention.

Herein, the number of the input portions (1) provided on the video signal processing apparatus shown in FIG. 18 is two (2), being equal to the number of frames to be used in the video processing, but may be only one (1) of the input portion (1) for inputting the two (2) frames, continuously or in series.

Also, the frame buffer #1 (21) and the frame buffer #2 (22) for use of the data buffer, and also the memory portion (11) for memorizing the software therein, may be constructed with using the individual chips thereof, respectively, or with using one (1) piece of memory chip or a plural number of memory chips, while using it/them dividing each data address thereof.

In the present embodiment, on the video signal inputted from the input portion (1), the controller portion (10) conducts the video signal processing in cooperation with the software memorized in the memory portion (11), and outputs it to the display portion (3). The details of that video signal processing will be explained by referring to FIG. 14.

Figure 14:
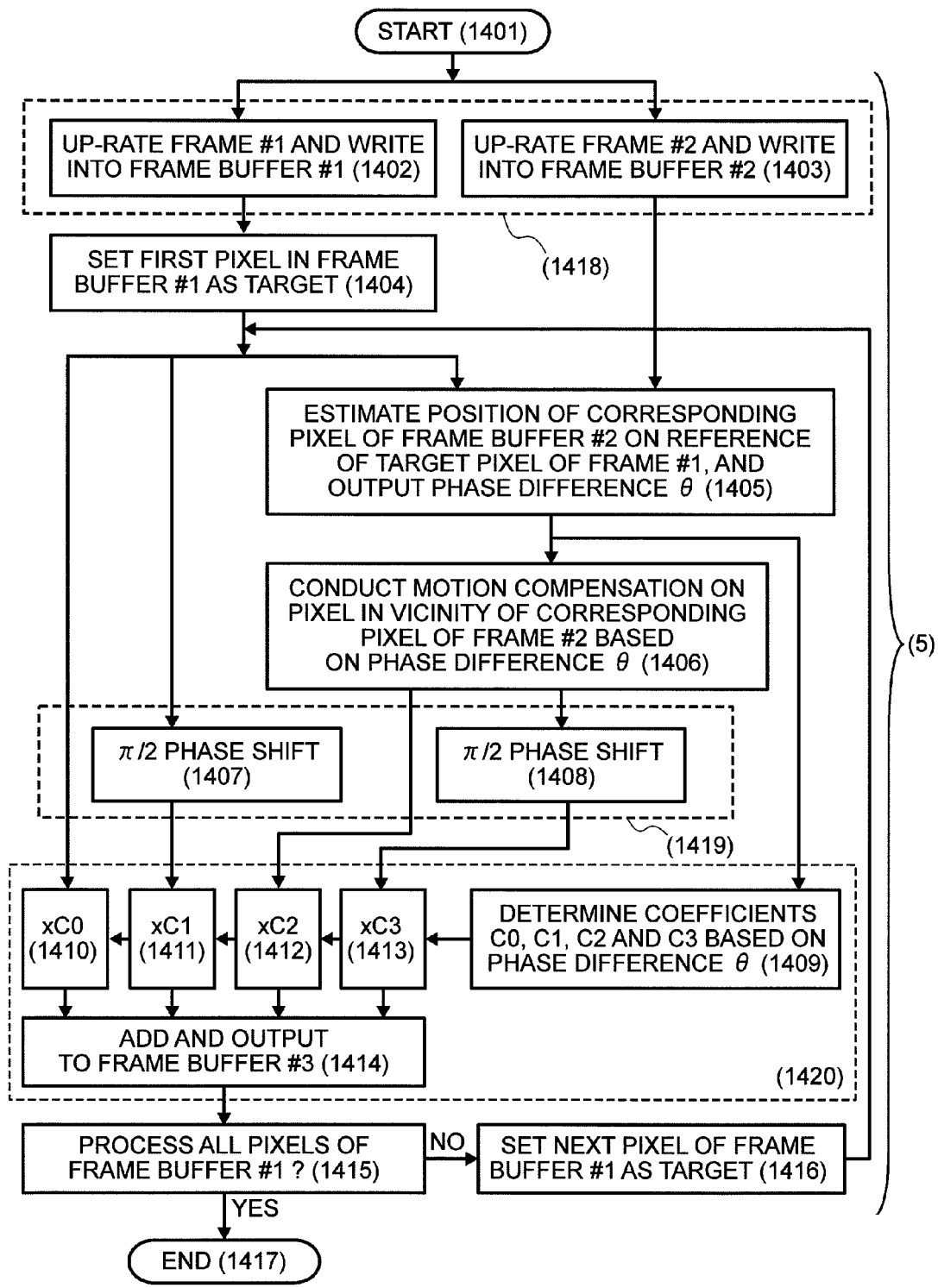
FIG. 14 is a view for explaining an embodiment 2, according to the present invention.

FIG. 14 shows an example of flowchart of the video signal processing method, according to the present invention. The flowchart shown in FIG. 14 starts from a step (1401), and the video data of each of the frames are up-rated up to two (2) times in a step (1418). Thus, in a step (1402) is up-rated the video data of the frame #1 to be written into the frame buffer #1, and in a step (1402) is up-rated the video data of the frame #2 to be written into a frame buffer #2. Herein, the up-rating can be achieved by writing data for every second pixel after once clearing values of each of the frame buffers to zero (0).

Next, in a step (1404), the first pixel (for example, the pixel at the upper left) of the frame buffer #1 is set to be the processing target, and then the processing is looped until the processing is completed upon all the pixel data with respect to the frame buffer #1.

In a step (1405), estimation is made on a position of the corresponding pixel within the frame buffer #2, upon basis of the target pixel of the frame buffer #1, and thereby outputting the phase difference $\theta$. In this instance, as the method for estimating the position of the corresponding pixel can be applied the prior art mentioned above, as it is.

In a step (1406), upon basis of the phase difference $\theta$ obtained in the step (1405), motion compensation is conducted upon the pixels in the vicinity of the corresponding pixel within the frame buffer #2. In this instance, as the pixels in the vicinity thereof, the compensation may be made on the video data to be used in the process of $\pi/2$ phase shifting in a step (1408), i.e., only the pixel data within a region where the infinite tap number acts. The operation of this motion compensation is same to that explained by referring to FIGS. 5 and 6.

Following to the above, in a step (1419) is conducted phase shifting by a predetermined amount upon the frame buffer #1 and the frame buffer #2, on which the motion compensation is made. Thus, in the steps (1407) and (1408), the pixel data within each of the frame buffers is shifted by $\pi/2$ phase.

Following to the above, in a step (1420), the pixel data of the frame buffers #1 and #2 are removed from the aliasing components thereof, by conducting multiplication upon the output data, respectively, with using the coefficients C0, C1, C2, and C3, which are determined so as to satisfy the conditions shown in FIGS. 9A, 9B and 9C upon basis of the phase difference $\theta$, and adding them, thereby to be outputted to a frame buffer #3. Thus, in a step (1409), the coefficients C0, C1, C2 and C3 are determined upon basis of the phase difference $\theta$, and are multiplied with the pixel data of the frame buffers #1 and #2 and the data after the $\pi/2$ phase shifting, respectively, in the steps (1410), (1411), (1412) and (1413), and thereafter all of them are added to be outputted to the frame buffer #3. The operation of removing the aliasing component is same to that explained by referring to FIG. 9 in the above.

Following to the above, in a step (1415), determination is made on whether the processing is completed or not on all pixels of the frame buffer #1. If determining that it is not completed, after setting the next pixel (for example, the pixel at the right-hand neighbor) as the processing target in a step (1416), the process turns back to those in the steps (1405) and thereafter. On the other hand, if determining that it is completed, the process is ended in a step (1417).

After completing the video signal processing of the flowchart shown in FIG. 14, the signal buffered in the frame buffer #3 shown in FIG. 18 can be outputted to the display portion (3) by a unit of frame or a unit of pixel.

With such the processing as was mentioned above, it is possible to output a high-resolution signal to the frame buffer #3, with using the pixel data of the frame buffer #1 and the frame buffer #2. In case when applying to the moving picture, it is enough to repeat the processes, for each frame, starting from the step (1401) and reaching to the step (1417).

Further, with the video signal processing method according to the embodiment 2, it is also possible to confirm the operational differences from the prior arts mentioned above, in the similar manner to the explanation of FIG. 17, however since the result thereof is similar to that of the embodiment 1, the explanation thereof will be omitted.

With the video signal processing apparatus, according to the embodiment 2 mentioned above, two (2) signals are produced from each of the video signals, by conducting the phase sifting upon each video signals of two (2) pieces of input video frames, less than that of the prior arts. With this, it is possible to produce four (4) signals from the video signals of the two (2) pieces of input video frames. Herein, upon basis of the phase difference between those two (2) pieces of the input video frames, coefficients are calculated for each of those four (4) signals, so as to compose them while canceling the aliasing components of those four (4) signals. Thus, for each of the pixels to be produced, a sum is calculated upon the products obtained by multiplying each coefficient on a pixel value of the corresponding pixel, which is owned by each of the four (4) signals mentioned above; thereby producing a new pixel value for the high-resolution video or picture. By conducting this for each of the pixels of the video or picture to be produced, it is possible to produce the high-resolution video or picture.

With this, for the video signal processing apparatus according to the embodiment 2, it is possible to produce the high-resolution video or picture from the input video having less aliasing components therein, with using two (2) pieces of the input video frames, less than that of the prior arts.

Also, the video signal processing apparatus according to the embodiment 2, because of using two (2) pieces of the input video frames therein, less than that in the prior arts, then there can be obtained an effect of enabling to reduce an amount or volume of video processing necessary thereto.

Embodiment 3

FIG. 10 shows an embodiment 3 according to the present invention. The structures shown in this figure are obtained by simplifying the structures shown in FIG. 1, with using the relationship among the coefficients C0, C1, C2 and C3 shown in FIG. 9C. Thus, since $C0=C2=\frac{1}{2}$ and $C1=-C3=-(1+\cos\theta)/2\sin\theta$, the signals of sum and difference are produced by means of an adder (1001) and a subtractor (1004), from the frame #1 and the frame #2 after the motion compensation and up-rating. With the sum signal, after passing through an fs cut-off filter (1002), it is inputted into an adder (1008) with multiplying by C0 (=0.5) within a multiplier (1003). Herein, the fs cut-off filter (1002) is for cutting off the components of the sampling frequency (fs) before up-rating as a zero point, and it can be achieved by using the tap coefficients shown in (1011) of FIG. 10, for example. The propose of providing this fs cut-off filter (1002) lies to prevent unnecessary component of frequency fs from remaining, since the aliasing component cannot be removed from, because the gain comes down to zero point at the frequency fs on the "frequency-gain" characteristics of the Hilbert Transformer (1005), as shown in FIG. 7A. Accordingly, if applying a means for enabling $\pi/2$ phase shifting, including the component of frequency fs, in the place of the Hilbert Transformer (1005), then this fs cut-off filter (1002) is unnecessary.

On the other hand, the difference signal, after being shifted in the phase by a predetermined amount ($=\pi/2$) within the Hilbert Transformer (1005), is multiplied by the coefficient C1, which is determined upon basis of the phase difference (102) within a coefficient determining portion (1007), within the adder (1008), thereby obtaining an output. Herein, a phase shift portion (1009), comprising the delay device (1002) and the Hilbert Transformer (1005), can be achieved with a circuit scale being half ($\frac{1}{2}$) of the phase shift portion (116) shown in FIG. 1. Also, it is enough for the coefficient determining portion (1007) to output the coefficient C1 shown in FIG. 9C, then an aliasing component removal portion (1010), including the adder (1001), the subtractor (1004), the multipliers (1003) and (1006), the adder (1008) and the coefficient determining portion (1007), can be reduced of the number of pieces of the multipliers, and therefore it can be achieved with the circuit being smaller in the scale than that of the aliasing component removal portion (117) shown in FIG. 1.

Further, with the video signal processing method according to the embodiment 3, it is also possible to confirm the operational differences from the prior arts mentioned above, in the similar manner to the explanation of FIG. 17, however since the result thereof is similar to that of the embodiment 1, the explanation thereof will be omitted.

Also, the video signal processing apparatus and the video signal processing method according to the embodiment 3 may be applied in, for achieving the high resolution in the vertical direction and the oblique direction.

With the video signal processing apparatus according to the embodiment 3, which was explained in the above, in addition to the effects of the video signal processing apparatus according to the embodiment 1, it can be obtained by a circuit being smaller in the scale than that of the video signal processing apparatus according to the embodiment 1, and therefore it can be achieve with the cost much lower than that.

Embodiment 4

Explanation will be made on an embodiment 4 according to the present invention, by referring to FIG. 15.

The embodiment 4 relates to the video signal processing method for achieving the processing, being equivalent to the video signal processing in the video signal processing apparatus according to the embodiment 3, by means of the controller portion cooperating with the software. Since the video signal processing apparatus for conducting the video signal processing method of the present embodiment is the video signal processing apparatus shown in FIG. 18, similar to the embodiment 2, then the explanation thereof will be omitted herein.

Figure 15:
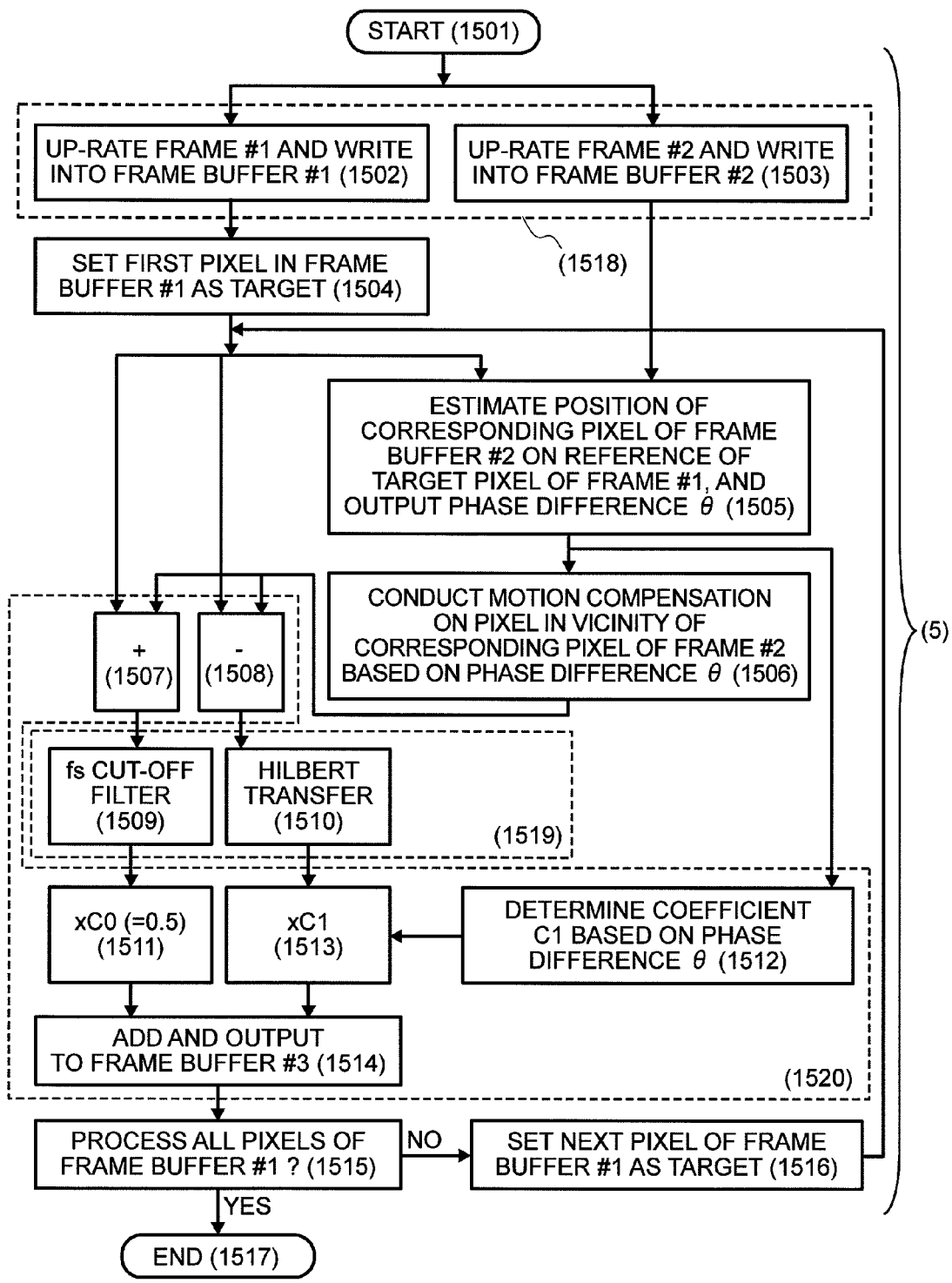
FIG. 15 is a view for explaining an embodiment 4, according to the present invention.

FIG. 15 shows an example of the flowchart of the operations of the present embodiment. The flowchart starts from a step (1501), and in a step (1518) it up-rates the video data of each frame. Thus, in a step (1502) is up-rated the video data of the frame #1 to be written into the frame buffer #1, and in a step (1503) is up-rated the video data of the frame #2 to be written into a frame buffer #2. Herein, the up-rating can be achieved by writing data for every second pixel after once clearing values of each of the frame buffers to zero (0).

Next, in a step (1504), the first pixel (for example, the pixel at the upper left) of the frame buffer #1 is set to be the processing target, and then the processing is looped until the processing is completed upon all the pixel data with respect to the frame buffer #1.

In a step (1505), estimation is made on a position of the corresponding pixel within the frame buffer #2, upon basis of the target pixel of the frame buffer #1, thereby outputting the phase difference θ. In this instance, as the method for estimating the position of the corresponding pixel can be applied the prior art mentioned above, as it is.

In a step (1506), upon basis of the phase difference θ obtained in the step (1405), motion compensation is conducted upon the pixels in the vicinity of the corresponding pixel within the frame buffer #2. In this instance, as "the pixels in the vicinity" thereof, the compensation may be made on the video data to be used in the process of the Hilbert Transform in a step (1510), i.e., only the pixel data within a region where the infinite tap number acts. The operation of this motion compensation is same to that explained by referring to FIGS. 5 and 6.

Following to the above, in a step (1520), the pixel data of the frame buffers #1 and #2 are removed the aliasing components thereof, upon basis of the phase difference θ, and are outputted to the frame buffer #3. First, in a step (1507), the value of the pixel data in the frame buffer #1 and the value of the pixel data in the frame buffer #2, upon which the motion compensation is made, are added, and are cut off the components of frequency fs in a step (1509). The function of this fs cut-off filter (1509) is same to that (1002) shown in FIG. 10.

Also, in a step (1508), the value of the pixel data in the frame buffer #2, upon which the motion compensation is made, is subtracted from the value of the pixel data in the frame buffer #1. Herein, upon the result of that subtraction is made the phase shifting by a predetermined amount, in a step (1519). Thus, in the similar manner, also with using the data in vicinity of the subtraction, the Hilbert Transformation is conducted in a step (1510). The operation of this phase shifting is same to that explained by referring to FIGS. 7 and 8 mentioned above.

Following to the above, the data after the addition mentioned above is multiplied by the coefficient C0 (=0.5) in a step (1511), as well as, the coefficient C1 is determined upon basis of the phase difference θ. In a step (1513), the coefficient C1 and the data after the Hilbert Transformation are multiplied, and thereafter both data are added in a step (1514) to be outputted into the frame buffer #3. The operation of removing the aliasing component is same to that explained by referring to FIG. 10.

Following to the above, in a step (1515), determination is made on whether the processing is completed or not upon all pixels of the frame buffer #1. If not yet completed, after setting up the next pixel (for example, the pixel at the right-hand neighbor), the process turns back those steps (1505) and thereafter, on the other hand, if it is completed, the process is ended in a step (1517).

After completing the video signal processing of the flowchart shown in FIG. 14, the signal buffered in the frame buffer #3 shown in FIG. 18 can be outputted to the display portion (3) by a unit of frame or a unit of pixel.

With such the processing as was mentioned above, it is possible to output a high-resolution signal to the frame buffer #3. In case when applying to the moving picture, it is enough to repeat the processes starting from the step (1501) and reaching to the step (1517).

Further, with the video signal processing method according to the embodiment 4, it is also possible to confirm the operational differences from the prior arts mentioned above, by referring to FIG. 17, however since the result thereof is similar to that of the embodiment 1, the explanation thereof will be omitted.

Also, the video signal processing apparatus and the video signal processing method according to the embodiment 4 may be applied in, for achieving the high resolution in the vertical direction and the oblique direction.

The video signal processing method according to the embodiment 4, which was explained in the above, has the effect of achieving the high resolution of video signal, as similar to the video signal processing method according to the embodiment 2. Further, with the video signal processing method according to the embodiment 4, comparing to the video signal processing method according to the embodiment 2, it has an effect of enabling to achieve the signal processing similar thereto, but with the processes, smaller number than that of the video signal processing according to the embodiment 2, by making contents of a part of the processing steps in common.

Embodiment 5

Figure 11:
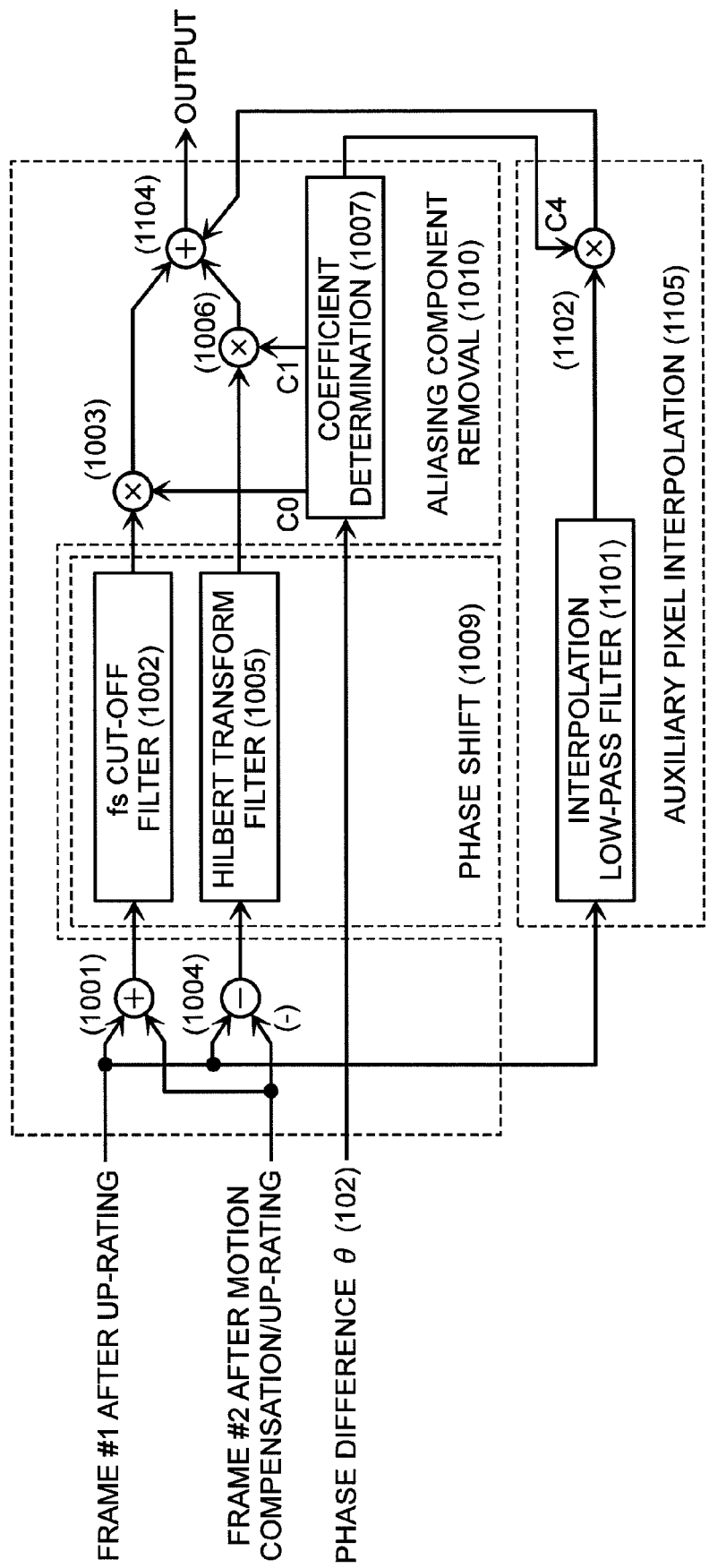
FIG. 11 is a view for explaining an embodiment 5, according to the present invention.

FIG. 11 shows an embodiment 5 according to the present invention. The structures shown in this figure is constructed upon basis of the structures shown in FIG. 10, enabling to change an output from the auxiliary pixel compensation portion (1105) when the phase difference θ comes close to zero (0), for the purpose of preventing the coefficients C1 and C3 from becoming unstable when the phase difference θ is zero (0), as shown in FIG. 9D, and/or preventing the coefficients C1 and C3 from becoming weak against noises due to becoming large as the phase difference θ comes close to zero (0). Thus, a general interpolation low-pass filter (1101) is prepared as a bypass route, while C4 is newly produced other than the above-mentioned coefficients C0 and C1 within the coefficient determining portion (1103), and an output of the interpolation low-pass filter (1101) is multiplied by the coefficient C4 within the multiplier (1102), and thereafter it is outputted after being added onto the signal of high resolution within the adder (1104).

Structures other than the interpolation low-pass filter (1101), the multiplier (1102), the coefficient determining portion (1103), the adder (1104) and the auxiliary pixel compensation portion (1105) are same to those of the embodiment 3 shown in FIG. 10, therefore the explanation thereof will be omitted.

Figure 12:
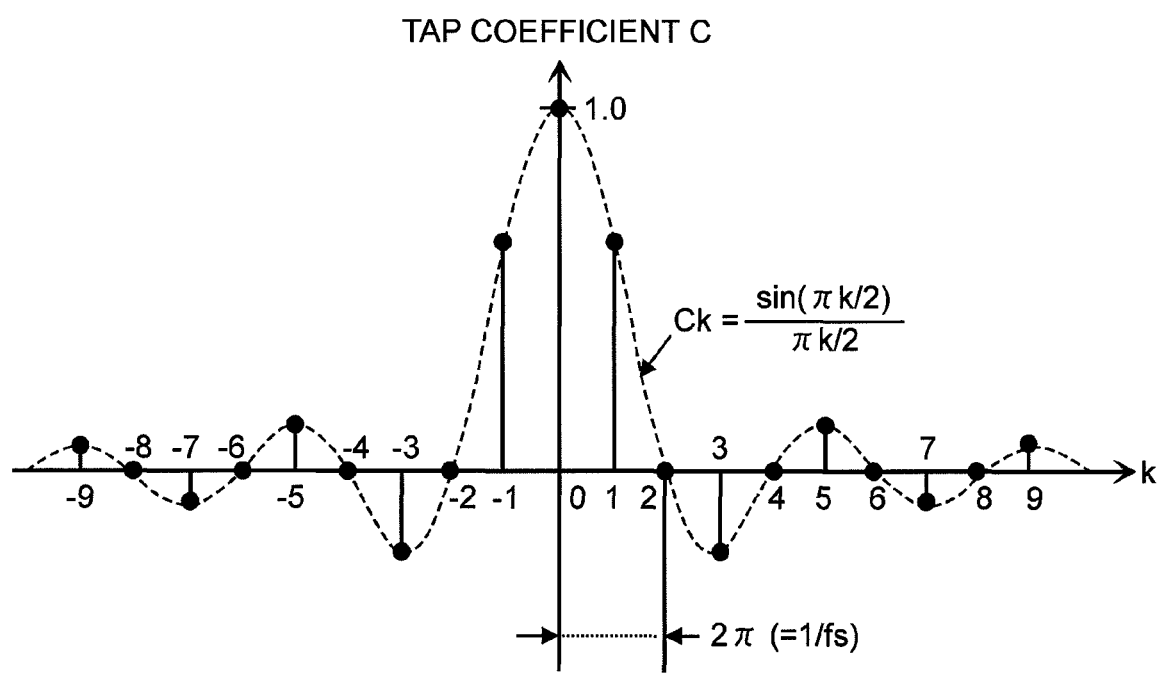
FIG. 12 is a view for explaining the embodiment 5, according to the present invention.

FIG. 12 shows a detailed example of the interpolation low-pass filter (1101) to be applied in the third embodiment, according to the present invention. This FIG. 12 shows the tap coefficients of filters obtained through the Fourier inversion of the frequency characteristics, taking a half (½) of the original sampling frequency fs as the cut-off frequency. In this instance, each of the tap coefficients Ck (however, k: an integer) comes to be a general sinc function, and therefore it is enough to put $Ck=\sin(\pi k/2)/(\pi k/2)$.

FIG. 13 shows the detailed example of the coefficient determining portion or unit (1103) to be applied into the embodiment 5 of the present invention. In this figure is shown operation of, although the new coefficient C4 is usually zero (0) upon basis of the coefficients C0 and C1 shown in FIG. 9D, however setting values of the coefficients C0 and C1 to zero (0), compulsively, when the phase difference θ comes close to zero (0), as well as, setting the value of the coefficient C4 to 1.0. With this operation, in the structures shown in FIG. 11, it is possible to change an output of the adder (1104) to an output of the interpolation low-pass filter (1101), automatically, when the when the phase difference θ (102) comes close to zero (0). However, it is also possible to change the coefficients from those shown in FIG. 12 to those shown in FIG. 13, continuously, accompanying with approaching of the difference θ to zero (0). Also in case when determining that the pixel corresponding to the pixel as the processing target on the frame #1 does not lie on the frame #2, it is possible to change the output of the adder (1104) to an output of the interpolation low-pass filter (1101), automatically, by controlling the respective coefficients, in the similar to that when the phase difference θ (102) comes close to zero (0).

Further, with the video signal processing method according to the embodiment 5, it is also possible to confirm the operational differences from the prior arts mentioned above, by referring to FIG. 17, however since the result thereof is similar to that of the embodiment 1, the explanation thereof will be omitted.

Also, the video signal processing apparatus and the video signal processing method according to the embodiment 5 may be applied in, for achieving the high resolution in the vertical direction and the oblique direction.

With the video signal processing apparatus according to the embodiment 5, which was explained in the above, in addition to the effects of the video signal processing apparatus according to the embodiment 3, there can be achieved an effect of enabling to obtain an output video, being stable comparing to the video signal processing apparatus according to the embodiment 3, i.e., without becoming unstable even when the phase difference θ (102) comes to zero (0) or in the vicinity of zero (0) (i.e., at a standstill or almost at a stand still) or when it is determined that there is no pixel on the frame #2 corresponding to the pixel of the processing target on the frame #1.

Embodiment 6

Explanation will be made on a video signal processing method according to an embodiment 6 of the present invention, by referring to FIG. 16.

The embodiment 6 relates to the video signal processing method for achieving the processing, being equivalent to the video signal processing in the video signal processing apparatus according to the embodiment 5, by means of the controller portion cooperating with the software. Since the video signal processing apparatus for conducting the video signal processing method of the present embodiment is the video signal processing apparatus shown in FIG. 18, similar to the embodiment 2, then the explanation thereof will be omitted herein.

Figure 16:
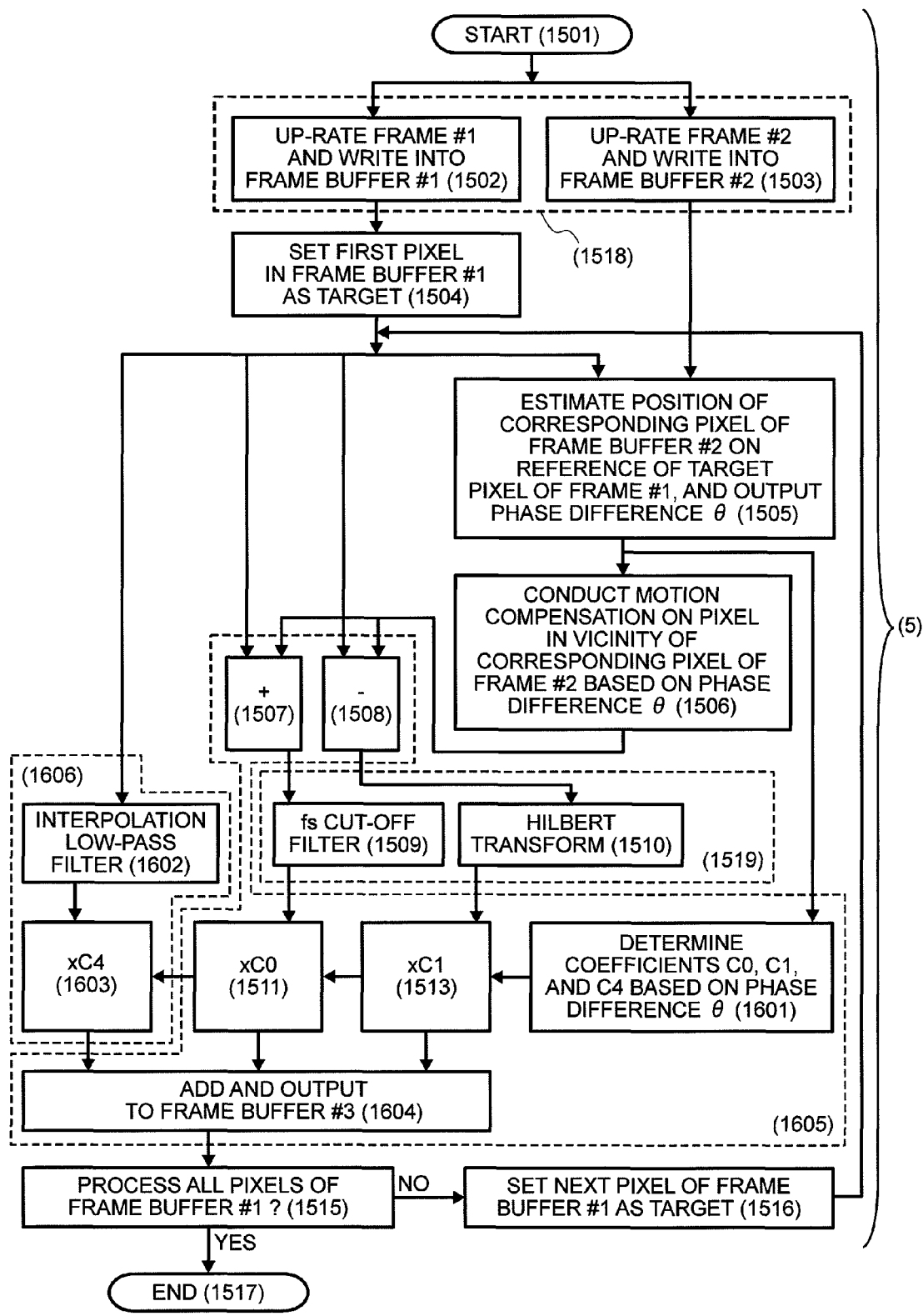
FIG. 16 is a view for explaining an embodiment 6, according to the present invention.

FIG. 16 shows an example of flowchart of the operations of the present embodiment. The processing steps and the operations shown in this figure are made, so that a processing result of a step (1606) is outputted into the frame buffer #3 when the phase difference θ comes close to zero (0), upon basis of the processing steps shown in FIG. 15, for the purpose of preventing the coefficients C1 and C3 from becoming unstable when the phase difference θ is zero (0), as shown in FIG. 9D, and/or preventing the coefficients C1 and C3 from becoming weak against noises due to becoming large as the phase difference θ comes close to zero (0). Thus, the coefficients C0, C1 and C4 are determined upon basis of the phase difference θ in a step (1601), and a general interpolation low-pass filtering process is conducted with using the pixel data as target within the frame buffer #1 and the pixel data in the vicinity thereof, in a step (1602). Thereafter, multiplication is made by the coefficient C4 in a step (1603), and then addition is made with the outputs of the steps (1511) and (1513) in a step (1604), thereby to be outputted into the frame buffer #3.

Since steps others than those are same to the processing steps shown in FIG. 15, which was explained in the embodiment 4, then the explanation thereof will be omitted herein. Further, since the operation of determining the coefficients in the step (1601) is also same to that explained by referring to FIG. 13 mentioned above, therefore the explanation thereof will be omitted. And, also the operation of the interpolation low-pass filter in the step (1602) is same to the operation shown by referring to FIG. 12 mentioned above, therefore the explanation thereof will be omitted.

Further, with the video signal processing method according to the embodiment 6, it is also possible to confirm the operational differences from the prior arts mentioned above, by referring to FIG. 17, however since the result thereof is similar to that of the embodiment 1, the explanation thereof will be omitted.

Also, the video signal processing apparatus and the video signal processing method according to the embodiment 6 may be applied in, for achieving the high resolution in the vertical direction and the oblique direction.

With the video signal processing apparatus according to the embodiment 6, which was explained in the above, in addition to the effects of the video signal processing apparatus according to the embodiment 4, there can be achieved an effect of enabling to obtain an output video, being stable comparing to the video signal processing apparatus according to the embodiment 4, i.e., without becoming unstable even when the phase difference θ (102) comes to zero (0) or in the vicinity of zero (0) (i.e., at a standstill or almost at a stand still) or when it is determined that there is no pixel on the frame #2 corresponding to the pixel of the processing target on the frame #1.

Embodiment 7

Figure 20:
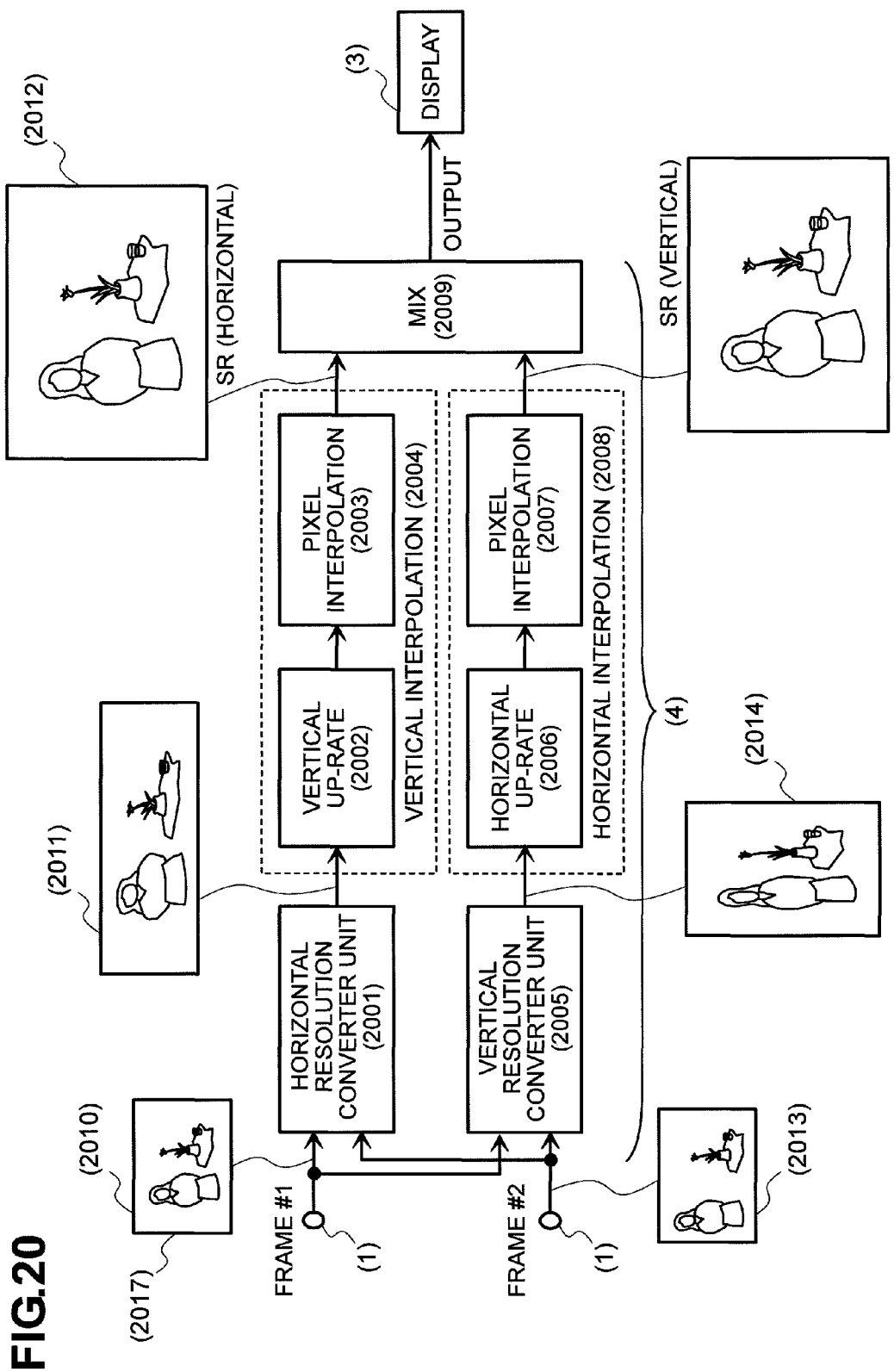
FIG. 20 is a view for explaining an embodiment 7, according to the present invention.

FIG. 20 shows a video signal processing apparatus, according to an embodiment 7 of the present invention. The video signal processing apparatus, according to the present embodiment, comprises: an input unit or portion (1), into which a train of frames of moving picture is inputted, such as, the television broadcast signal, for example, a resolution converter unit or portion (4) for combining the frames inputted from this input portion (1) in the horizontal/vertical directions, so as to achieve 2-dimensional high resolution thereof, and further a display unit or portion (3) for displaying a picture thereon, upon basis of the frames, on which the high resolution is achieved in this resolution converter unit (4).

In this resolution converter unit (4), resolution conversion is conducted in the horizontal direction and the vertical direction, respectively, and the component(s), being large in an effect of improving the resolution among the respective results thereof, is/are outputted, selectively or combined with, thereby achieving the 2-dimensional high resolution. Hereinafter, explanation will be given on the details of the resolution converter unit (4).

In FIG. 20, upon the basis of the frame #1 (2010) and the frame #2 (2013), which are inputted into the input unit (1), with using a horizontal resolution converter unit or portion (2001) and a vertical resolution converter unit or portion (2005), there are produced a frame (2011), which is increased in the pixel number in the horizontal direction, and a frame (2014), which is increased in the pixel number in the vertical direction.

Herein, each of the resolution converter units (2001) and (2005) conducts the signal processing in the horizontal direction or the vertical direction, respectively, with using the structures of the resolution converter unit (2) shown in FIG. 1. In this instance, within the horizontal resolution converter unit (2001), the up-raters (103) and (104), the delay devices (105) and (107), the π/2 phase shifter (106) and (108), which are shown in FIG. 1, are so constructed that they achieve the up-rate in the horizontal direction, the retardation, and π/2 phase shifting, respectively.

In the similar manner, within the vertical resolution converter unit (2005), the up-raters (103) and (104), the delay devices (105) and (107), the π/2 phase shifters (106) and (108), which are shown in FIG. 1, are so constructed that they achieve the up-rate in the vertical direction, the retardation, and π/2 phase shifting, respectively. Those can be practiced with using the operations shown in FIGS. 5-8 and the conventional arts, etc.

However, it can be also achieved with applying the resolution converter unit of the video signal processing apparatus according to the embodiment 3 of the present invention or the resolution converter portion of the video signal processing apparatus according to the embodiment 5 of the present invention, to each of the resolution converter units (2001) and (2005), in the place of the structures of the resolution converter unit of the video signal processing apparatus according to the embodiment 1 of the present invention. In the explanation given hereinafter, the explanation will be made on the assumption of applying the structures of the resolution converter unit of the video signal processing apparatus according to the embodiment 1 of the present invention.

In the present embodiment, assuming that a target to be pictured moves, 2-dimensionally, into the horizontal/vertical directions, the operations shown in FIGS. 1 and 2 are extended into 2-dimensions. Thus, in the position estimation unit (see (101) in FIG. 1) and a motion compensation/up-rate portion or unit (see (115) in FIG. 1) within the horizontal resolution converter unit (2001), 2-dimensional motion compensation is conducted on the target on the frame #2 upon basis of the target on the frame #1, and at the same time, a horizontal phase difference "θH" among the sampling phase differences of the pixels in each frame is used in order to determine a coefficient of the aliasing component removal portion or unit (see (117) in FIG. 1).

In the similar manner, in the position estimation unit (see (101) in FIG. 1) and a motion compensation/up-rate unit (see (115) in FIG. 1) within the vertical resolution converter unit (2005), 2-dimensional motion compensation is conducted on the target on the frame #2 upon basis of the target (2016) on the frame #1, and at the same time, a vertical phase difference "θV" among the sampling phase differences of the pixels in each frame is used in order to determine a coefficient of the aliasing component removal unit (see (117) in FIG. 1). The determination of the coefficient in the aliasing component removal unit (see (117) can be achieved by using the operation shown in FIG. 9, as it is.

Assuming that the target moves in an oblique direction, distortion in the oblique direction should be included within the frame (2011) increasing the pixel number in the horizontal direction by means of the horizontal resolution converter unit (2001), but this distortion is negligible small on a component of the original input signal, which is low in the vertical frequency (i.e., a vertical line or the like). In the similar manner, distortion in the oblique direction should be included within the frame (2014) increasing the pixel number in the vertical direction by means of the vertical resolution converter unit (2005), but this distortion is negligible small on a component of the original input signal, which is low in the horizontal frequency (i.e., a horizontal line or the like).

With using such characteristics, the frame (2011), which is increased in the pixel number in the horizontal direction according to the signal processing mentioned above, produces a frame (2012) by means of a vertical interpolator unit (2004) comprising a vertical up-rater (2002) and a pixel interpolator (2003), as a SR (horizontal) signal. Herein, as the pixel interpolator (2003), it is possible to use a general vertical low-pass filter, for outputting an averaged value of pixel data up/down the pixel to be interpolated. In the similar manner, the frame (2014), which is increased in the pixel number in the vertical direction, produces a frame (2015) by means of a horizontal interpolator unit (2008) comprising a horizontal up-rater (2006) and a pixel interpolator (2007), as a SR (vertical) signal. Herein, as the pixel interpolator (2003), it is possible to use a general horizontal low-pass filter, for outputting an averaged value of pixel data left/right the pixel to be interpolated.

In this manner, extracting only the low-frequency components while removing the high-frequency components crossing the process target at right angles, with using the pixel compensators (2003) and (2007), it is possible to lower or reduce the ill influences due to the distortions, which age generated when the target moves in the oblique direction, as was mentioned above, down to the negligible small. The SR signal (horizontal) signal and the SR (vertical) signal, which are produced in the processes mentioned above, are combined or mixed with in a mixer (2009), to be an output signal, and it is displayed on the display unit (3).

Herein, the details and the operations of the mixer (2009) will be mentioned. As the mixer (2009) may be applied any one of the three (3) examples of the constructions, which will be shown hereinafter.

Figure 22:
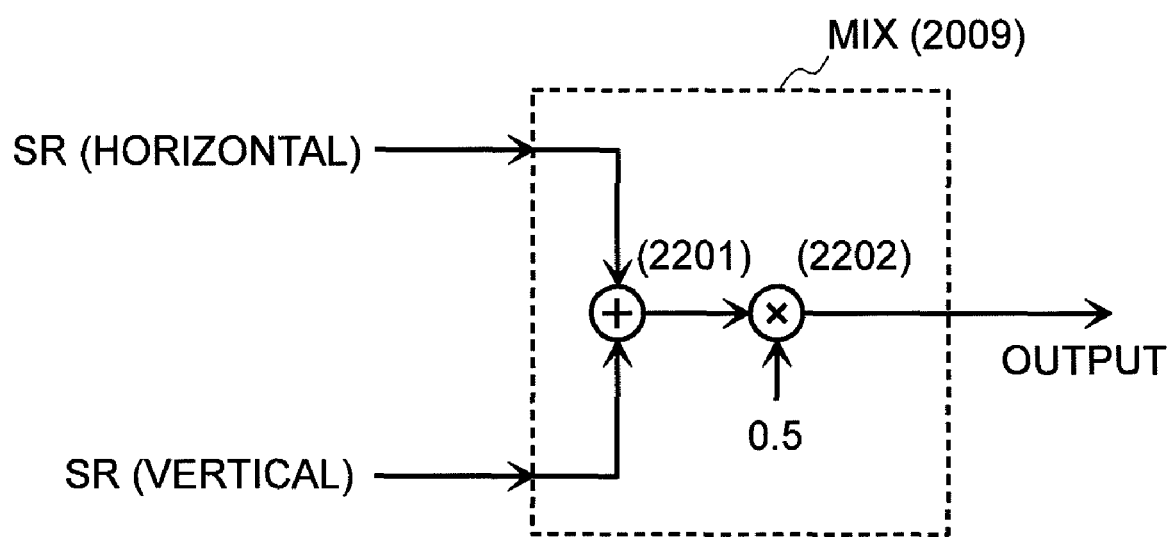
FIG. 22 is a view for explaining the embodiment 7, according to the present invention.

FIG. 22 shows a first example of structures of the mixer (2009). In the same figure, with using an adder (2201) and a multiplier (2201), an averaged value of each one of the signals, i.e., the SR (horizontal) signal and the SR (vertical) signal, which are inputted into the mixer (2009). The structure shown in the same figure is the simplest one of the mixer (2009), but an effect for improving each of resolutions, i.e., the horizontal/vertical directions, comes down to ½, respectively.

Figures 23, 24:
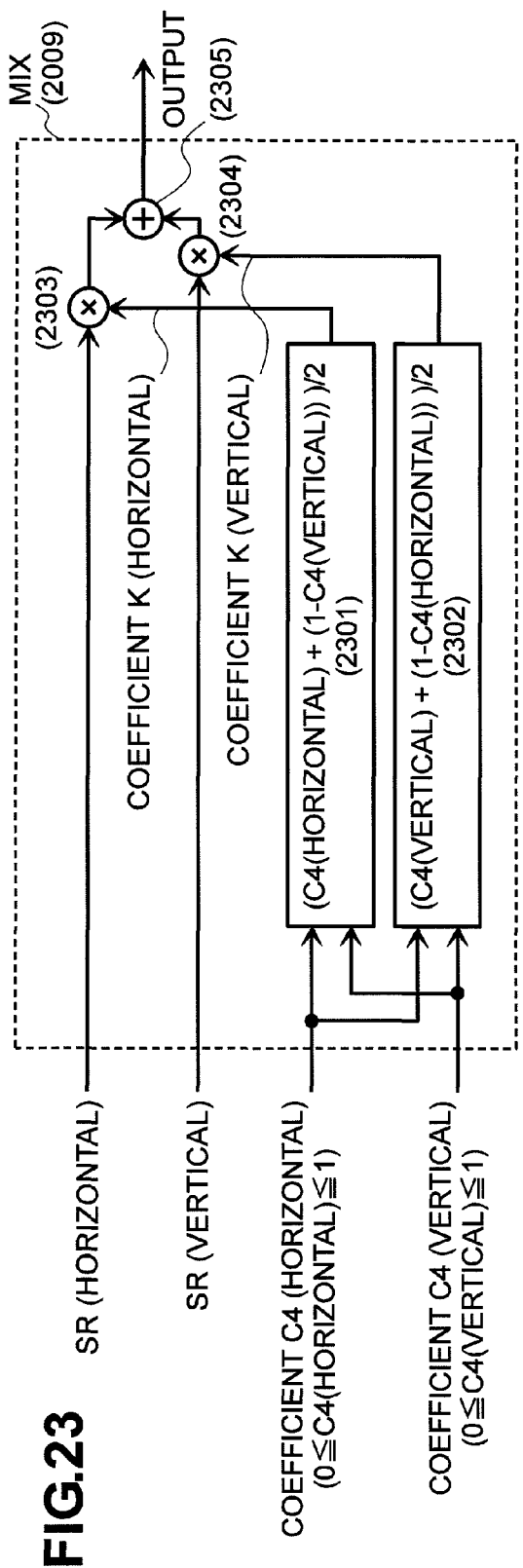
FIG. 23 is a view for explaining the embodiment 7, according to the present invention.
FIG. 24 is a view for explaining the embodiment 7, according to the present invention.

FIG. 23 shows a second example of structures of the mixer (2009). In the same figure, a coefficient "K" (horizontal) and a coefficient "K" (vertical) are multiplied upon the SR (horizontal) signal and the SR (vertical) signal, respectively, with using multipliers (2303) and (2304), and both are added in an adder (2305), to be outputted. The coefficient "K" (horizontal) and the coefficient "K" (vertical) are produced in coefficient determining portions or units (2301) and (2302), respectively. Hereinafter, explanation will be made on the operations of those coefficient determining units (2301) and (2302).

Figure 21:
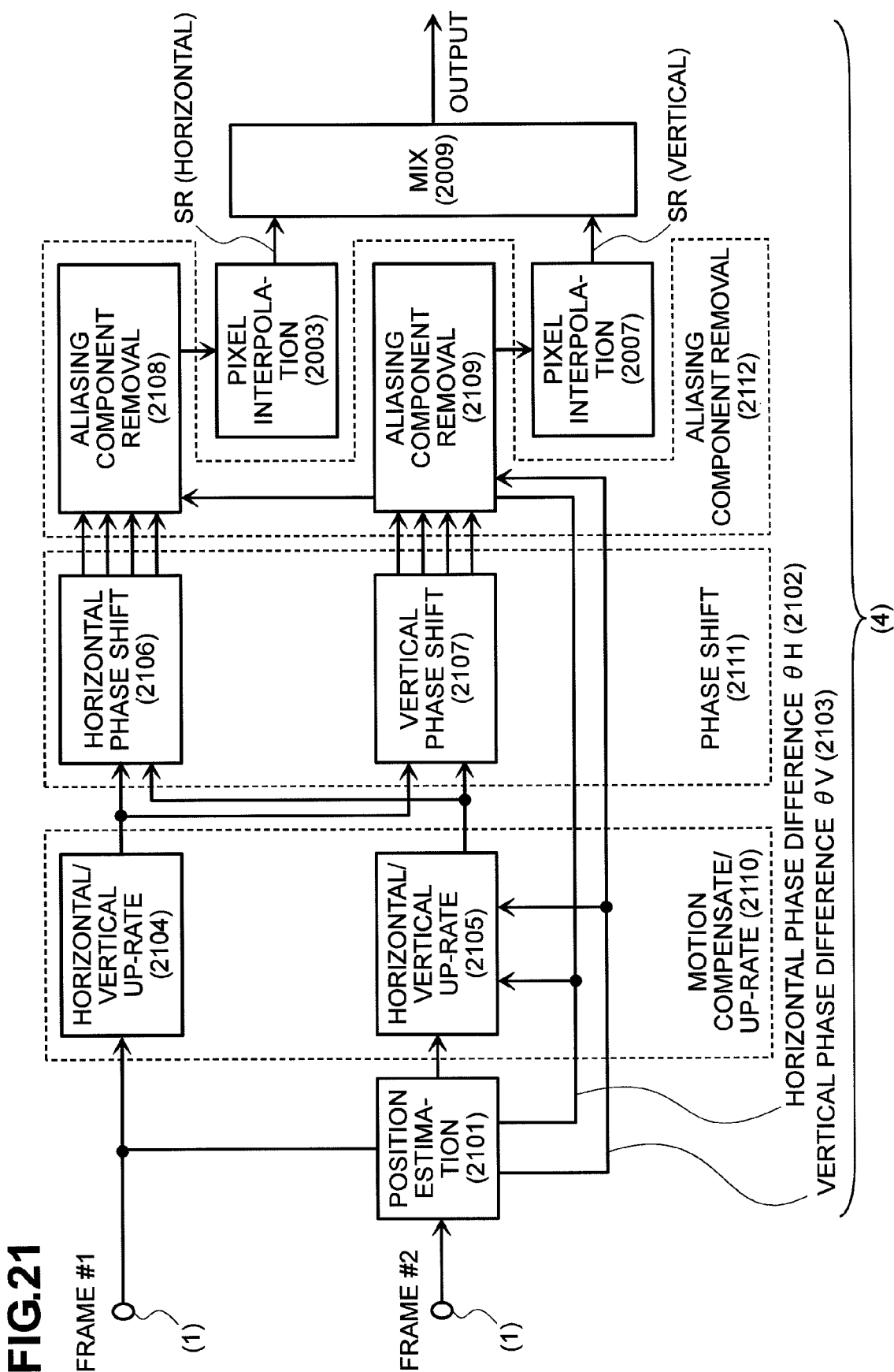
FIG. 21 is a view for explaining an embodiment 8, according to the present invention.

The aliasing component removal units (2108) and (2109) shown in FIG. 21 generate the coefficients C0-C3, which are shown in FIG. 9, in the coefficient determining unit (109) shown in FIG. 1, thereby conducting calculations for removing the aliasing components. In this instance, for the purpose of prevention from becoming weak in noises or the like, due to the fact that the coefficients C1 and C3 comes to be unstable when "θH" (2102) and "θV" (2103) are zero (0), or due to the fact that the coefficients C1 and C3 comes to be large when "θH" (2102) and "θV" (2103) come close to zero (0), it is preferable to introduce the coefficient C4 (0≦C4≦1) shown in FIG. 13, thereby conducting an auxiliary pixel interpolation, as the structures shown in FIG. 11. Paradoxically speaking, there can be obtained the effect of improving the resolution when the value of coefficient C4 is 0.0, but that effect of improving the resolution comes to be small as the value of coefficient C4 comes close to 1.0.

With using this characteristic, the coefficient "K" (horizontal) and the coefficient "K" (vertical) are determined with using the values of the respective coefficients in the horizontal/vertical directions, so that the SR (vertical) as the result of the vertical resolution conversion can be influenced, strongly, when the horizontal phase difference "θH" (2102) is in the vicinity of zero (0) (i.e., the coefficient C4 (horizontal) is in the vicinity of zero (0)) while the SR (horizontal) as the result of the horizontal resolution conversion can be influenced, strongly, when the vertical phase difference "θV" (2103) is in the vicinity of zero (0) (i.e., the coefficient C4 (vertical) is in the vicinity of zero (0)). For achieving this operation, for example, a calculation is done, K(horizontal)=C4 (horizontal)+(1−4C (vertical))/2, in the coefficient determining unit (2301) shown in FIG. 23, to determine K (horizontal), and a calculation is done, K(vertical)=C4(vertical)+(1−4C(horizontal))/2, in the coefficient determining unit (2303), to determine K(vertical).

FIG. 24 shows examples of the outputs (coefficient K (horizontal) and the coefficient C4 (vertical)), collectively, of the coefficient determining units (2301) and (2302), when changing the coefficients C4 (horizontal) and C4 (vertical), respectively. As is shown in the same figure, it operates in such that, when the coefficient C4 (horizontal) comes to be large, the coefficient K (horizontal) comes to be small and at the same time the coefficient K (vertical) comes to be large, on the other hand when the coefficient C4 (vertical) comes to be large, then the coefficient K (horizontal) comes to be large and at the same time the coefficient K (vertical) comes to be small.

When the coefficient C4 is equal to the coefficient C4 (vertical), the coefficient K (horizontal) and the coefficient (vertical) come to be 0.5, respectively. For the coefficients C4 changing horizontally/vertically, independently, in this manner, the coefficient K is so determined that, addition of the coefficient K (horizontal) and the coefficient K (vertical) comes to be just 1.0, to combine the SR (horizontal) and the SR (vertical).

Figure 25:
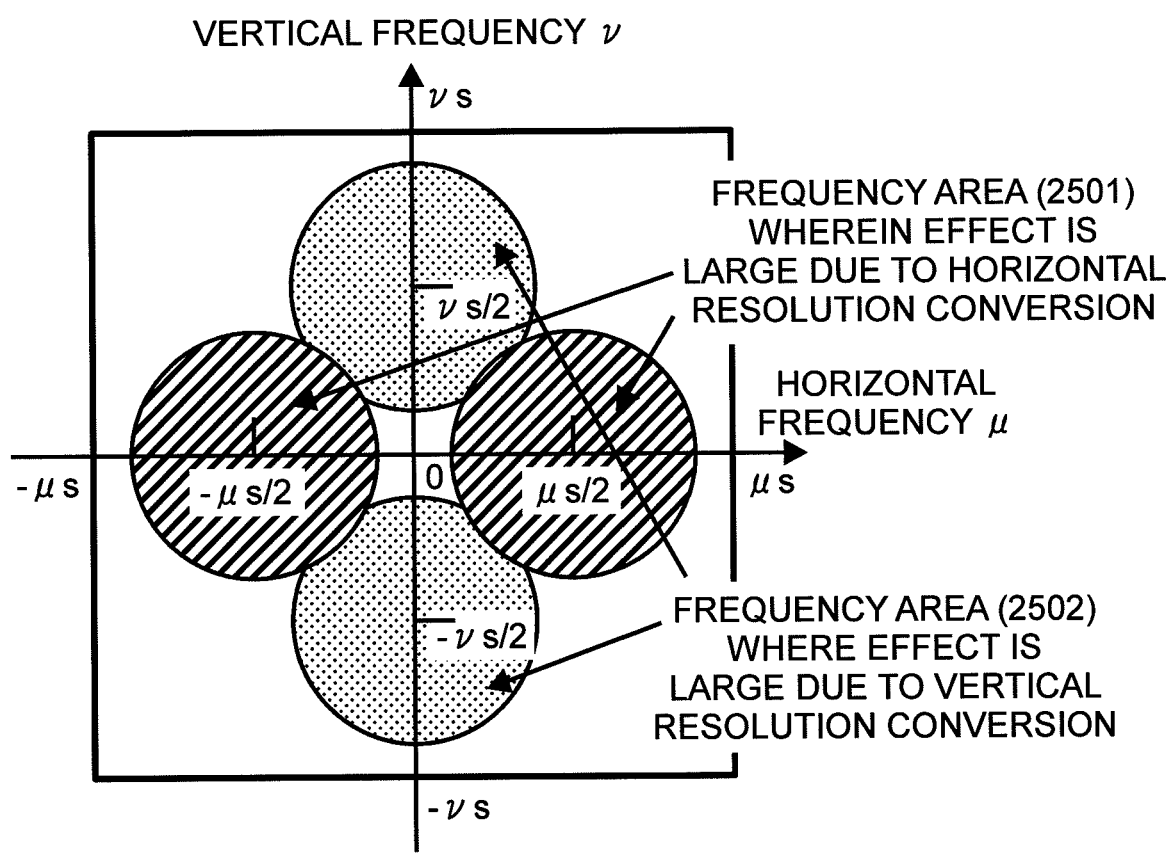
FIG. 25 is a view for explaining the embodiment 7, according to the present invention.

Explanation will be made on examples of a third operation and the structural example of the mixer (2009), by referring to FIGS. 25 and 26, respectively. FIG. 25 shows a 2-dimensional frequency region of showing the horizontal frequency by "μ" and the vertical frequency "ν", respectively. Assuming that the horizontal sampling frequency of an original input picture is "μs" and the vertical sampling frequency thereof is "νs", then an output of the resolution converting unit (4) shown in FIGS. 20 and 21 comes to be a signal, within a region from "−μs" to "+μs" in the horizontal frequency "μ", and within a region from "−νs" to "+νs" in the vertical frequency "ν".

Thought the high-frequency components come to be reproduced through each of the horizontal/vertical resolution conversions, but since the high-frequency components are small on the signal level, inherently, then it is the component of a frequency region (2501) in the vicinity of (μ,ν)=(±μs/2,0), upon which the effect due to the horizontal resolution conversion is large (in particular, the components of regions of the frequency, including (μ,ν)=(+μs/2,0), a region of frequency μ>0, and (μ,ν)=(−μs/2,0), a region of frequency μ<0), and it is the component of a frequency region (2502) in the vicinity of (μ,ν)=(0, ±νs/2), upon which the effect due to the vertical resolution conversion is large (in particular, the components of the regions of frequency, including (μ,ν)=(0,+νs/2), a region of frequency ν>0, and (μ,ν)=(0,−νs/2), a region of frequency ν<0).

Accordingly, by extracting those frequency components (2501) and (2502) through the 2-dimensional filter, to be mixed up, it is possible to output the components, upon which the effect is large of improving the resolution, selectively.

Figure 26:
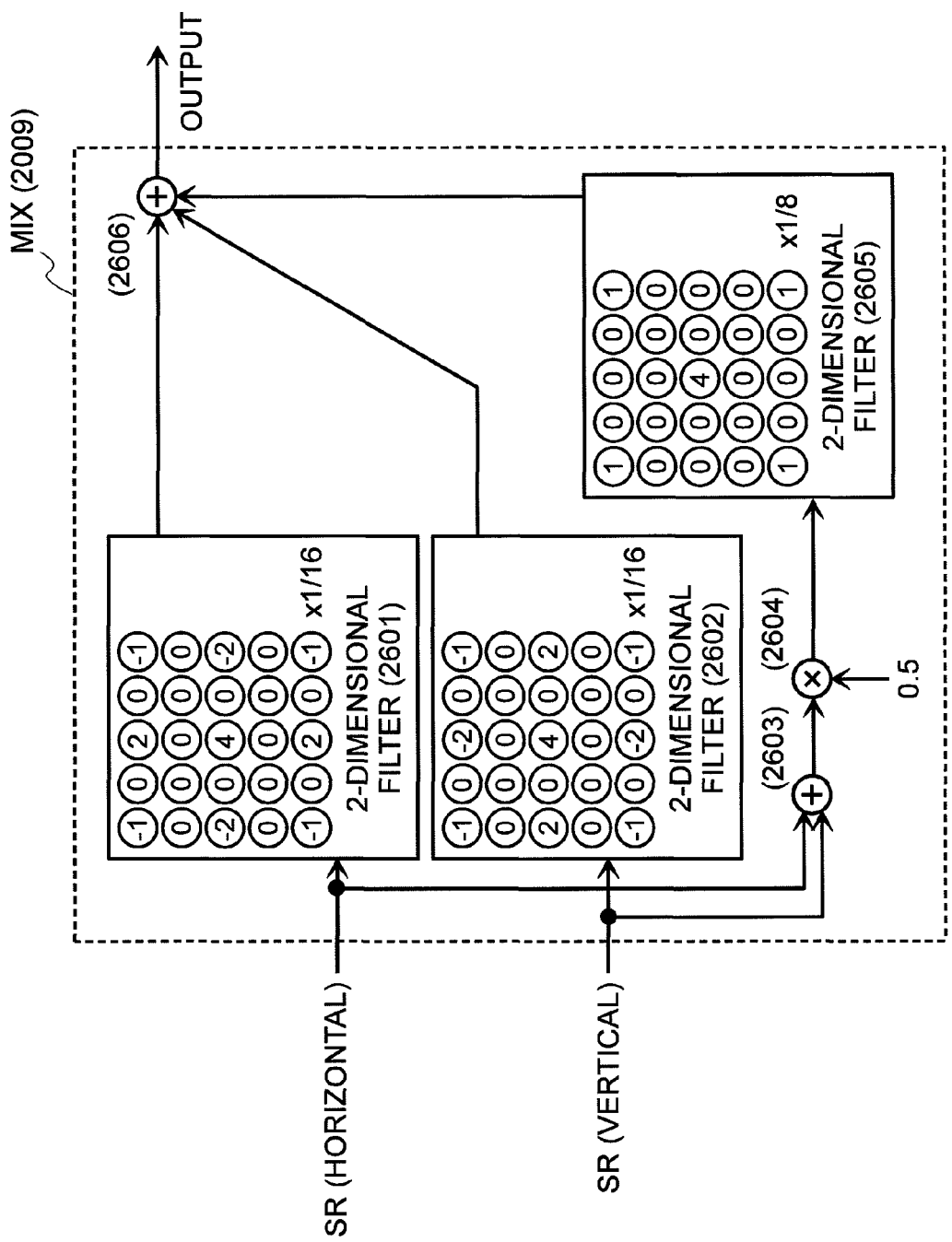
FIG. 26 is a view for explaining the embodiment 7, according to the present invention.

FIG. 26 shows the structural example of the mixer (2009) for extracting the components, upon each of which the effect due to the horizontal/vertical resolution conversion is large. In the same figure, with using a 2-dimensional filter (2601), a component is extracted of the frequency region (2501), which has a large effect of improving the resolution upon the SR (horizontal) inputted into the mixer (2009). In the similar manner, with using a 2-dimensional filter (2602), a component is extracted of the frequency region (2502), which has a large effect of improving the resolution upon the SR (vertical) inputted into the mixer (2009).

As a component other than the frequency regions (2501) and (2502), a signal is produced of an average between the SR (horizontal) and the SR (vertical) with using an adder (2603) and a multiplier (2604), and components other than the respective pass bands of the 2-dimensional filters (2601) and (2602) (i.e., remaining components) are extracted with using a 2-dimensional filter (2605). Each output signal of the 2-dimensional filters (2601), (2602) and (2605) is added within an adder (2606), to be an output of the mixer (2009).

However, a numeral, which is surrounded by a circle, among the 2-dimensional filters (2601), (2602) and (2605) shown in the same figure, shows an example of tap coefficient of the filter, respectively. (The coefficient of each of the filters is inscribed by an integer, for the purpose of simplifying the explanation thereof. The inherent or original value of the coefficient is calculation of the figure surrounded by a circle and "×1/16", etc., which is shown at the right-hand side thereof, i.e., the production. For example, in the 2-dimensional filters (2601), the inherent coefficient value is multiplying "1/16" on each of the figures, which are surrounded by the circles therein. This is same to the coefficients of the 2-dimensional filters, which will be shown in the following embodiments.) It is enough that the 2-dimensional filters (2601) be a production of a horizontal band pass filter and a vertical band pass filter applying ±μs/2 to be a central frequency of the pass band, while the 2-dimensional filters (2602) be a production of a vertical band pass filter and a horizontal band pass filter applying ±νs/2 to be a central frequency of the pass band, and the 2-dimensional filters (2605) may be in characteristic obtained by subtracting the pass bands of the 2-dimensional filters (2601) and the 2-dimensional filters (2602) from all bands.

Next, explanation will be given about differences in the operations between the embodiment 7 of the present invention and the prior art mentioned above, by referring to FIGS. 34A and 34B. FIG. 34A shows the frame #1 (3401), the frame #2 (3402), the frame #3 (3403), the frame #4 (3404) and the frame #5 (3401), which are inputted into the resolution converter unit (4), while FIG. 34B shows the respective frames outputted from the resolution converter unit (4). In each of the frames, the target to be photographed is moved, intestinally, so that it moves into the clockwise direction by each ¼ pixel and makes a round by four (4) frames. This motion is continued in the similar manner after the frame #6 and thereafter.

With the prior arts described in the Patent Document 1, the Patent Document 2 and the Non-Patent Document 1, as was mentioned above, in case when conducting the high resolution upon the 2-dimensional input signal, i.e., horizontal/vertical, since the aliasing comes from two (2) directions (horizontal/vertical), the band area of the original signal is widen 2-times in the horizontal/vertical directions, and then three (3) aliasing components overlap one another. For the purpose of negating those, there is a necessity of 2M+1=7 pieces of digital data (=7 pieces of signals of the frame video).

Accordingly, in case when inputting the signals, making one round by four (4) frames as is shown in FIG. 33A, since it is impossible to obtain independent data even if selecting any seven (7) frames, the solution obtained by the high resolution process comes to be indefinite; i.e., no solution can be obtained.

On the other hand, with applying the present embodiment therein, it is possible to achieve the high resolution, with removing the aliasing component in the horizontal direction (or in the vertical direction), as is shown in FIG. 33B, for example, with using the neighboring two (2) frames (for example, the frame #1 (3401) and the frame #2 (3402) (or the frame #2 (3402) and the frame #3 (3403)). Thus, with using the input video shown in FIG. 33A as a test pattern, it is possible to confirm the operation of the present embodiment. With using a CZP (circular Zone Plate), which is well know, in general, as a design of this test pattern, an effect of the resolution conversion can be seen, directly, on the display unit (3). Thus, the video can be displayed, which is improved on the resolution in the horizontal direction, if moving the CZP (circular Zone Plate), by each frame, in the horizontal direction, and/or the video can be displayed, which is improved on the resolution in the vertical direction (or in the oblique direction) if moving the CZP (circular Zone Plate) in the vertical direction (or in the oblique direction), etc., i.e., it is possible to confirm an effect of improving the resolution responding to the direction of movement of the test pattern.

With the video signal processing apparatus according to the embodiment 7, which was explained in the above, two (2) signals are produced from the each video signal, respectively, by conducting the phase shifting on the each video signal of two (2) pieces of the input video frames. With this, four (4) signals can be produced from the two (2) pieces of the input video frames. Herein, upon basis of the phase difference between the two (2) pieces of the input video frames, the coefficient is calculated out, respectively, for composing those four (4) signals while canceling the aliasing components thereof, for each pixel, for each one of that four (4) signals. For each pixel of the video to be produced, a sum is calculated upon products of the pixel values of the corresponding pixels owned by each signal of the four (4) signals mentioned above, each being multiplied by each coefficient, respectively, and thereby producing pixel values of a new high resolution video. With conducting this upon each of the pixels of the video to be produced, it is possible to produce a video achieving high-resolution in one-dimensional direction more than the input video frame.

With conducting this upon the horizontal direction and the vertical direction, respectively, it is possible to produce a video achieving high resolution in the horizontal direction and a video achieving high resolution in the vertical direction. Upon that video achieving high resolution in the horizontal direction and that video achieving high resolution in the vertical direction is conducted the up-rating process in the vertical direction and the horizontal direction, respectively, and thereafter both are combined with.

With this, it is possible to produce a high resolution video achieving the high resolution in both the vertical direction and the horizontal direction, from the each video signal of the two (2) pieces of input video frames, being smaller number than that of the prior art. Thus, 2-dimensional high-resolution video can be produced.

Also, with the video signal processing apparatus according to the embodiment 7, since two (2) pieces of input video frames are used, being smaller number than that of the prior art, therefore it is possible to reduce an amount of necessity processes lower than that of the prior art. With this, it is possible to achieve the video signal processing apparatus, for producing the high-resolution video, being higher in the resolution than the input video in both direction, i.e., the vertical direction and the horizontal direction, with less aliasing components therein, but a cost lower than that of the prior art.

However, in accordance with the prior arts described in the Patent Document 1, the Patent Document 2 and the Non-Patent Document 1, it is also possible to provide an output, as a result of the 2-dimensional resolution conversion, by conducting a one-dimensional high resolution in the plural number of directions, such as, the horizontal direction and the vertical direction, etc., with using three (3) frames, and thereby inputting the result of each of those into the mixer (2009) shown in FIG. 20. In this case, the signal processing circuit, such as, the frame memory and the motion estimation unit, etc., comes to be large in the scale thereof, comparing to the structures for conducting the 2-dimensional resolution conversion with using only two (2) frames, as is shown in FIG. 20; however, it is possible to make the scale of the signal processing circuit, such as, the frame memory and the motion estimation unit, etc., smaller than that of using at least seven (7) frames therein, as is described in the Patent Document 1, the Patent Document 2 or the Non-Patent Document 1.

Also, not restricting to the prior arts described in the Patent Document 1, the Patent Document 2 and the Non-Patent Document 1 mentioned above, with applying other conventional high resolution technologies, it is possible to conduct the one-dimensional high resolution conversion in plural numbers of directions, such as, the horizontal direction and the vertical direction, etc., and each result thereof is outputted into the mixer (2009) shown in FIG. 20 to be mixed with; thereby outputting it as the result of 2-dimensional resolution conversion.

Also, in FIG. 20, the explanation was given on the example, by referring to the case of converting the resolution of the frame #1 with using a pair of the input signals, i.e., the frame #1 and the frame #2; however, other than this, it is also possible to obtain the final result of the resolution conversion of the frame #1, by converting the resolution of the frame #1, respectively, with using plural pairs, such as, the frame #1 and the frame #3, and the frame #1 and the frame #4, etc., and thereby combining or mixing the results of those.

As the mixing method in this instance, it is possible to obtain an averaged value of the respective results, or to mix them corresponding to the value of the coefficient C4 (frame) for each frame, as was shown in FIG. 23 or FIG. 24. In this case, as the coefficient C4 (frame) may be used a MAX value (the value of not smaller one) of the coefficient C4 (horizontal) and the coefficient C4 (vertical) for each frame. Or, it is also possible to obtain the final result of the resolution conversation of the frame #1, by comparing the coefficients C4 (horizontal) and C4 (vertical) of all sets, for each pixel, and then by selecting the results of the resolution conversion obtained from the set, being smallest in the coefficient C4 (i.e., the set being largest on the effect of improving the resolution), for each pixel.

With this, for example, upon basis of the frame #1, in case where the frame #2 is the frame prior to the frame #1, and the frame #3 is the future frame posterior to frame #1, each of the processing results is mixed with, in such a manner that the resolution conversion process is conducted with using the frame #1 and frame #2 if the subject changes from "motion" to "standstill" (end of motion), and the resolution conversion process is conducted with using the frame #1 and frame #3 if the object changes from "standstill" to "motion" (start of motion), therefore, it is possible to utilize the motion of the object and thereby to bring an effect of increasing the resolution at the most.

Embodiment 8

FIG. 21 shows a video signal processing apparatus, according to an embodiment 8 of the present invention. The video processing apparatus according to the present embodiment is a variation of the structures of the embodiment 7 mentioned above, wherein they are so constructed that the processing order of the resolution converter units (2001) and (2005) and the compensation units (2004) and (2008), which are shown in FIG. 20, are reversed, i.e., after completing the compensation process, the resolution conversion is conducted. With this, since the up-raters (i.e., (103) and (104) in FIG. 1) within the resolution converter units (2001) and (2005), and also the up-raters (i.e., (2002) and (2006) in FIG. 20) within the compensation units (2004) and (2008), can be shared, in common, and further the respective position estimation units (see (101) in FIG. 1) within the horizontal resolution converter unit (2001) and the vertical resolution converter unit (2005) can be shared, in common; therefore, it is possible to achieve the similar signal processing with a circuit scale and an amount of calculations, which are smaller than before.

In FIG. 21, firstly within a position estimation unit (2101), estimation is made on the position of the pixel on the frame #2 corresponding thereto, upon basis of a sampling phase (i.e., a sampling position) of the pixel of the processing target on the frame #1, which is inputted in the input unit (1), so as to obtain the sampling phase differences "θH" (2102) and "θV" (2103) in the horizontal direction and the vertical direction, respectively.

Next, the up-raters (2104) and (2105) of the motion compensation/up-rate unit (2110) makes moving compensation upon the frame #2 with using the information of the phase differences "θH" (2102) and "θV" (2103), so as to fit to the frame #1 in the position, and at the same time, it increases the pixel numbers of the frames #1 and #2 up to 2-times, respectively, in the horizontal and vertical directions (in total, 4-times). The up-rater (2104) and (2105), each being obtained by extending the operations/structures shown in FIGS. 5 and 6 into 2-dimensions, i.e., into the horizontal/vertical directions, can be practiced easily, and therefore are committed to be shown in the figure. In a phase shift portion or unit (2111), the phase of this data of high-density is shifted by a predetermined amount thereof.

In this instance, a horizontal phase shifter (2106) conducts phase shifting into the horizontal direction, and a vertical phase shifter (2107) conducts phase shifting into the vertical direction; i.e., they can be practiced in the similar manner to the delay devices (105) and (107) and the π/2 phase shifter (108), which are shown in FIG. 1, and the operations/structures shown in FIGS. 7 and 8, and therefore the explanation thereof is omitted herein.

For each signal, which is shifted in the phase thereof, the aliasing components in the horizontal/vertical directions are removed, respectively, in a horizontal direction aliasing component removal portion or unit (2108) and a vertical direction aliasing component removal portion or unit (2109) within an aliasing component removal portion or unit (2112). Next, an output of the horizontal direction aliasing component removal unit (2108) is interpolated in the pixels thereof with using a pixel interpolator (2003), to be the SR (horizontal) signal, while an output of the vertical direction aliasing component removal unit (2109) is interpolated in the pixels thereof with using a pixel interpolator (2007), to be the SR (vertical) signal, and both of those are combined in a mixer (2009) to be outputted.

As the aliasing component removal units (2108) and (2109) can be applied the aliasing component removal unit (117) shown in FIG. 1, as it is in the structures thereof. Assuming that the phase difference is "θ" (102), it is possible to remove the aliasing components in the respective directions, by conducting the operations shown in FIG. 9, with using the horizontal phase difference "θH" (2102) in the aliasing component removal unit (2108), while using the vertical phase difference "θV" (2103) in the aliasing component removal unit (2109).

However, in the explanation given in the above, although it is said that the phase shift portion (2111) is practiced in the similar manner to the reterders (105) and (107) and the π/2 phase shifter (108), which are shown in FIG. 1, and the operations/structures shown in FIGS. 7 and 8, and that as the aliasing component removal portion (2108) or (2109) is applied the structure of the aliasing component removal unit (117) shown in FIG. 1, as it is, however in the place thereof, it is also possible to apply the phase shift portion (1009) shown in FIG. 10 into the phase shift portion (2111), in the vertical direction and the horizontal direction, respectively, while applying the aliasing component removal unit (1010) shown in FIG. 10 into the aliasing component removal unit (2108) or (2109), respectively. Further, in this instance, each of the aliasing component removal units (2108) and (2109) may comprises the auxiliary pixel compensation portion or unit (1105) shown in FIG. 11, in the similar manner to that shown in FIG. 11.

However, the mixer (2009) is same to that of the embodiment 7, and therefore the explanation thereof will be omitted herein.

Also, the operations to the input frame shown in FIG. 34 are same to those of the embodiment 7, and therefore the explanation thereof will be omitted herein.

The video signal processing apparatus according to the embodiment 8, which was explained in the above, has the same effects, which the video signal processing apparatus according to the embodiment 7 has; however, since it shares a part of the processing portion, in common, comparing to the video signal processing apparatus according to the embodiment 7, therefore it has an effect of enabling the similar signal processing, but with the circuit scale and the calculation amount being smaller than those of the video signal processing apparatus according to the embodiment 7.

However, in accordance with the prior arts described in the Patent Document 1, the Patent Document 2 and the Non-Patent Document 1, it is also possible to provide an output, as a result of the 2-dimensional resolution conversion, by conducting a one-dimensional high resolution in the plural number of directions, such as, the horizontal direction and the vertical direction, etc., with using three (3) frames, and thereby inputting the result of each of those into the mixer (2009) shown in FIG. 21. In this case, the signal processing circuit, such as, the frame memory and the motion estimation unit, etc., comes to be large in the scale thereof, comparing to the structures for conducting the 2-dimensional resolution conversion with using only two (2) frames, as is shown in FIG. 21; however, it is possible to make the scale of the signal processing circuit, such as, the frame memory and the motion estimation unit, etc., smaller than that of using at least seven (7) frames therein, as is described in the Patent Document 1, the Patent Document 2 or the Non-Patent Document 1.

Also, not restricting to the prior arts described in the Patent Document 1, the Patent Document 2 and the Non-Patent Document 1 mentioned above, with applying other conventional high resolution technologies, it is possible to conduct the one-dimensional high resolution conversion in plural numbers of directions, such as, the horizontal direction and the vertical direction, etc., and each result thereof is outputted into the mixer (2009) shown in FIG. 21 to be mixed with; thereby outputting it as the result of 2-dimensional resolution conversion.

Also, in FIG. 20, the explanation was given on the example, by referring to the case of converting the resolution of the frame #1 with using a pair of the input signals, i.e., the frame #1 and the frame #2; however, other than this, it is also possible to obtain the final result of the resolution conversion of the frame #1, by converting the resolution of the frame #1, respectively, with using plural pairs, such as, the frame #1 and the frame #3, and the frame #1 and the frame #4, etc., and thereby combining or mixing the results of those.

As the mixing method in this instance, it is possible to obtain an averaged value of the respective results, or to mix them corresponding to the value of the coefficient C4 (frame) for each frame, as was shown in FIG. 23 or FIG. 24. In this case, as the coefficient C4 (frame) may be used a MAX value (the value of not smaller one) of the coefficient C4 (horizontal) and the coefficient C4 (vertical) for each frame. Or, it is also possible to obtain the final result of the resolution conversation of the frame #1, by comparing the coefficients C4 (horizontal) and C4 (vertical) of all sets, for each pixel, and then by selecting the results of the resolution conversion obtained from the set, being smallest in the coefficient C4 (i.e., the set being largest on the effect of improving the resolution), for each pixel.

With this, for example, upon basis of the frame #1, in case where the frame #2 is the frame prior to the frame #1, and the frame #3 is the future frame posterior to frame #1, each of the processing results is mixed with, in such a manner that the resolution conversion process is conducted with using the frame #1 and frame #2 if the subject changes from "motion" to "standstill" (end of motion), and the resolution conversion process is conducted with using the frame #1 and frame #3 if the object changes from "standstill" to "motion" (start of motion), therefore, it is possible to utilize the motion of the object and thereby to bring an effect of increasing the resolution at the most.

Embodiment 9

Figure 27:
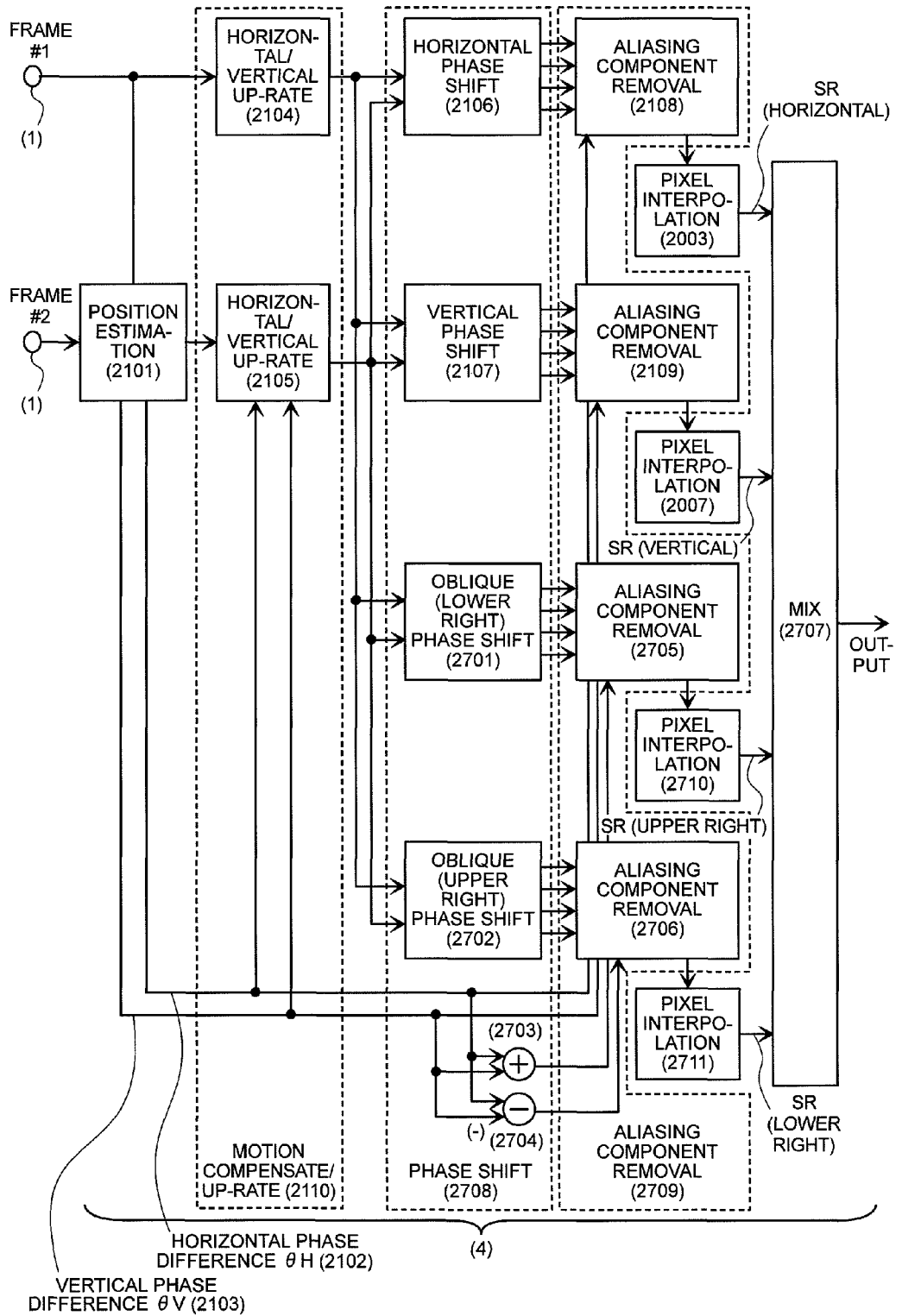
FIG. 27 is a view for explaining an embodiment 9, according to the present invention.

FIG. 27 shows the video signal processing apparatus, according to an embodiment 9 of the present invention. The video signal processing apparatus according to the present embodiment has the structures of adding the high-resolution converting units for the lower right and the upper right oblique components, in addition to an example of the structures shown in FIG. 21. Thus, an oblique (the lower right) phase shift portion or unit (2701) and an oblique (the upper right) phase shift portion or unit (2702) are added to a phase shift portion or unit (2708), and aliasing component removing portions (2705) and (2706) are added to an aliasing component removal portion or unit (2709), wherein after passing through pixel interpolators (2710) and (2711), respectively, each of the signals, SR (horizontal), SR (vertical), SR (upper right) and SR (lower right), is mixed within a mixer portion or unit (2707), so as to obtain an output. Herein, as the pixel interpolator (2710) or (2711) may be applied a general 2-dimensional filter, for outputting an averaged value of the pixel data on the upper and the lower sides and the left and the right sides of pixel to be interpolated.

As the phase difference "θ" is needed the phase difference information in the oblique direction, and therefore, the following structures may be made: i.e., the phase difference (θH+θV) obtained by adding the horizontal phase difference "θH" (2102) and the vertical phase difference "θV" (2103) in an adder (2703) is inputted into the aliasing component removal unit (2705), while the phase difference (−θH+θV) produced in a subtractor (2704) is inputted into the aliasing component removal unit (2706). However, the structures and the operations of all the aliasing component removal units (2106), (2109), (2705) and (2706) are common.

FIGS. 28A to 28D show the operations of the horizontal phase shift unit (2106), the vertical phase shift unit (2107), the oblique (lower right) phase shift unit (2101) and the oblique (upper right) phase shift unit (2102), in the 2-dimensional frequency region, respectively. FIGS. 28A to 28D show the 2-dimensional frequency region, while showing the horizontal frequency by "μ" and the vertical frequency "ν", in the similar manner to those shown in FIG. 25. Those phase shift units (2106), (2107), (2701) and (2702) have the same structure of the phase shift unit (116) shown in FIG. 1, wherein "frequency-phase difference" characteristics of the π/2 phase shifters (106) and (108) in those are changed fitting to the respective directions thereof.

Figure 28A:
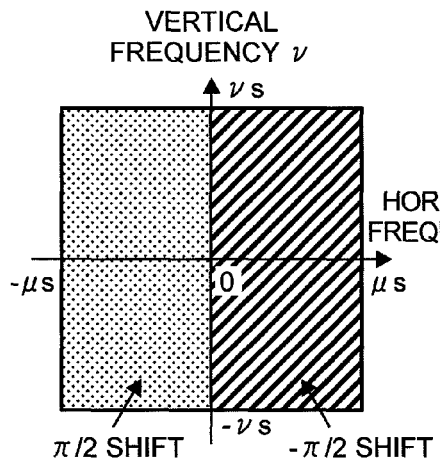
FIGS. 28A to 28D are views for explaining the embodiment 9, according to the present invention.
Figure 28B:
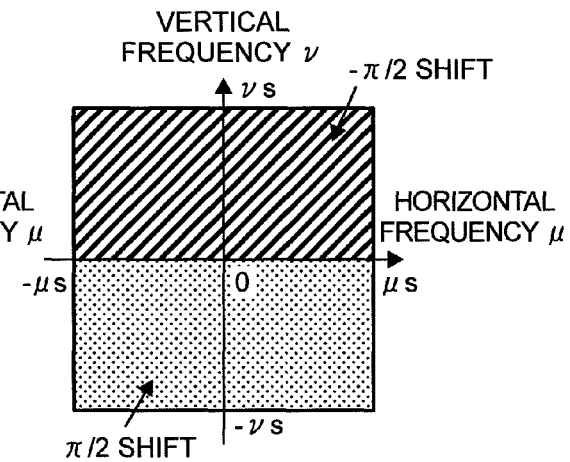

Thus, in FIG. 28A, the horizontal phase shift unit (2106) shifts the phase of frequency components within a region from −μs to 0 by only π/2, and also shifts the phase of frequency components within a region from 0 to μs by only −π/2, in the similar manner to the operation shown in FIG. 7, in case when the horizontal frequency sampling frequency for the input signal is μs. In the similar manner, the vertical phase shift unit (2107) shifts the phase of frequency components within a region from −νs to 0 by only π/2, and also shifts the phase of frequency components within a region from 0 to νs by only −π/2, in case when the vertical frequency sampling frequency for the input signal is νs.

Figure 28C:
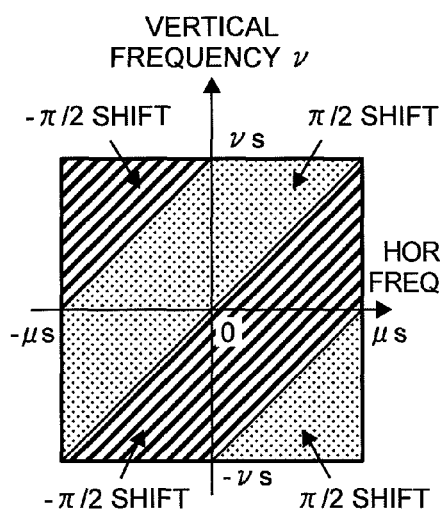
Figure 28D:
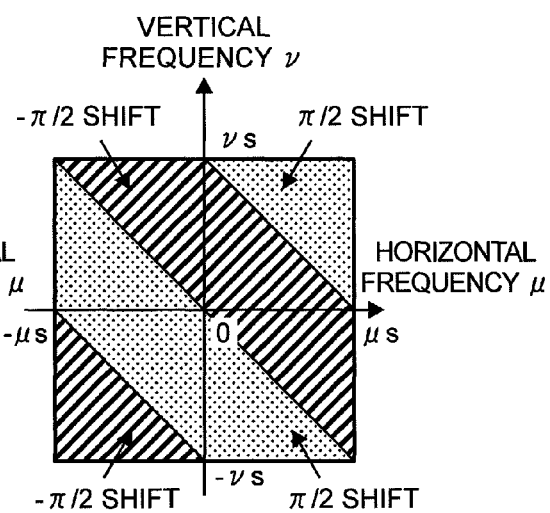

In the similar manner, the oblique (lower right) phase shift unit (2101) and the oblique (upper right) phase shift unit (2102) shift the phase of the signal by only π/2 or −π/2, as is shown in FIG. 28C and FIG. 28D, respectively. Those "frequency-phase difference" characteristics can be achieved, easily, through disposing the tap coefficients shown in FIG. 8 into the respective directions, the horizontal direction, the vertical direction, the oblique (lower right) direction and the oblique (upper right) direction, fitting to the points of the 2-dimensional sampling.

Figure 29:
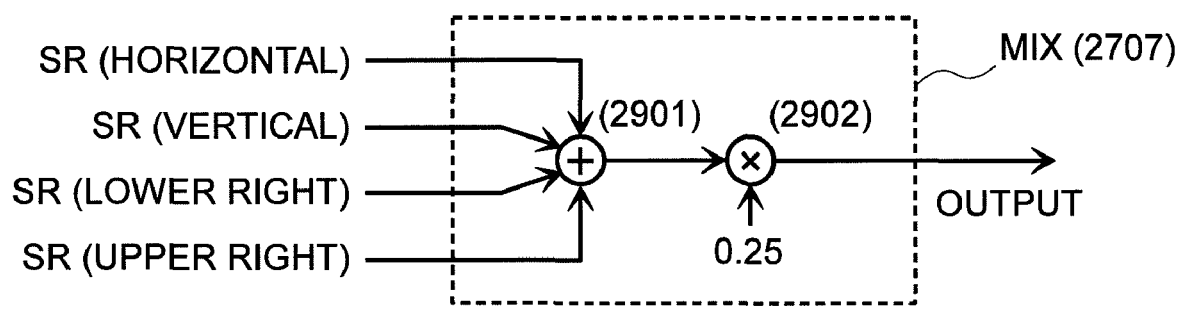
FIG. 29 is a view for explaining the embodiment 9, according to the present invention.

FIG. 29 shows a first example of the structures of the mixer (2707). In the same figure, with using an adder (2901) and a multiplier (2902) is produced an averaged value for each of the signals, SR (horizontal), SR (vertical), SR (lower right) and SR (upper right), to be outputted. The structure shown in the same figure is an example of constructing the mixer (2707) in the easiest manner, but the effect of improving the resolution also comes down to ¼ for each direction, horizontal, vertical, lower right and upper right.

Figure 30:
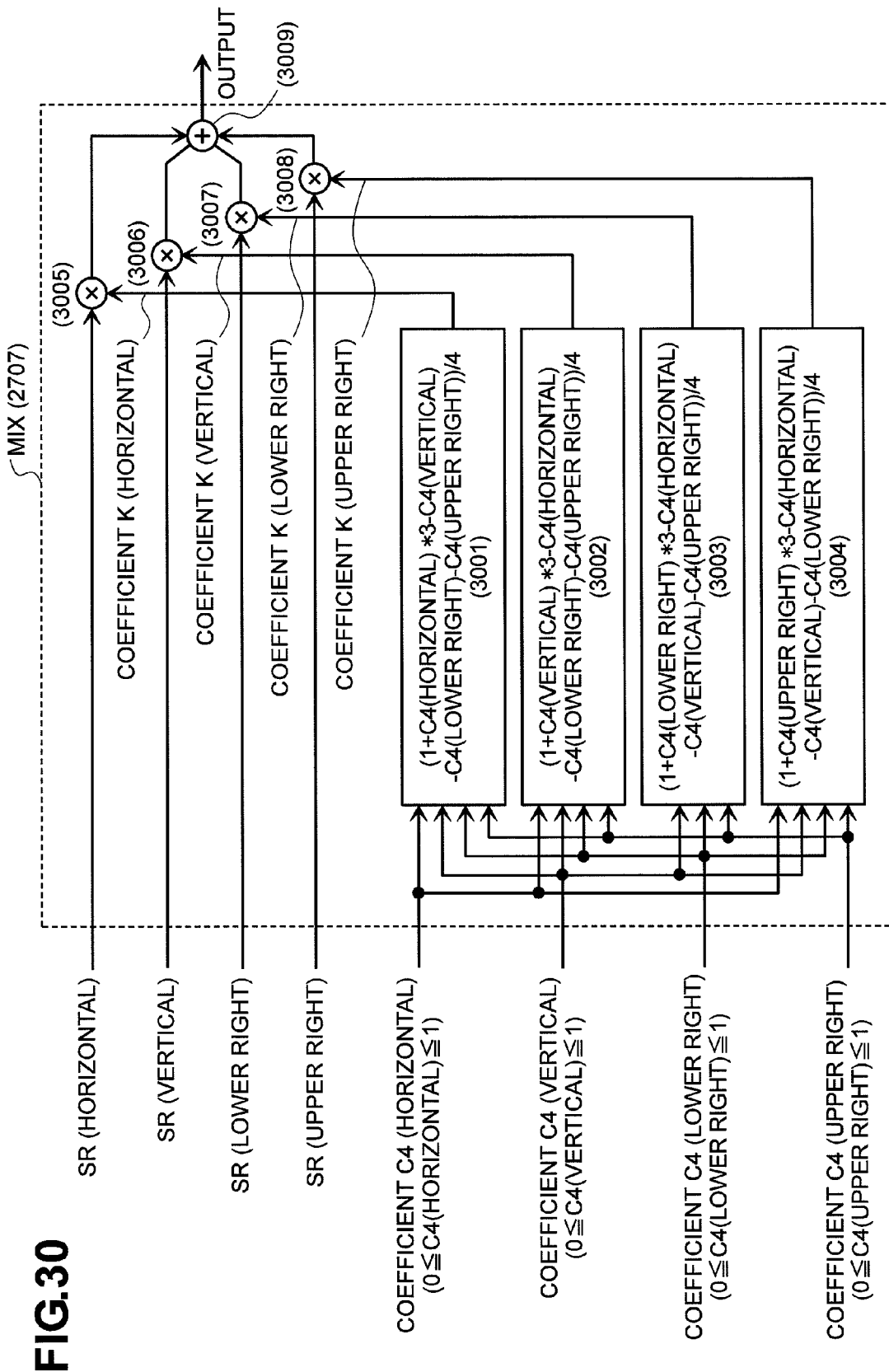
FIG. 30 is a view for explaining the embodiment 9, according to the present invention.

FIG. 30 shows a second example of the structures of the mixer (2707). In the same figure, the coefficient K (horizontal), the coefficient K (vertical), the coefficient K (lower right) and the coefficient K (upper right) are multiplied upon the signals, SR (horizontal), SR (vertical), SR (upper right) and SR (lower right), which are inputted into the mixer (2707), with using multipliers (3005), (3006), (3007) and (3008), respectively, and those signals are added in an adder (3009) to be outputted. The coefficient K (horizontal), the coefficient K (vertical), the coefficient K (lower right) and the coefficient K (upper right) are produced in coefficient determining units (3001), (3002), (3003) and (3004), respectively. Hereinafter, explanation will be made on the operations of those coefficient determining units (3001), (3002), (3003) and (3004).

The aliasing component removal units (2106), (2109), (2705) and (2706) shown in FIG. 27 generate the coefficients C0-C3 shown in FIG. 9, within the coefficient determining unit (109) shown in FIG. 1, upon basis of the phase difference "θH" (2102), the phase difference "θV" (2103), the phase difference "θH+θV" and the phase difference "−θH+θV", and thereby conducting the calculation for removing the aliasing components. In this instance, for the propose of prevention from becoming weak in noises or the like, due to the fact that the coefficients C1 and C3 comes to be unstable when "θH" (2102), "θV" (2103), "θH+θV" and "−θH+θV" are zero (0), or due to the fact that the coefficients C1 and C3 comes to be large when "θH" (2102), "θV" (2103), "θH+θV" and "−θH+θV" come close to zero (0), it is preferable to introduce the coefficient C4 ($0 \leq C4 \leq 1$) shown in FIG. 13, thereby conducting an auxiliary pixel interpolation, as the structures shown in FIG. 11. Paradoxically speaking, there can be obtained the effect of improving the resolution when the value of coefficient C4 is 0.0, but that effect of improving the resolution comes to be small as the value of coefficient C4 comes close to 1.0. With using this characteristic, the coefficient "K" (horizontal) is determined within the coefficient determining unit (3001), so that the RS (horizontal) as the result of the horizontal resolution conversion comes to be weak, when the horizontal phase difference "θH" (2102) is in the vicinity of zero (0) (i.e., when the coefficient C4 (horizontal) is in the vicinity of 1.0), while the SR (horizontal) as the result of the horizontal resolution conversion comes to be strong, when the horizontal phase difference "θH" (2102) is not in the vicinity of zero (0) (i.e., when the coefficient C4 (horizontal) is in the vicinity of 0.0).

As an example of this, it is enough to make an equation, coefficient K (horizontal)=(1+C4 (horizontal)*3−C4 (vertical)−C4 (lower right)−4C (upper right))/4. In the similar manner, the coefficients K (vertical), K (lower right) and K (upper right) are determined within the coefficient determining units (3002), (3003) and (3004), respectively. In this instance, the coefficient K (upper right) is determined so as to satisfy; coefficient K (horizontal)+coefficient K (vertical)+coefficient K (lower right)+coefficient K (upper right)=1.0, for the coefficient K (horizontal), the coefficient K (vertical), the coefficient K (lower right) and the coefficient K (upper right), and SR (horizontal), SR (vertical), SR (lower right) and SR (upper right) are mixed.

Figure 31:
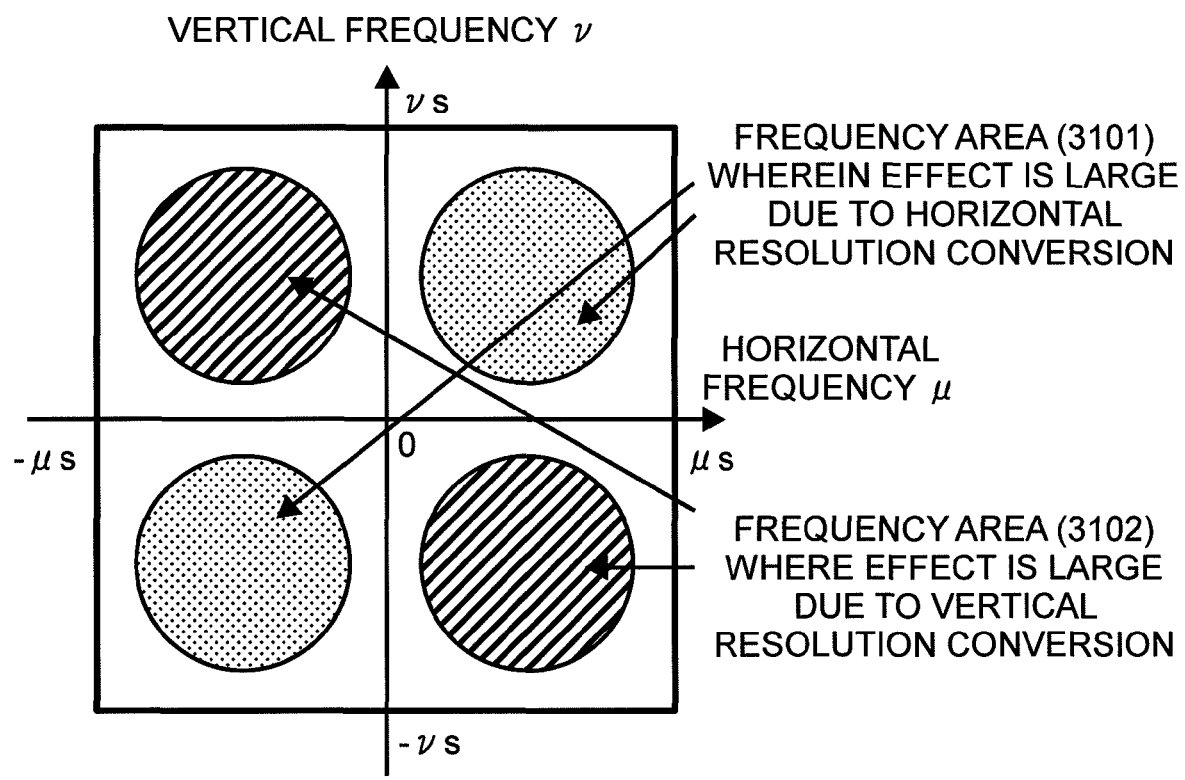
FIG. 31 is a view for explaining the embodiment 9, according to the present invention.
Figure 32:
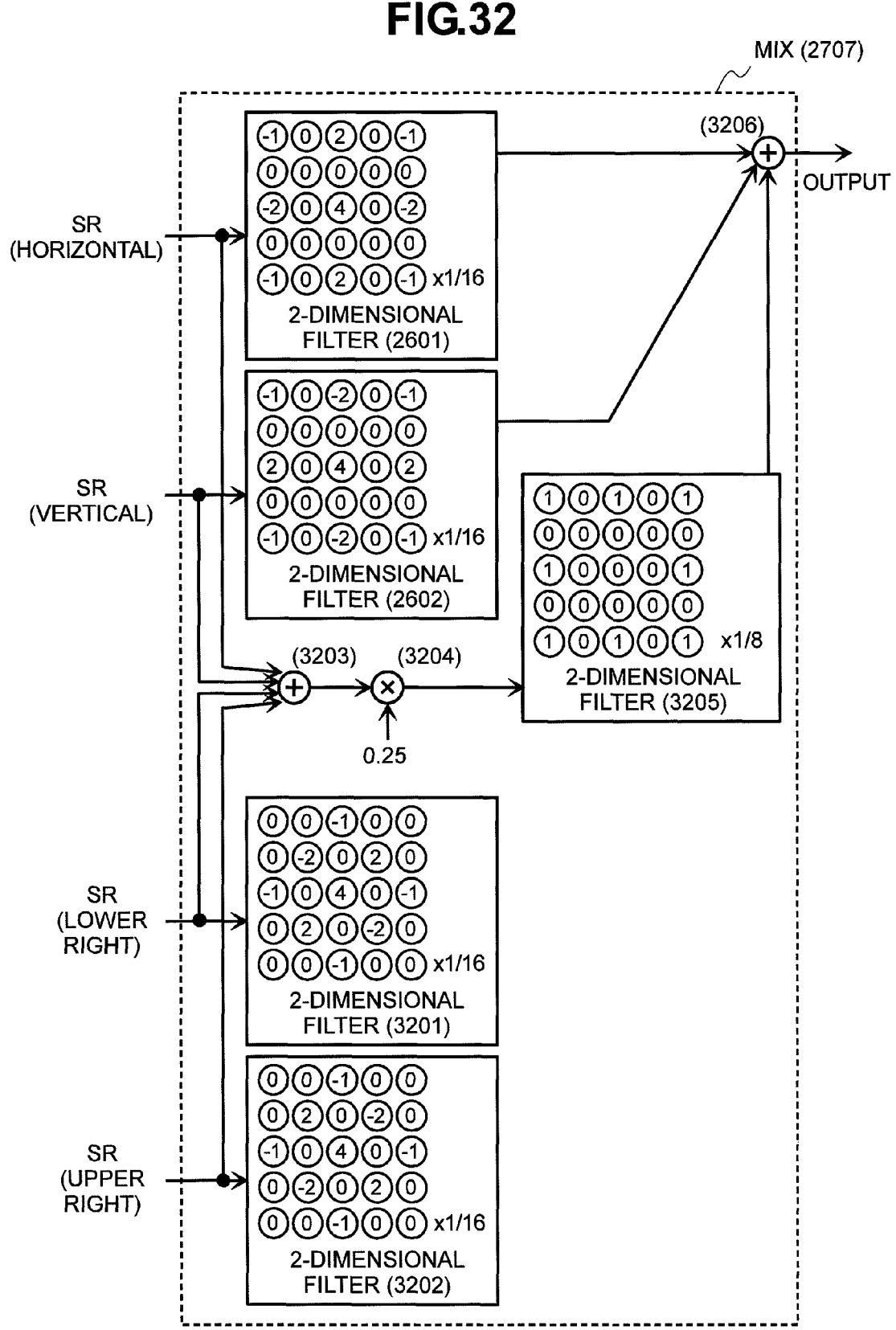
FIG. 32 is a view for explaining the embodiment 9, according to the present invention.

FIGS. 31 and 32 show a third operation and an example of the structures of the mixer (2707), respectively. FIG. 31 shows the 2-dimensional frequency region of showing the horizontal frequency by "μ" and the vertical frequency by "ν", in the similar manner to that shown in FIG. 25. In FIG. 31, assuming that the horizontal sampling frequency of the original input picture is "μs" and that the vertical sampling frequency thereof is "νs", then an output of the resolution converting unit (4) shown in FIG. 27 comes to be a signal, within a region from "−μs" to "+μs" in the horizontal frequency "μ", and within a region from "−νs" to "+νs" in the vertical frequency "ν".

The component, upon which the effect due to the horizontal resolution conversion is large, is the component of the frequency regions in the vicinity of (μ,ν)=(+μs/2,+νs/2) and in the vicinity of (μ,ν)=(−μs/2,−νs/2), as shown in FIG. 31 (in particular, the components in the region of frequency μ>0, ν>0, including (μ,ν)=(+μs/2,+νs/2), and the region of frequency μ<0, ν<0, including (μ,ν)=(=μs/2,−νs/2)).

The component, upon which the effect due to the oblique (lower right) resolution conversion is large, is the component of the frequency regions in the vicinity of (μ,ν)=(+μs/2,−νs/2) and in the vicinity of (μ,ν)=(−μs/2,+νs/2) (in particular, the components in the region of frequency μ>0, ν<0, including (μ,ν)=(+μs/2,−νs/2), and the region of frequency μ<0, ν>0, including (μ,ν)=(−μs/2,+νs/2).

Accordingly, by extracting those frequency components (3101) and (3102) through the 2-dimensional filter, to be mixed up with the frequency components (2501) and (2502), it is possible to output the components, upon which the effect is large of improving the resolution, selectively.

FIG. 32 shows an example of the structures of the mixer (2707) for extracting the components, upon each of which the effect is large due to the horizontal/vertical/oblique (lower right)/oblique (upper right) resolution conversions. In the same figure, with using a 2-dimensional filter (3201), a component is extracted of the frequency region (3102), which has a large effect of improving the resolution upon the SR (lower right) inputted into the mixer (2707). In the similar manner, with using a 2-dimensional filter (3202), a component is extracted of the frequency region (2502), which has a large effect of improving the resolution upon the SR (upper right) inputted into the mixer (2707). Also, by means of the 2-dimensional filters (2601) and (2602) shown in FIG. 26, the components are extracted of the frequency regions, having large effects of improving the resolutions upon the SR (horizontal) and the SR (vertical), respectively. As a component other than the frequency regions (2501), (2502), (3101) and (3102), an averaged signal of the SR (horizontal), the SR (vertical), the SR (lower right) and the SR (upper right) is produced with using an adder (3203) and a multiplier (3204), and with using a 2-dimensional filter (3205), there is extracted a component other than the respective pass bands of the 2-dimensional filters (2601), (2602), (3201) and (3202). Each output signal of the 2-dimensional filters (2601), (2602), (3201) and (3202) is added within the adder (3206), to be an output of the mixer (2707).

However, a numeral, which is surrounded by a circle among the 2-dimensional filters (2601), (2602), (3202), (3203) and (3205) shown in the same figure, shows an examples of tap coefficient of the filter, respectively.

With the video signal processing apparatus according to the embodiment 9, which was explained in the above, it is possible to produce a high resolution video, upon which the high resolution can be also achieved in the oblique directions, in addition to the horizontal direction and the vertical direction thereof.

However, in accordance with the prior arts described in the Patent Document 1, the Patent Document 2 and the Non-Patent Document 1, it is also possible to provide an output, as a result of the 2-dimensional resolution conversion, by conducting a one-dimensional (e.g., horizontal/vertical/oblique (upper right)/oblique (upper left)) high resolution in the plural number of directions, such as, the horizontal direction and the vertical direction, etc., with using three (3) frames, and thereby inputting the result of each of those into the mixer (2707) shown in FIG. 27. In this case, the signal processing circuit, such as, the frame memory and the motion estimation unit, etc., comes to be large in the scale thereof, comparing to the structures for conducting the 2-dimensional resolution conversion with using only two (2) frames, as is shown in FIG. 27; however, it is possible to make the scale of the signal processing circuit, such as, the frame memory and the motion estimation unit, etc., smaller than that of using at least seven (7) frames therein, as is described in the Patent Document 1, the Patent Document 2 or the Non-Patent Document 1.

Also, not restricting to the prior arts described in the Patent Document 1, the Patent Document 2 and the Non-Patent Document 1 mentioned above, with applying other conventional high resolution technologies, it is possible to conduct the one-dimensional (e.g., horizontal/vertical/oblique (upper right)/oblique (upper left)) high resolution conversion in plural numbers of directions, such as, the horizontal direction and the vertical direction, etc., and each result thereof is outputted into the mixer (2707) shown in FIG. 27 to be mixed with; thereby outputting it as the result of 2-dimensional resolution conversion.

Also, in FIG. 27, the explanation was given on the example, by referring to the case of converting the resolution of the frame #1 with using a pair of the input signals, i.e., the frame #1 and the frame #2; however, other than this, it is also possible to obtain the final result of the resolution conversion of the frame #1, by converting the resolution of the frame #1, respectively, with using plural pairs, such as, the frame #1 and the frame #3, and the frame #1 and the frame #4, etc., and thereby combining or mixing the results of those. As the mixing method in this instance, it is possible to obtain an averaged value of the respective results, or to mix them corresponding to the value of the coefficient C4 (frame) for each frame, as was shown in FIG. 23 or FIG. 24. In this case, as the coefficient C4 (frame) may be used a MAX value (the value of not smaller one) of the coefficient C4 (horizontal) and the coefficient C4 (vertical) for each frame. Or, it is also possible to obtain the final result of the resolution conversation of the frame #1, by comparing the coefficients C4 (horizontal) and C4 (vertical) of all sets, for each pixel, and then by selecting the results of the resolution conversion obtained from the set, being smallest in the coefficient C4 (i.e., the set being largest on the effect of improving the resolution), for each pixel.

With this, for example, upon basis of the frame #1, in case where the frame #2 is the frame prior to the frame #1, and the frame #3 is the future frame posterior to frame #1, each of the processing results is mixed with, in such a manner that the resolution conversion process is conducted with using the frame #1 and frame #2 if the subject changes from "motion" to "standstill" (end of motion), and the resolution conversion process is conducted with using the frame #1 and frame #3 if the object changes from "standstill" to "motion" (start of motion), therefore, it is possible to utilize the motion of the object and thereby to bring an effect of increasing the resolution at the most.

Embodiment 10

Explanation will be made on a video signal processing method according to an embodiment 10 of the present invention, by referring to FIG. 33.

The embodiment 10 relates to the video signal processing method for achieving processing equivalent to the video signal processing in the video signal processing apparatus according to the embodiment 9, by the controller unit cooperating with the software. The video signal apparatus for conducting the video signal processing method according to the present embodiment is same to the video signal processing apparatus shown in FIG. 18, and therefore the explanation thereof will be omitted herein.

Figure 33:
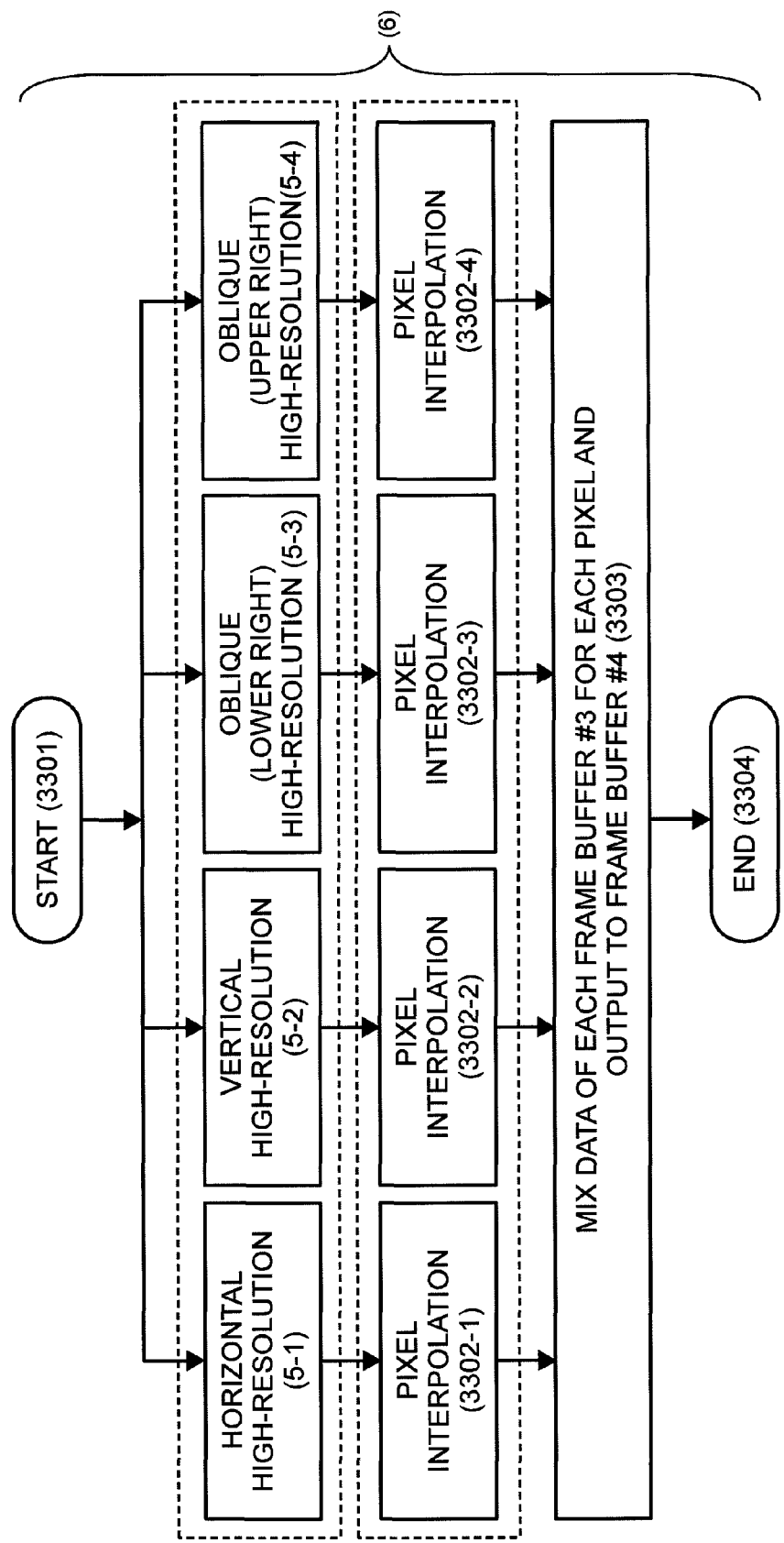
FIG. 33 is a view for explaining an embodiment 10, according to the present invention.

FIG. 33 shows an example of flowchart for showing the operations of the present invention. The flowchart starts from a step (3301), and conducts the horizontal, the vertical, the oblique (lower right) and the oblique (upper right) high-resolution conversions in steps (5-1), (5-2), (5-3) and (5-4), respectively. Herein, in each of the steps (5-1), (5-2), (5-3) and (5-4), it is enough to execute any one of the processing steps (5), which are shown in any of FIGS. 14 to 16, in each of the directions, i.e., the horizontal, the vertical, the oblique (lower right) and the oblique (upper right) directions. Thus, it is enough to change the "frequency-phase" characteristics, such as, the $\pi/2$ phase shift (1407) and (1408) and the Hilbert transformer (1501), etc., corresponding to the respective directions, as is shown in FIG. 28, and also to process by replacing the phase difference "$\theta$" with "$\theta H$", "($\theta H+\theta V$)" and "($-\theta H+\theta V$)", respectively. A result of each of the steps (5-1), (5-2), (5-3) and (5-4), as was explained by using any one of FIGS. 14 to 16, is written into the respective frame buffers #3. In the following steps (3302-1), (3302-2), (3302-3) and (3302-4), all pixels of the 2-dimensional frame buffers #3 are produces by conducting the pixel interpolations in the vertical, the horizontal and the oblique directions, respectively, so that the number of pixels comes to the same pixel number in the horizontal/vertical directions of the frame to be outputted. In the following step (3303), the data of each of the frame buffers #3 are mixed, for each pixel, in accordance with the method explained by referring to FIGS. 29, 30 and 32, to be outputted to an output frame buffer #4. However, in case when achieving the operations of the eighth or the ninth embodiment mentioned above by means of a software program, there is no necessity of the steps (5-3) and (5-4) for conducting the process in the oblique direction, and the steps for conduction the pixel interpolation for the results thereof (3302-3) and (3302-4). Also, as the mixing method of the step (3303), it is enough to mix the data in accordance with the method, which is explained by referring to FIGS. 22, 23 and 26.

With the video signal processing apparatus according to the embodiment 10, which was explained in the above, it is possible to produce a high resolution video, upon which the high resolution can be also achieved in the oblique directions, in addition to the horizontal direction and the vertical direction thereof.

Embodiment 11

Figure 38:
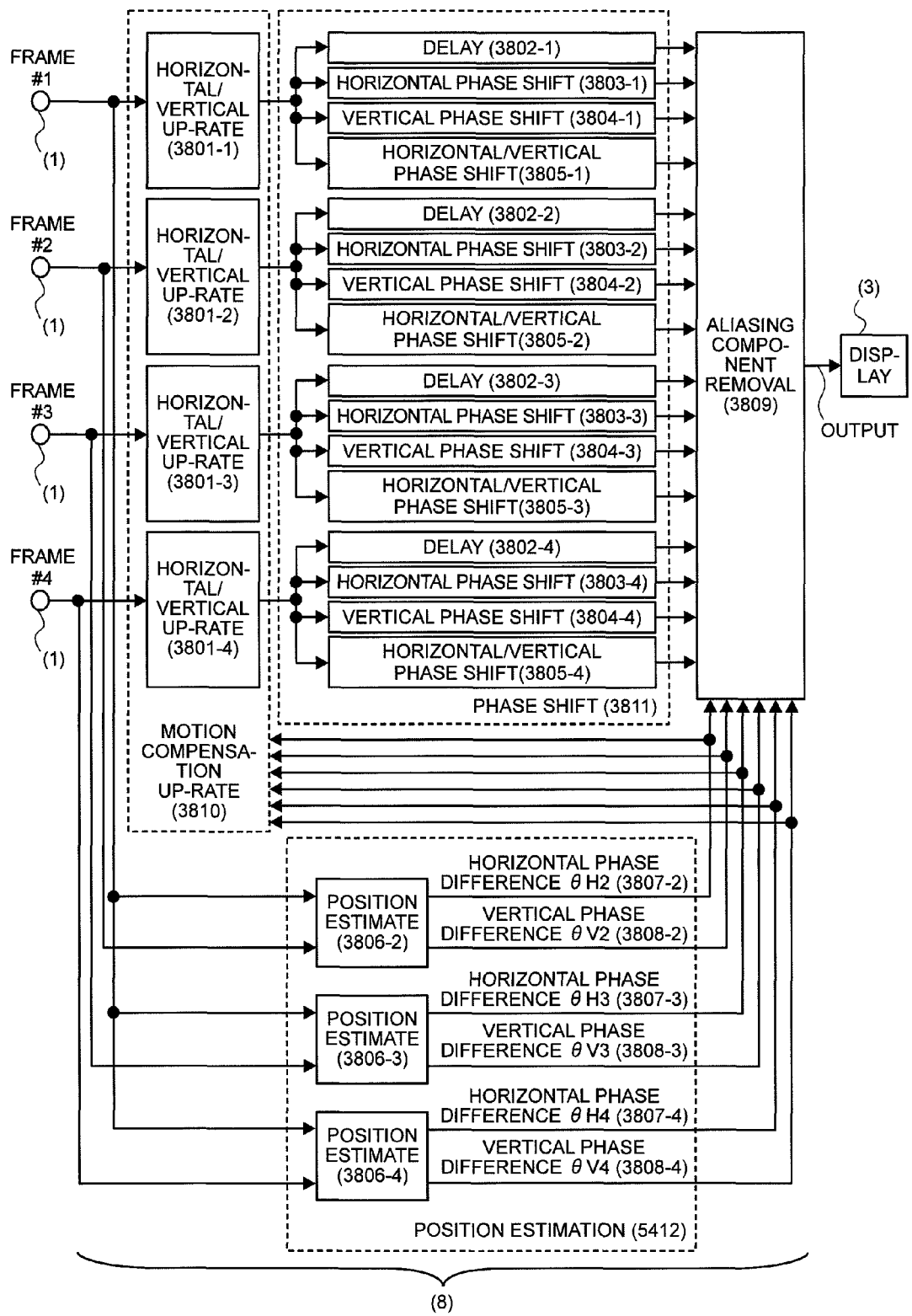
FIG. 38 is a view for explaining an embodiment 11 according to the present invention.

FIG. 38 shows a video signal processing apparatus, according to an embodiment 11 of the present invention. The video signal processing apparatus, according to the present embodiment, comprises: an input unit or portion (1), into which a train of frames of moving picture is inputted, such as, the television broadcast signal, for example, a resolution converter unit or portion (8) for achieving high resolution, two (2) times in the horizontal direction and two (2) times in the vertical direction, respectively, with using four (4) pieces of frames inputted from this input portion (1), and further a display unit or portion (3) for displaying a picture thereon, upon basis of the frames, on which the high resolution is achieved in this resolution converter unit (8). In this resolution converter unit (8), the aliasing components in the 2-dimensional frequency area are removed from, by conducting the phase shifting in the horizontal direction, the vertical direction and the horizontal/vertical direction, respectively, upon each of the four (4) pieces of frames inputted, and thereby achieving the 2-dimensional high resolution. Hereinafter, explanation will be given on the details of the resolution converter unit (8).

In FIG. 38, firstly within position estimation portions or units (3806-2), (3806-3) and (3806-4), upon basis of a 2-dimensional sampling position of the pixel of the processing target on the frame #1 inputted from the input portion (1), the 2-dimensional estimation is conducted on the corresponding videos on the frame #2, the frame #3 and the frame #4, respectively, and thereby obtaining the horizontal phase differences $\theta H2$ (3806-2), $\theta H3$ (3806-3) and $\theta H4$ (3806-4), and the vertical phase differences $\theta V2$ (3806-2), $\theta V3$ (3806-3)

and θV4 (3806-4). Next, by means of horizontal/vertical up-raters (3801-1), (3801-2), (3801-3) and (3801-4) of a motion-compensate/up-rate portion or unit (3810), with using each information of the phase differences θH2 (3806-2), θH3 (3806-3) and θH4 (3806-4), and θV2 (3806-2), θV3 (3806-3) and θV4 (3806-4) mentioned above, the motion compensation is conducted on the frame #2, the frame #3 and the frame #4, so as to fit them to the position of the frame #1, and also the number of pixels of each frame is doubled in the horizontal and vertical directions, respectively; thereby achieving the high densification of four (4) times, in total. In a phase shifter portion or unit (3811), the phases of this high densification data are shifted by a certain or predetermined amount thereof, in the horizontal direction and the vertical direction, respectively, with using horizontal phase shifters (3803-1), (3803-2), (3803-3) and (3803-4), vertical phase shifters (3804-1), (3804-2), (3804-3) and (3804-4), and horizontal/vertical phase shifters (3805-1), (3805-2), (3805-3) and (3805-4). Herein, as a means for shifting the phase of data by the predetermined amount thereof, it is possible to apply the $\pi/2$ phase shifter, such as, a Hilbert converter, etc., for example. In an aliasing component removal portion or unit (3809), the aliasing components are cancelled or removed, respectively, in each of the horizontal/vertical directions, with using 16 pieces of the signals, in total, supplied from the phase shifter unit (3811) mentioned above, and 6 pieces of the phase signals, in total, supplied from a phase estimation portion or unit (3812), and thereby obtaining an output thereof. This output is supplied to the display portion 3. Further, the position estimation unit (3806-2), (3806-3) and (3806-4) can be achieved by applying the prior art mentioned above, as it is. The horizontal/vertical up-raters (3801-1), (3801-2), (3801-3) and (3801-4) can be obtained by extending the operations/structures of those shown in FIGS. 5 and 6, 2-dimensionally, in the horizontal/vertical directions. Details thereof will be mentioned later, for each of the phase shifter unit (3811) and the aliasing component removal portion or unit (3809).

Figure 39:
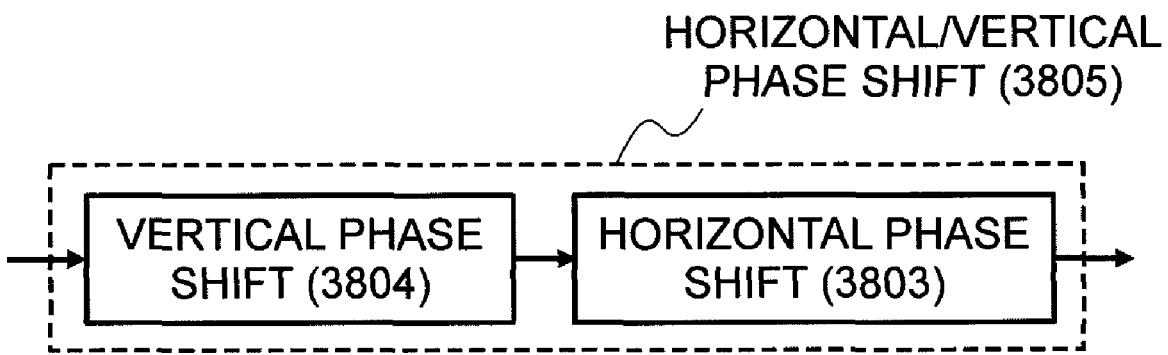
FIG. 39 is a view for explaining the embodiment 11 according to the present invention.

FIG. 39 shows an example of the structures of the horizontal/vertical phase shifters (3805-1), (3805-2), (3805-3) and (3805-4). Since the phase of the video signal in the horizontal direction and that of the video signal in the vertical direction are independent from each other, the horizontal/vertical phase shifter (3805) can be achieved by connecting the vertical phase shifter (3804) and the vertical phase shifter (3803) in series, as shown in the same figure. Also, it is apparatus that the same operating can be obtained if disposing the vertical phase shifter (3803) in front of the vertical phase shifter (3804).

Figure 40:
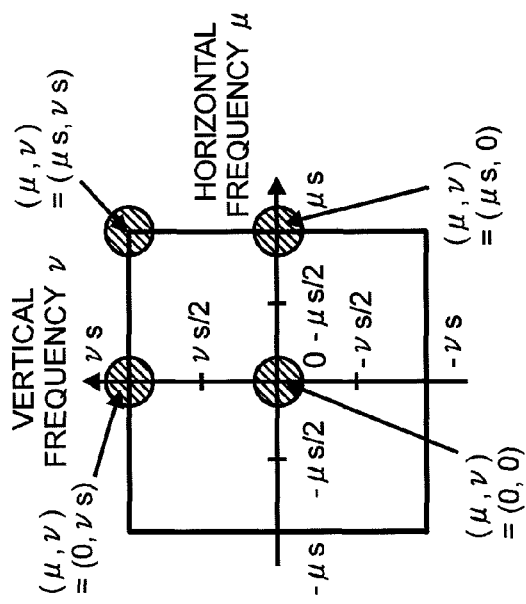
FIGS. 40A to 40I are views for explaining the embodiment 11 according to the present invention.

FIGS. 40A to 40H show detailed operations of the phase shifter unit (3811) and the aliasing component removal unit (3809), respectively. FIG. 40A shows the 2-dimensional frequency area, wherein the horizontal frequency is indicated by "$\mu$" and the vertical frequency by "$\upsilon$", respectively. Assuming that the horizontal sampling frequency of an original input video is "$\mu s$", then it is well-known that the aliasing components are generated at the positions, $(\mu, \upsilon)=(\mu s, 0)$, $(\mu, \upsilon)=(0, \upsilon s)$ and $(\mu, \upsilon)=(\mu s, \upsilon s)$, by using the signal in vicinity of an origin in FIG. 40A (i.e., $(\mu, \upsilon)=(0, 0)$ as an original component). Further, though the aliasing components are also generated, at the positions symmetrical to those with respect to the origin (e.g., $(\mu, \upsilon)=(-\mu s, 0)$, $(\mu, \upsilon)=(0, -\upsilon s)$ and $(\mu, \upsilon)=(-\mu s, -\upsilon s)$), however those are equivalents to the aliasing components at the positions, $(\mu, \upsilon)=(\mu s, 0)$, $(\mu, \upsilon)=(0, \upsilon s)$ and $(\mu, \upsilon)=(\mu s, \upsilon s)$, due to the symmetry of the frequencies. For achieving the high resolution, e.g., increasing the resolution up to two (2) times in the horizontal direction and 2 times in the vertical direction, within the resolution converter unit (8) shown in FIG. 38, it is enough to remove the aliasing components generating at the positions $(\mu, \upsilon)=(\mu s, 0)$, $(\mu, \upsilon)=(0, \upsilon s)$ and $(\mu, \upsilon)=(\mu s, \upsilon s)$, by using the signal in vicinity of an origin in FIG. 40A (i.e., $(\mu, \upsilon)=(0, 0)$ shown in FIG. 40A, after increasing the pixel number up to four (4) times by conducting the 2-times up-rating (inserting "0") upon them, respectively, in the motion-compensate/up-rate portion or unit (3810). Hereinafter, the operation thereof will be explained.

FIG. 40B shows the manners of a horizontal phase rotation and a vertical phase rotation for each component at the positions, $(\mu, \upsilon)=(0, 0)$, $(\mu, \upsilon)=(\mu s, 0)$, $(\mu, \upsilon)=(0, \upsilon s)$ and $(\mu, \upsilon)=(\mu s, \upsilon s)$. As is shown in FIG. 4, between the frames differing from each other in the sampling frequency thereof, there is generated no phase rotation of the original component, and only the aliasing component rotates the phase thereof, depending on the sampling phase difference. Then, by taking the fact that a component of phase crossing axis (e.g., an Im-axis) is generated in the horizontal, the vertical and horizontal/vertical directions by the phase shifter unit (3811) shown in FIG. 38, upon basis of the phase of the original component (i.e., a Re-axis) into the considering, as is shown in FIG. 40B, it is possible to cancel the aliasing components, so as to extract only the original component, by changing only the value of the component (a total value of the signals after phase shifting for each), i.e., the horizontal Re-axis (=no phase rotation in the horizontal direction) and the vertical Im-axis of at $(\mu, \upsilon)=(0, 0)$ (thus, #1) as the original component, into "1", while changing the values of other components (i.e., #2 to #16) into "0".

FIG. 40C shows a matrix operational expression for achieving the phase relationship shown in FIG. 40B in the above. In the same figure, "M" is a matrix having 16×16 elements, and is an operation for indicating each phase rotation of the horizontal, the vertical, and the horizontal/vertical directions. Details of this matrix "M" will be mentioned later. Also, the left-hand side in the same figure shows "value" of FIG. 40B, while C1ImIm to C4ImIm on the right-hand side thereof the coefficients to be multiplied onto each output signal of the phase shifter unit (3811), within the aliasing component removal unit (3809) shown in FIG. 38. Thus, with the frame #1 shown in FIG. 38, a coefficient C1ReRe is multiplied on the output signal of the retardor (3802-1), a coefficient C1ImRe is on the output of the horizontal phase shifter (3803-1), a coefficient C1ReIm is on the output of the vertical phase shifter (3804-1), and a coefficient C1ImIm is on the output signal of the horizontal/vertical phase shifter (3805-1). Hereinafter, also in the similar manner, with the frame #2, a coefficient C2ReRe is multiplied on the output signal of the retardor (3802-2), a coefficient C2ImRe is on the output of the horizontal phase shifter (3803-2), a coefficient C2ReIm is on the output of the vertical phase shifter (3804-2), and a coefficient C2ImIm is on the output signal of the horizontal/vertical phase shifter (3805-2). With the frame #3, a coefficient C3ReRe is multiplied on the output signal of the retardor (3802-3), a coefficient C3ImRe is on the output of the horizontal phase shifter (3803-3), a coefficient C3ReIm is on the output of the vertical phase shifter (3804-3), and a coefficient C3ImIm is on the output signal of the horizontal/vertical phase shifter (3805-3). With the frame #4, a coefficient C4ReRe is multiplied on the output signal of the retardor (3802-4), a coefficient C4ImRe is on the output of the horizontal phase shifter (3803-4), a coefficient C4ReIm is on the output of the vertical phase shifter (3804-4), and a coefficient C4ImIm is on the output signal of the horizontal/vertical phase shifter (3805-4). By determining the coefficients C1ReRe to C4ImIm, so that the relationship shown in FIG. 40C can be always established, when adding all of 16 signals, in total, which are multiplied with the coefficients mentioned above, within the aliasing component removal unit (3809), it is possible to cancel the aliasing components therefrom, and extract only the original component.

FIG. 40D shows the details of the matrix "M". The matrix "M" is the matrix having 16×16 elements, as was mentioned above, and it is constructed with partial matrixes, each having 4×4 elements, which can be expressed by mij (however, a line number "i" and a column number "j" are integers satisfying: $1 \leq i \leq 4$ and $1 \leq j \leq 4$). This partial matrix mij can be classified, as is shown by FIGS. 40E, 40F, 40G and 40H, corresponding to the line number "i".

FIG. 40E shows the respective elements (e.g., m11, m12, m13 and m14) of the partial matrix m1j, when the line number "i" is one (i=1). This partial matrix m1j is an element functioning upon the component of $(\mu, \upsilon)=(0, 0)$, and since no phase rotation in the horizontal/vertical directions, in spite of the sampling phase difference between the frames, therefore it comes to be a unit matrix (i.e., a matrix wherein all elements along a diagonal line falling in the right-hand side are "1" while the remaining elements are all "0").

FIG. 40F shows the respective elements (e.g., m21, m22, m23 and m24) of the partial matrix m2j, when the line number "i" is two (i=2). This partial matrix m2j is an element functioning upon the component of $(\mu, \upsilon)=(\mu s, 0)$, and it is a rotation matrix for rotating the phase in the horizontal direction, corresponding to the horizontal phase difference θHj (however, "j" is an integer satisfying: $1 \leq j \leq 4$). Thus, it is the rotation matrix for rotating the phase by θHj around the horizontal frequency axis, while combining #5 and #6, and #7 and #8 shown in FIG. 40B, which are common with the vertical phase axis, into up pairs, respectively. However, when j=1, the horizontal phase difference θH1, though not shown in FIG. 38, can be deal with as θH1=0, by interpreting this to be the phase difference (=0) between the frame #1 (a reference) and the frame #1 (a target=the reference). Hereinafter, with the vertical phase difference θV1, it can be also deal with, in the similar manner, i.e., θV1=0.

FIG. 40G shows the respective elements (e.g., m31, m32, m33 and m34) of the partial matrix m3j, when the line number "i" is three (i=3). This partial matrix m3j is an element functioning upon the component of $(\mu, \upsilon)=(0, \upsilon s)$, and it is a rotation matrix for rotating the phase in the horizontal direction, corresponding to the vertical phase difference θVj (however, "j" is an integer satisfying: $1 \leq j \leq 4$). Thus, it is the rotation matrix for rotating the phase by θHj around the horizontal frequency axis, while combining #9 and #11, and #10 and #12 shown in FIG. 40B, which are common with the vertical phase axis, into up pairs, respectively.

FIG. 40H shows the respective elements (e.g., m41, m42, m43 and m44) of the partial matrix m4j, when the line number "i" is four (i=4). This partial matrix m3j is an element functioning upon the component of $(\mu, \upsilon)=(\mu s, \upsilon s)$, and it is a rotation matrix for rotating the phase in both the horizontal direction and the vertical direction, corresponding to both of the horizontal phase difference θHj and the vertical phase difference θVj (however, "j" is an integer satisfying: $1 \leq j \leq 4$). Thus, it is a multiplication between m2j and m3j mentioned above.

Seeing this from other viewpoint, if applying m1j, m2j and m3j as the rotation matrixes for rotating the phases in the horizontal direction and the vertical direction, as m4j does, and considering to set θHj=θVj=0 in case of m1j, θVj=0 in case of m2j, and θHj=0 in case of m3j, it comes to the partial matrix, being same to that explained in the above.

In this manner, the matrix "M" is determined upon basis of each sampling phase difference (θHj, θVj), and the 16 pieces of coefficients (C1ReRe to C4ImIm), in total thereof, are determined so that the equation shown in FIG. 40C can be always established. In this instance, it is enough to determine the coefficients (C1ReRe to C4ImIm) through the calculation shown in FIG. 40I while obtaining a reverse matrix "M$^{-1}$" to the matrix "M", in advance. As a method for obtaining the reverse matrix "M$^{-1}$", there are well-known the method of using a cofactor matrix, the method of using the sweeping method of Gauss-Jordan, and the method of calculation by dividing into triangular matrixes, etc., and therefore the illustration thereof will be omitted herein.

Figure 41:
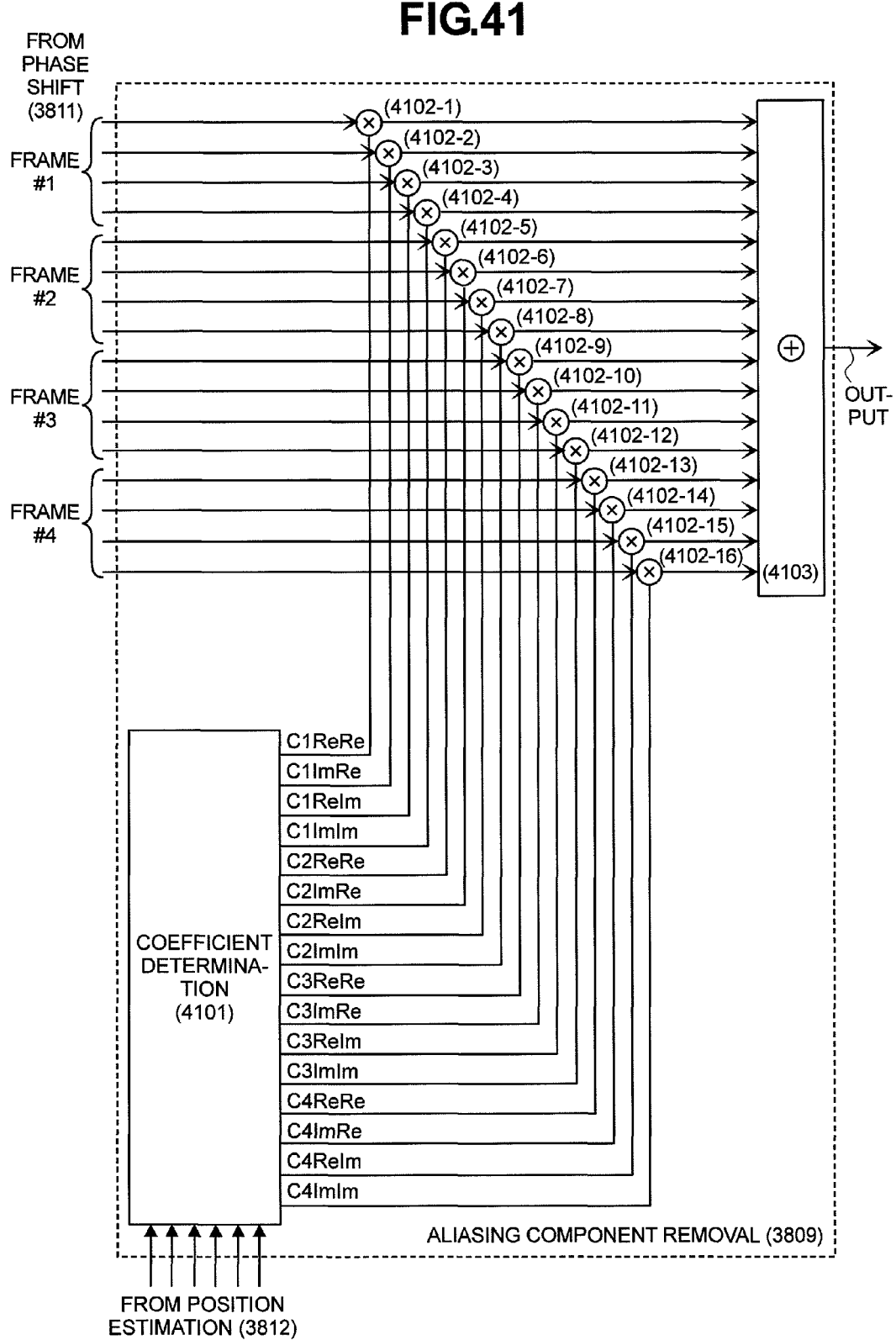
FIG. 41 is a view for explaining the embodiment 11 according to the present invention.

FIG. 41 shows an example of detailed structures of the aliasing component removal unit (3809) shown in FIG. 38. In the same figure, a coefficient determining portion or unit (4101) produces each of the coefficients (C1ReRe to C4ImIm), through the reverse matrix operation shown in FIG. 40I, upon basis of the horizontal phase differences (θH2, θH3 and θH4) and the vertical phase differences (θV2, θV3 and θV4), which are outputted from the position estimation unit (3812). Those coefficients are multiplied with the signals of each frame, which are outputted from the phase shifter unit (3811), within a multiplexer (4102), and further all of them are adding in an adder (4103), and thereby obtaining an output signal of the aliasing component removal unit (3809) (i.e., an output signal of the resolution converter unit (8)). Further, since the horizontal phase differences (θH2, θH3 and θH4) and the vertical phase differences (θV2, θV3 and θV4) differ from in the value for each pixel on the input frame, in general, there is a necessity of conducting the reverse matrix operation mentioned above for each pixel. In this instance, the respective coefficients (C1ReRe to C4ImIm) may be produced, in advance, with using the horizontal phase differences (θH2, θH3 and θH4) and the vertical phase differences (θV2, θV3 and θV4) as the representative phase differences (such as, π/8 multiplied by an integer shown in FIG. 9D, for example), so as to build up a table, with using a ROM (Read Only Memory), etc. This is well known as a table referencing method, in general, and therefore the illustration thereof will be omitted herein.

Figure 42:
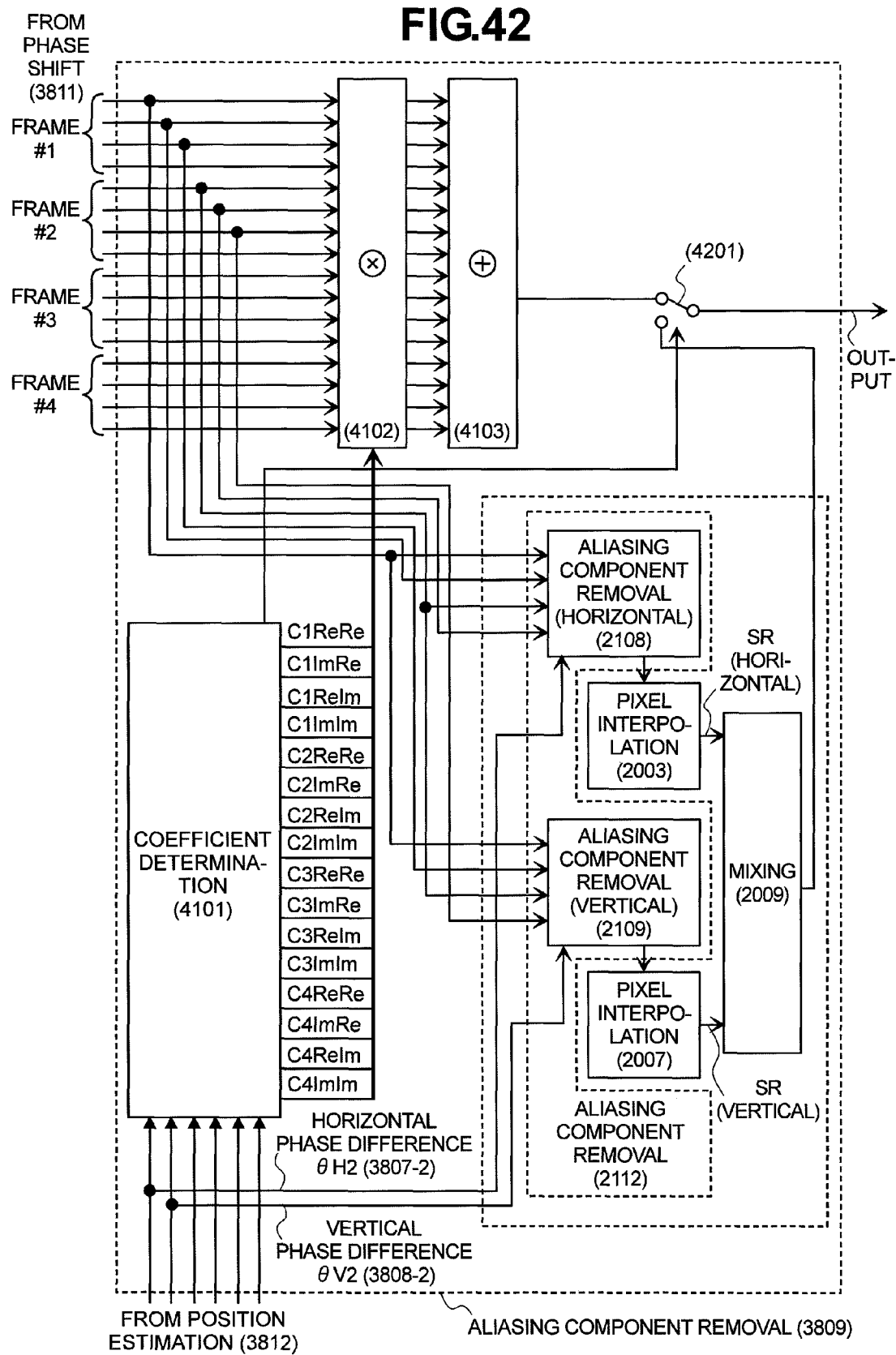
FIG. 42 is a view for explaining the embodiment 11 according to the present invention.

FIG. 42 shows other example of the structures of the aliasing component removal unit (3809) shown in FIG. 38. In the explanation given in the above, the coefficients (C1ReRe to C4ImIm) are determined through the operation shown in FIG. 40I, while obtaining the reverse matrix "M$^{-1}$" to the matrix "M" in advance, when determining the 16 pieces of coefficients (C1ReRe to C4ImIm) so that the equation shown in FIG. 40C can be always established; however, there is no such reverse matrix "M$^{-1}$" depending upon the value of the horizontal phase differences (θH2, θH3 and θH4) and the vertical phase differences (θV2, θV3 and θV4); i.e., there is a possibility that the coefficients (C1ReRe to C4ImIm) cannot be determined. On if there is reverse matrix "M$^{-1}$" or not can be determined, easily, on the way of operations of the method of using the cofactor matrix, the method of using the sweeping method of Gauss-Jordan, or the method of calculation by dividing into triangular matrixes, etc., when calculating out the reverse matrix "M$^{-1}$" in the coefficient determining unit (4101), and in case where there in no reverse matrix "M$^{-1}$", it is enough to exchange the output signal, so as to obtain the output with using the frame #1 and the frame #2, by means of the resolution converter unit (4) shown in FIG. 21, etc., mentioned above. Thus, with using the horizontal direction aliasing component removal unit (2108), the vertical direction aliasing component removal unit (3809), the pixel interpolation unit (2003) and (2007), which are shown in FIG. 42, it is enough to produce a resolution conversion result, upon basis of the frame #1 and the frame #2, which are outputted from the phase sifter unit (3811), and the horizontal phase difference θH2 (3807-2) and the vertical phase difference θV2 (3808-2), to be replaced with the result of the adder (4103) mentioned above, with using the exchanger (4201). However, it is also possible to build up in such a manner, that not changing in a binary manner with using the exchanger (4201), but the output of the adder (4103) and the output of the mixer (2009) are mixed continuously (i.e., weighting sum); for example, it may be so built up that a mixing ratio of the output of the mixer (2009) in the vicinity of pixel where there is no reverse matrix "$M^{-1}$".

With such the aliasing component removal process explained in the above, there can be achieved an effect of increasing the resolution in the 2-dimensional area shown in FIG. 40A, in particular, from the center up to $(\mu, \upsilon)=(\mu s, 0)$ in the horizontal direction. And, in the vertical direction, there can be achieve an effect of increasing the resolution from the center up to $(\mu, \upsilon)=(\mu s, 0)$. Also, in the oblique direction, there can be achieved an effect of increasing the resolution from the center up to $(t, \upsilon)=(\mu s, \upsilon s)$.

Herein, although the high resolution is achieved in the oblique direction, in addition to the horizontal direction and the vertical direction, also in the video signal processing apparatus and the video signal processing method according to the embodiment 7, however the effect of increasing the resolution in the oblique direction cannot reach to $(\mu, \upsilon)=(\mu s, \upsilon s)$, as is shown in FIG. 31.

Therefore, the video signal processing apparatus shown in FIG. 38 has an effect of enabling an increase of resolution, in particular, in the oblique direction thereof, up to the high frequency component, comparing to the video signal processing apparatus according to the embodiment 7.

Figure 44:
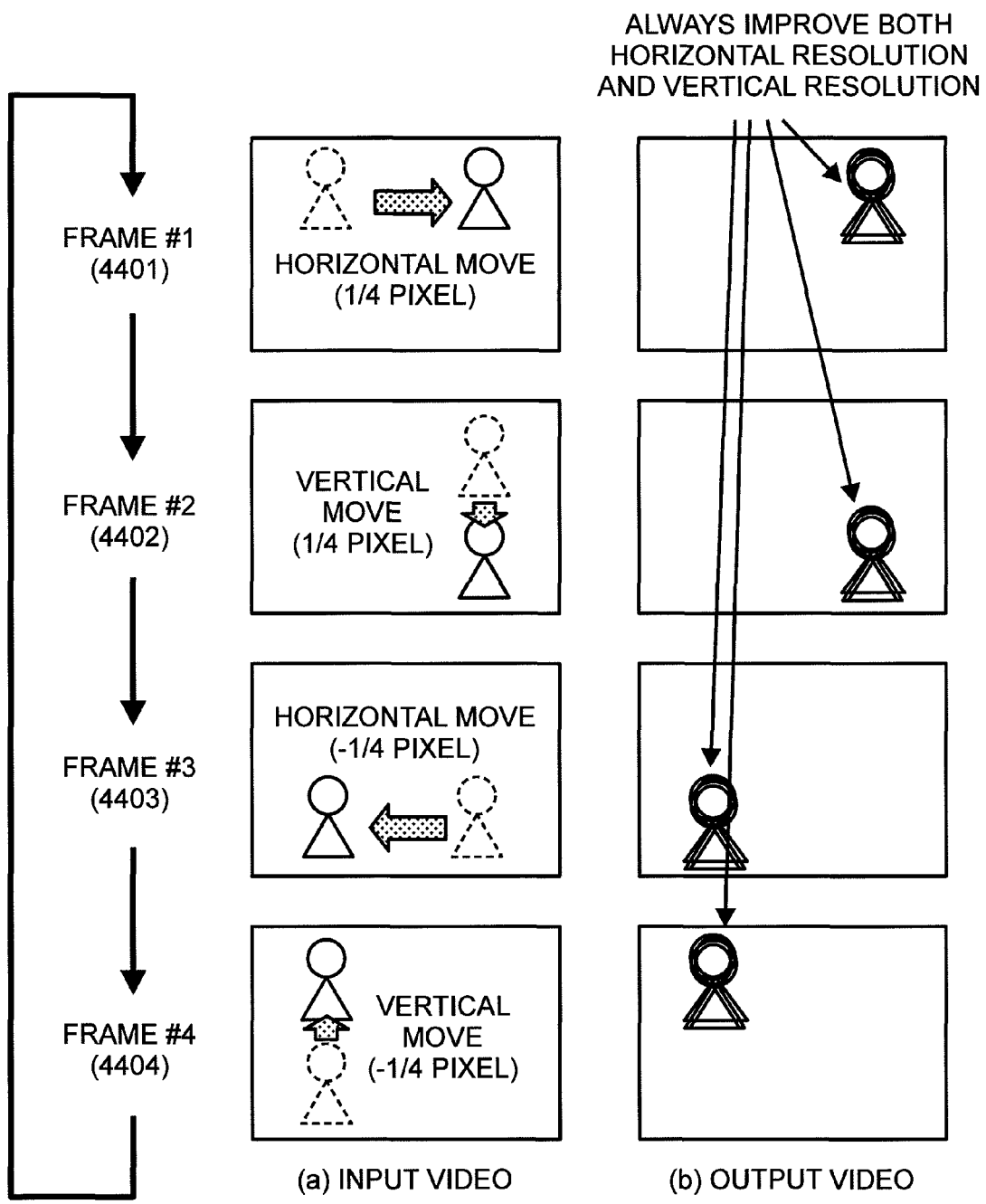
FIG. 44 is a view for explaining the difference in the operations, between an embodiment of the present invention and the conventional art.

Next, explanation will be made on the difference in the operation, between the video signal processing apparatus according to the embodiment 11 of the present invention and the prior art, by referring to FIG. 44. In this FIG. 44, (a) shows the frame #1 (4401), the frame #2 (4402), the frame #3 (4403), the frame #4 (4404) and the frame #5 (4405), which are inputted into the resolution converter unit (8) shown in FIG. 38, while (b) of FIG. 44 shows the respective frames outputted from the resolution converter unit (8). In each of the frames, the object is shifted into the right-hand (or clockwise) by ¼ pixel, so that the object turns one (1) round by four (4) frames, intentionally. This motion is continued in the similar manner, on the frame #5 and thereafter.

With the prior arts described in the Patent Document 1, the Patent Document 2 and the Non-Patent Document 1, as was mentioned above, because the aliasing comes from two (2) direction, i.e., the horizontal and vertical directions when conducting the high resolution upon the horizontal/vertical 2-dimensional input signal, then, if the band of the original signal is widen two (2) times in both the horizontal and vertical directions, three (3) aliasing components lie on one another, and for the purpose of canceling those, there are needed 2M+1=7 pieces of digital data (=video signals of 7 pieces of frames). Accordingly, when inputting such the signals turning one (1) turn by four (4) frames, as is shown in FIG. 34A, it is impossible to obtain independent data even if selecting any one of the seven (7) frames, and therefore the solution comes into indefinite; i.e., unobtainable.

On the other hand, if applying the embodiment 11, the high resolution can be achieved by removing the aliasing components in the horizontal direction, the vertical direction and the horizontal/vertical direction, as is shown in (b) of FIG. 44, with using, for example, neighboring four (4) frames (the frame #1 (4401), the frame #2 (4402), the frame #3 (4403) and the frame #4 (4404)). Thus, with using the input video shown in (a) of FIG. 44 as a test pattern, it is possible to confirm the operation condition of the present embodiment. With using a CZP (circular Zone Plate), which is well know, in general, as a design of this test pattern, an effect of the resolution conversion can be seen, directly, on the display unit (3). Thus, if moving the circular Zone Plate one (1) turn by four (4) frames, as is shown in (a) of FIG. 44, it is possible to confirm an effect of improving the resolution, while always displaying the video, the resolution of which is increased in the horizontal direction and in the vertical direction.

As was mentioned above, within the video signal processing apparatus according to the embodiment 11, plural kinds of phase shifts, differing in the direction thereof (e.g., the horizontal direction, the vertical direction and the horizontal/vertical direction), are conducted upon each of the video signals of four (4) pieces of input video frames, and thereby producing 16 pieces of signals from the video signals of the 4 pieces of input video frames. Herein, upon basis of the phase differences among the 4 pieces of input video frames, for those 16 pieces of signals, the coefficient is calculated for each pixel, so as to compose those 16 pieces of signals while canceling the aliasing components of thereof. For each of the pixels of the video to be produced, a sum is calculated upon the products, each being obtained through multiplying the pixel value of the corresponding pixel owned by each one of those 16 pieces of signals by each coefficient, respectively, and thereby producing the pixel values of a new high-resolution video.

With this, the video signal processing apparatus, according to the embodiment 11, is able to produce the high-resolution video, upon which the high resolution is achieved also in the lower right direction and the upper right direction, in addition to the horizontal direction and the vertical direction.

Also, the effect of improving the resolution, with the video signal processing apparatus according to the embodiment 11, in particular, in the oblique direction, is enable an increase of the resolution up to the frequency components higher than that can achieved by the video signal processing apparatus according to the embodiment 7; i.e., it is possible to produce the high resolution video being higher in the picture quality.

Embodiment 12

Explanation will be made on a video signal processing method according to an embodiment 12, by referring to FIGS. 43 and 19 attached herewith.

The embodiment 12 relates to a video signal processing method for achieving the processing, being equivalent to the video signal processing in the video signal processing apparatus according to the embodiment 11, by means of a controller unit cooperating with software.

Herein, explanation will be made on the video signal processing apparatus for achieving the video signal processing method according to the present embodiment, by referring to FIG. 19.

Figure 19:
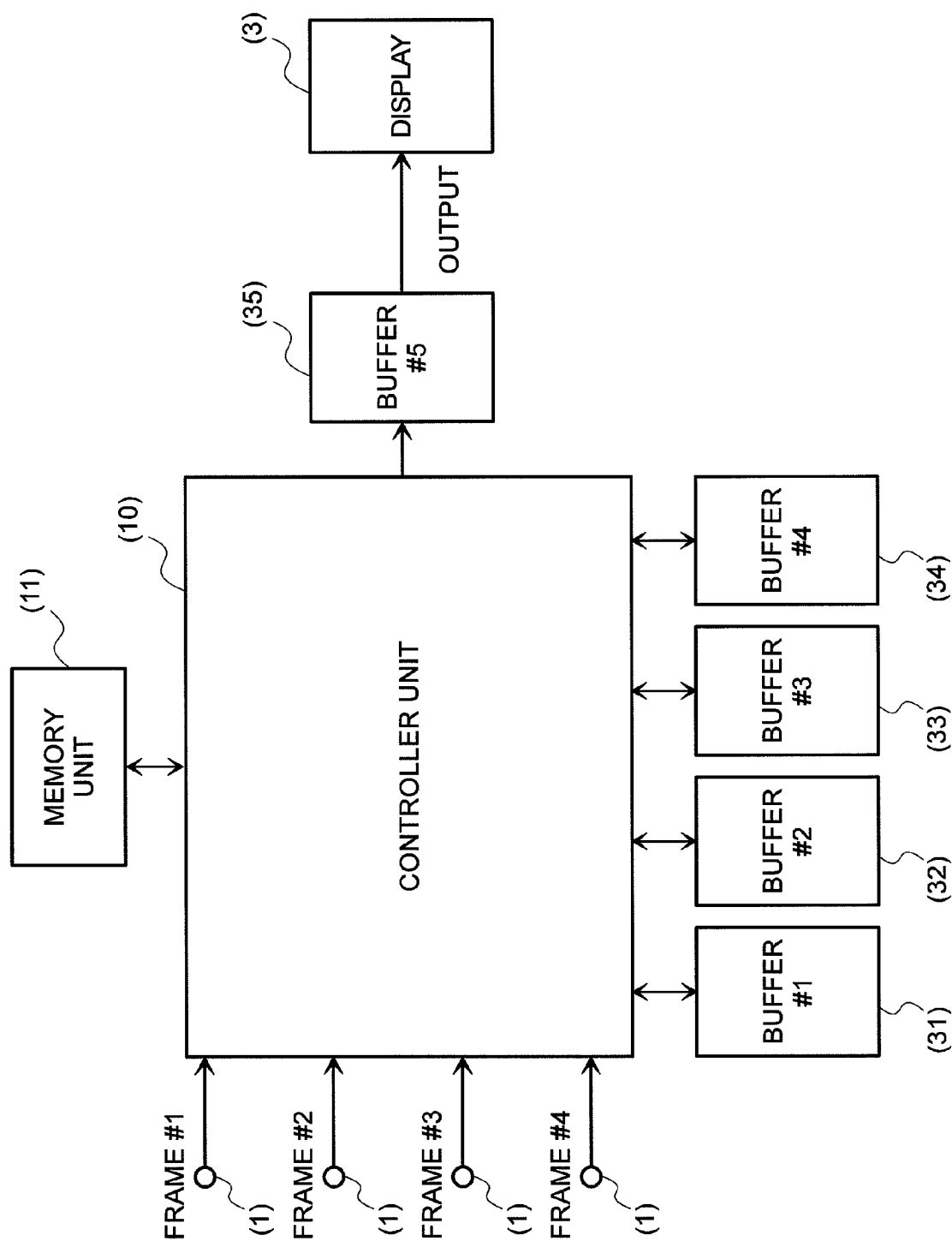
FIG. 19 is a view for explaining an embodiment 12, according to the present invention.

The video signal processing apparatus shown in FIG. 19 comprises an input portion (1), to which a video signal is inputted, such as, a television broadcast signal, etc., for example, a memory portion (11) for memorizing software therein, for processing the signal inputted from the input portion (1), a controller portion (10) for conducting the video signal processing upon the signal inputted from the input portion (1) cooperating with the software memorized in the memory portion (11), a frame buffer #1 (31), a frame buffer #2 (32), a frame buffer #3 (33) and a frame buffer #4 (34), each to be used as a buffer by the controller unit (10) in the processing of that video signal, and a buffer #5 (35) for frame buffering the signal after video signal processing, to be outputted from the controller portion (10) to an output portion (3).

Herein, the number of the input portions (1) provided on the video signal processing apparatus shown in FIG. 19 is four (4), being equal to the number of frames to be used in the video processing, but may be only one (1) of the input portion (1) for inputting the four (4) frames, continuously or in series.

Also, the frame buffer #1 (31), the frame buffer #2 (32), frame buffer #3 (33) and a frame buffer #4 (34) for use of the memory butter, and also the memory portion (11) for memorizing the software therein, may be constructed with using the individual chips thereof, respectively, or with using one (1) piece of memory chip or a plural number of memory chips, while using it/them dividing each data address thereof.

In the present embodiment, on the video signal inputted from the input portion (1), the controller portion (10) conducts the video signal processing in cooperation with the software memorized in the memory portion (11), and outputs it to the display portion (3). The details of that video signal processing will be explained by referring to FIG. 43.

Figure 43:
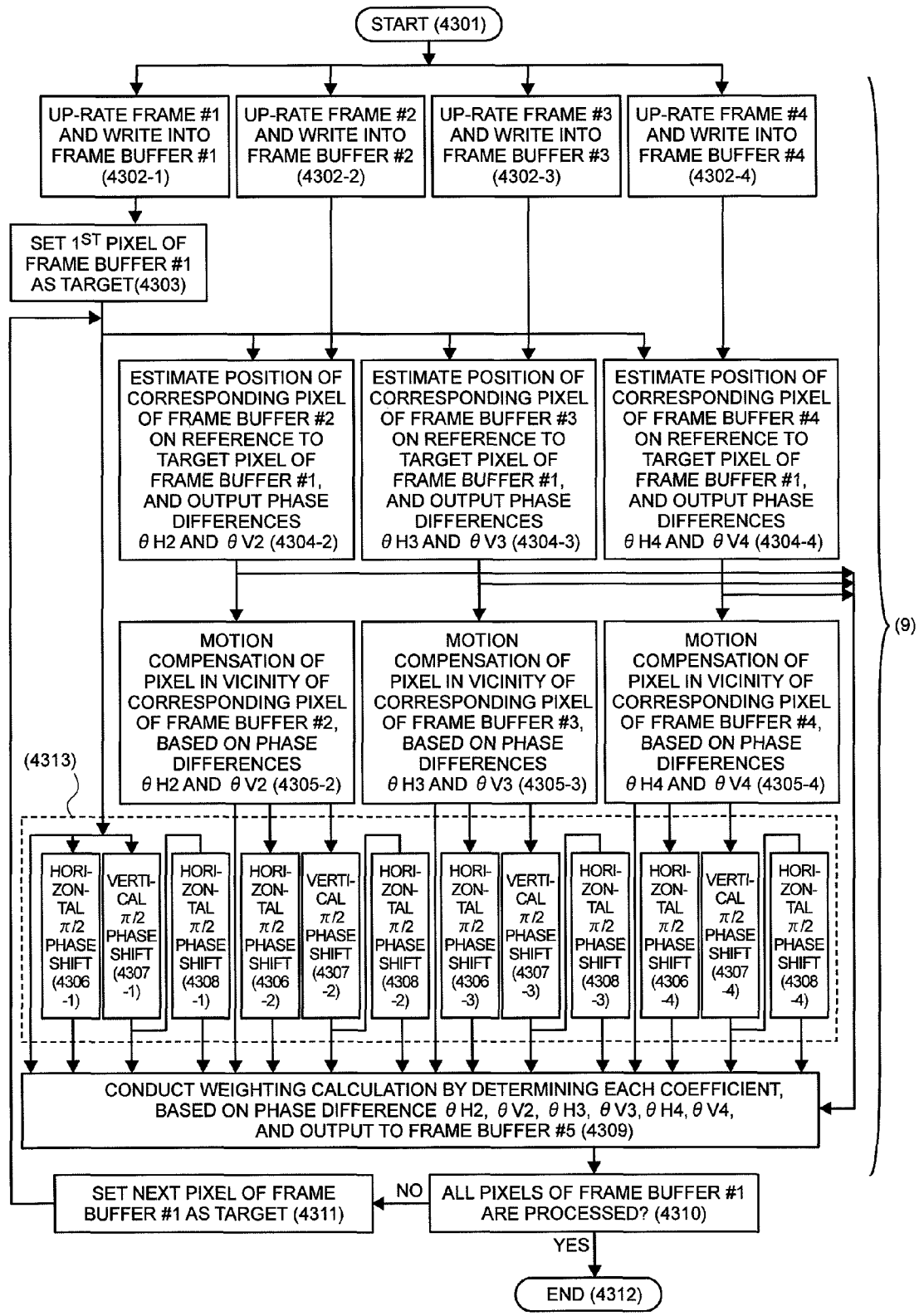
FIG. 43 is a view for explaining an embodiment 12 according to the present invention.

The flowchart shown in FIG. 43 starts from a step (4301), and the video data of each of the frames are up-rated in both the horizontal and vertical directions up to two (2) times, respectively, in steps (4302-1), (4302-2), (4302-3) and (4302-4). Thus, in the step (4302-1) is up-rated the video data of the frame #1 to be written into the frame buffer #1, in the step (4302-2) is up-rated the video data of the frame #2 to be written into the frame buffer #2, in the step (4302-3) is up-rated the video data of the frame #3 to be written into the frame buffer #3, and in the step (4302-4) is up-rated the video data of the frame #4 to be written into the frame buffer #4. Herein, the up-rating can be achieved by writing data for every second pixel after once clearing values of each of the frame buffers to zero (0).

Next, in a step (4303), the first pixel (for example, the pixel at the upper left) of the frame buffer #1 is set to be the processing target, and then the processing is looped until the processing is completed upon all the pixel data with respect to the frame buffer #1.

In a step (4304-2), estimation is made on a position of the corresponding pixel within the frame buffer #2, upon basis of the target pixel of the frame buffer #1, and thereby outputting the horizontal phase difference $\theta H2$ and the vertical phase difference $\theta V2$. In the similar manner, in a step (4304-3), estimation is made on a position of the corresponding pixel within the frame buffer #3, upon basis of the target pixel of the frame buffer #1, and thereby outputting the horizontal phase difference $\theta H3$ and the vertical phase difference $\theta V3$. Also, in a step (4304-4), estimation is made on a position of the corresponding pixel within the frame buffer #4, upon basis of the target pixel of the frame buffer #1, and thereby outputting the horizontal phase difference $\theta H4$ and the vertical phase difference $\theta V4$. In this instance, as the method for estimating the position of the corresponding pixel can be applied the prior art mentioned above, as it is.

In a step (4305-2), upon basis of the horizontal phase difference $\theta H2$ and the vertical phase difference $\theta V2$ obtained in the step ((4304-2), motion compensation is conducted upon the pixels in the vicinity of the corresponding pixel within the frame buffer #2. The operation of this motion compensation can be achieved by conducting the operation explained by referring to FIGS. 5 and 6, in the horizontal direction and the vertical direction, respectively. In the similar manner, in a step (4305-3), upon basis of the horizontal phase difference $\theta H3$ and the vertical phase difference $\theta V3$ obtained in the step ((4304-3), motion compensation is conducted upon the pixels in the vicinity of the corresponding pixel within the frame buffer #3. Also, in a step (4305-4), upon basis of the horizontal phase difference $\theta H4$ and the vertical phase difference $\theta V4$ obtained in the step ((4304-4), motion compensation is conducted upon the pixels in the vicinity of the corresponding pixel within the frame buffer #4.

Following to the above, in a step (4313), shifting of the horizontal phase by a predetermined amount is made upon the frame buffer #1, and the frame buffer #2, the frame buffer #3 and the frame buffer #4, on which the motion compensation is made, in steps (4306-1), (4306-2), (4306-3) and (4306-4), and also in steps (4307-1), (4307-2), (4307-3) and (4307-4), shifting is made of the vertical phase by a predetermined amount. Also, on the results of the (4307-1), (4307-2), (4307-3) and (4307-4), further in steps (4308-1), (4308-2), (4308-3) and (4308-4), the horizontal phase is shifted by a predetermined amount; thereby shifting both the horizontal and vertical phases by a predetermined amount. Thus, the pixel data within each of the frame buffers are shifted by $\pi/2$ phase in the horizontal direction and the vertical direction.

Following to the above, in a step (4309), the pixel data of the frame buffers #1, #2, #3 and #4 are removed from the aliasing components thereof, by determining the each of the 16 pieces of coefficients (C1ReRe to C4ImIm), in total, in accordance with the method shown in FIGS. 40A to 40I upon basis of the horizontal phase differences ($\theta H2$, $\theta H3$ and $\theta H3$) and the vertical phase differences ($\theta V2$, $\theta V3$ and $\theta V4$), and by adding multiplications between each of outputs of a step (4313) and each of each of the coefficients (i.e., weighted addition), thereby to be outputted to a frame buffer #5. The operation of removing the aliasing component is same to that explained by referring to FIG. 41 or 42 in the above.

Following to the above, in a step (4310), determination is made on whether the processing is completed or not on all pixels of the frame buffer #1. If determining that it is not completed, after setting the next pixel (for example, the pixel at the right-hand neighbor) as the processing target in a step (4311), the process turns back to those in the steps (4304-2), (4304-3) and (4304-4) and thereafter. On the other hand, if determining that it is completed, the process is ended in a step (4312).

With such the processing as was mentioned above, it is possible to output a high-resolution signal to the frame buffer #5 with using the pixel data of the frame buffer #1, the frame buffer #2, the frame buffer #3 and the frame buffer #4. In case when applying to the moving picture, it is enough to repeat the processes, for each frame, starting from the step (4301) and reaching to the step (4312).

However, in FIGS. 38, 41, 42 and 43, the explanation was made that the number of pieces of the frames to be inputted is four (4), but it should not be limited to that, according to the present invention, and it is also possible to input "n" pieces of frames (however, "n" is an integer equal to four (4) or larger than that), to be used by selecting four (4) pieces of frames, being appropriate for the resolution conversion process mentioned above, among of those. For example, when outputting the reverse matrix operations shown in FIG. 40I, it is also possible to adopt such structures that, the four (4) pieces of frames are selected to be applied into the resolution conversion process among the "n" pieces of frames, to be exchanged for each pixel or each area made up with a plural number of pixels, for the purpose of lessen the number of pixels, on which no reverse matrix "$M^{-1}$" exists, as small as possible.

Accordingly, the video signal processing method according to the embodiment 12 has an effect, in particular, in the oblique direction, to enable a further increase of the resolution up to the frequency components, higher than that obtainable by the video signal processing method according to the embodiment 10. The details of that effect are same to that of the video processing apparatus shown in FIG. 38, which was explained in the embodiment 11, and therefore the explanation thereof will be omitted herein.

As was explained in the above, with the video signal processing method according to the embodiment 12, four (4) signals are produced from each video signal, respectively, by conducting the phase shifting of plural kinds differing in the direction thereof (the horizontal direction, the vertical direction and the horizontal/vertical direction) upon each of the four (4) pieces input video frames. With this, sixteen (16) signals are produced from each video signal of four (4) pieces of the input video frames. Herein, upon the basis of the phase difference of four (4) pieces of the input video frames, the coefficient is calculated for each signal, so as to compose those sixteen (16) signals while canceling the aliasing components thereof, for each of that sixteen (16) signals. For each of the pixels of the vide produced, a sum is calculated upon products of the pixel value, which is owned by each of the sixteen signals, being multiplied by each coefficient, respectively, for each of the pixel of video produced, and thereby producing the pixel values of a new high resolution video.

With this, the video signal processing apparatus, according to the embodiment 12, is able to produce the high-resolution video, upon which the high resolution is achieved also in the lower right direction and the upper right direction, in addition to the horizontal direction and the vertical direction.

Also, the effect of improving the resolution, with the video signal processing apparatus according to the embodiment 12, is to enable an increase of the resolution up to the high frequency components, in particular, in the oblique direction thereof, comparing to the video signal processing method according to the embodiment 10; i.e., it is possible to produce the high resolution video, being higher in the picture quality thereof.

Further, with the video signal processing apparatus or the video signal processing method according to the embodiments 1 through 12, the explanation was made by referring to the case of increasing the pixel number up to two (2) times while increasing the resolution of the video, however it is also possible to increase the pixel numbers up to two (2) times, four (4) times, eight (8) times, (i.e., "$n^{th}$" power of 2), for example, by functioning this video signal processing apparatus or the video signal processing method, by a plural number of times or in a multistage-like manner. Thus, after increasing the pixel number up to two (2) times, by conducting the signal processing with using two (2) pieces of input video frames, to be an intermediate video frame, and further by conducting the signal processing as a new input video frame with using two (2) pieces of the intermediate frames, it is possible to obtain an output video frame, increasing the pixel number thereof further up to two (2) times thereof. In this instance, comparing to the input video frame, it is possible to obtain the output video frame having four (4) times of the pixel number. In the similar manner, if repeating the signal processing three (3) times, in total thereof, the pixel number of the output video frame comes to be eight (8) times, comparing to that of the input video frame. In this instance, also the number of pieces of the input video frame necessary for obtaining one (1) piece of the output video frame becomes two (2) times, four (4) times, eight (8) times, (i.e., "$n^{th}$" power of 2).

Further, regarding the final output video, it is also possible to output it with the pixel number other than two (2) times, four (4) times, eight (8) times, (i.e., "$n^{th}$" power of 2) mentioned above, by conducting a general resolution conversion process after the video processing mentioned above.

Embodiment 13

FIG. 35 shows a video displaying apparatus, according to an embodiment 13 of the present invention. The video displaying apparatus according to the present embodiment is that of the structures, for conducting the video signal processing, which is described in either the embodiment 7 or 8 mentioned above.

In the same figure, the video displaying apparatus 3500 comprises an input unit 3501 for inputting the broadcast wave, including a television signal or the like, for example, and/or the broadcast signal or the picture contents or the video contents, etc., through a network, etc., a recording/reproduction portion or unit 3502 for recording or reproducing the contents, which are inputted from the input unit 3501, a contents accumulator portion or unit 3503, into which the recording/reproduction unit 3502 records the contents, a video signal processor portion or unit 3504 for conducting video signal processing, which is described in any one of the embodiments, i.e., the first to the eleventh embodiments, upon the picture signal or the video signal that the recording/reproduction unit 3502 reproduces, a display portion or unit 3505 for displaying the picture signal or the video signal thereon, which is processed within the video signal processor unit 3504, an audio output portion or unit 3506 for outputting an audio signal, which the recording/reproduction unit 3502 reproduces, a controller portion or unit 3507 for controlling the respective units of the video display apparatus 3500, and a user interface portion or unit 3508 for a user to conduct operations of the video display apparatus 3500, etc.

Detailed operations of the video signal processor unit 3504 are as described in the embodiment 7 or 8, and therefore the explanation thereof will be omitted herein.

With provision of the video signal processor unit 3504 for conducting the video signal process, which is described in either embodiment 7 or 8, the first to the eleventh embodiments, in the video display apparatus 3500, it is possible to display the picture signal or the video signal, which is inputted into the input unit 3501, to be the picture signal or the video signal of being more high in the resolution and high-quality. Therefore, it is possible to achieve a display of high-quality and high-definition while achieving the high resolution of the reproduced signal, even in the case when a signal of resolution lower than the resolution of a display device of the display unit 3505 is inputted from the input unit 3501.

Also, when reproducing the picture contents or the video contents, which are accumulated in the contents accumulator unit 3503, it is possible to display it on the display unit 3505 by converting it into the picture signal or the video signal, which is high in the resolution and high in the quality thereof.

Also, by conducting the video processing of the video signal processor unit 3504 after reproduction of the picture contents or the video contents, which are accumulated in the contents accumulator unit 3503, the data accumulated within the contents accumulator unit 3503 is relatively low in the resolution, comparing to that resolution displayed on the display unit 3505. Therefore, there can be obtained an effect of accumulating the data of contents to be small in the volume thereof, relatively.

Also, with containing the video signal processor unit 3504 into the recording/reproducing unit 3502, it is possible to conduct the video signal processing mentioned above when recording. In this case, there is no necessity of conducting the video signal processing mentioned above when reproducing, there can be obtained an effect of lowering a process load when reproducing.

Herein, although the explanation was made that the video signal processing mentioned above is conducted within the video signal processor unit 3504, but it may be achieved by means of the controller unit 3507 and the software. In this case, it is enough to conduct the video signal processing with the method, which is described in any one of the embodiments, i.e., the first to the eleventh embodiments.

In the present embodiment, when recording, it is enough for the recording/reproducing unit 3502 to record the contents, such as, the picture or the like, which is inputted from the input unit 3501, into the contents accumulator unit 3503, after conducting the coding thereon, depending on the condition thereof.

Also, in the present embodiment, it is enough for the recording/reproducing unit 3502 to reproduce the contents, such as, the picture or the like, which is inputted from the input unit 3501, by conducting the decoding thereon, if the contents are under the condition of being coded.

Also, in the present embodiment, it is not always necessary to provide the contents accumulator unit 3503. In this case, the contents accumulator unit 3503 does not conduct the recording, but it may conduct reproduction of the contents, such as, the picture or the like, which is inputted from the input unit 3501.

In this case, it is also possible to obtain an effect of displaying the picture signal or the video signal, which is inputted into the input unit 3501, to be the high-quality picture signal or video signal, with higher resolution.

Also, the video display apparatus 3500 may be, for example, a plasma display, or a liquid crystal television, or a CRT tube or a projector, or it may be an apparatus applying other device therein. In the similar manner, the display unit 3505 may be, for example, a plasma display module, or a LCD module, or a device for use of the projector. Also, the contents accumulator unit 3503 may be, for example, a hard disk drive, or a flash memory, or a removable media disk drive. The audio output unit 3506 may be, for example, speakers, etc. Also, the input unit 3501 may be that having a tuner for receiving the broadcast wave, or that having a LAN connector for connecting with the network, or that having a USB connector. Further, it may be that having terminals for digital inputting of the picture signal and the audio signal, or may be that having analog input terminals, such as, composite terminals and/or component terminals, for example. Or, it may be a receiver portion or unit for transmitting data in a wireless manner.

With the video signal processing apparatus according to the embodiment 13, which was explained in the above, two (2) signals are produced from the each video signal, respectively, by conducting the phase shifting on the each video signal of two (2) pieces of the input video frames, which are included in the input picture signal or the input video signal. With this, four (4) signals can be produced from the two (2) pieces of the input video frames. Herein, upon basis of the phase difference between the two (2) pieces of the input video frames, the coefficient is calculated out, respectively, for composing those four (4) signals while canceling the aliasing components thereof, for each pixel, for each one of that four (4) signals. For each pixel of the video to be produced, a sum is calculated upon products of the pixel values of the corresponding pixels owned by each signal of the four (4) signals mentioned above, each being multiplied by each coefficient, respectively, and thereby producing pixel values of a new high resolution video. With conducting this upon each of the pixels of the video to be produced, it is possible to produce a video achieving high-resolution in one-dimensional direction more than the input video frame.

With conducting this upon the horizontal direction and the vertical direction, respectively, it is possible to produce a video achieving high resolution in the horizontal direction and a video achieving high resolution in the vertical direction. Upon that video achieving high resolution in the horizontal direction and that video achieving high resolution in the vertical direction is conducted the up-rating process in the vertical direction and the horizontal direction, respectively, and thereafter both are combined with or mixed up.

With this, it is possible to produce a high resolution video achieving the high resolution in both the vertical direction and the horizontal direction, from the each video signal of the two (2) pieces of input video frames, which are included in the input picture signal or the input video signal. Thus, 2-dimensional high-resolution video can be produced, and this can be displayed on a display portion or unit.

Also, with the video signal processing apparatus according to the embodiment 13, since two (2) pieces of input video frames are used, therefore it is possible to achieve the high resolution display with a lesser amount of necessity processes. With this, it is possible to achieve the video displaying apparatus, for displaying the picture or the video on the display unit, being high in the resolution thereof in both directions, i.e., the horizontal direction and the vertical direction, with less aliasing components therein.

Embodiment 14

The video signal displaying apparatus, according to an embodiment 14, is that replacing the video signal processing unit 3504 shown in FIG. 35, with the video signal processing apparatus described in the embodiment 9, within the video displaying apparatus according to the embodiment 13. Other elements or structures thereof are same to those of the video displaying apparatus according to the embodiment 13, and therefore the explanation thereof will be omitted herein.

Also, the detailed operations of the video signal processing unit 3504 are as described in the embodiment 9, and therefore the explanation thereof will be omitted herein.

With the video displaying apparatus according to the embodiment 14, it is possible to produce the high resolution video, upon which the high resolution is achieved in the horizontal direction, the vertical direction and the oblique direction, than the input picture or the input video, with using two (2) pieces of input video frames, which are included in the input picture signal or the input video signal. Also, it is possible to achieve the video displaying apparatus for displaying this on the display unit thereof.

Embodiment 15

The video signal displaying apparatus, according to an embodiment 14, is that replacing the video signal processing unit 3504 shown in FIG. 35, with the video signal processing apparatus described in the embodiment 11, within the video displaying apparatus according to the embodiment 13. Other elements or structures thereof are same to those of the video displaying apparatus according to the embodiment 13, and therefore the explanation thereof will be omitted herein.

Also, the detailed operations of the video signal processing unit 3504 are as described in the embodiment 11, and therefore the explanation thereof will be omitted herein.

With the video displaying apparatus according to the embodiment 14, it is possible to produce the high resolution video, upon which the high resolution is achieved in the horizontal direction, the vertical direction and the oblique direction, than the input picture or the input video, with using four (4) pieces of input video frames, which are included in the input picture signal or the input video signal. Also, it is possible to achieve the video displaying apparatus for displaying this on the display unit thereof.

Also, the effect of the video displaying apparatus, according to the embodiment 15, is to enable an increase of the resolution up to the high frequency components, in particular, in the oblique direction thereof, comparing to the video displaying apparatus according to the embodiment 14; i.e., it is possible to display the high resolution video being higher in the picture quality thereof.

Embodiment 16

The video signal displaying apparatus, according to an embodiment 16, is that replacing the video signal processing unit 3504 shown in FIG. 35, with the video signal processing apparatus described in one embodiment among the embodiment 11, the embodiment 3 and the embodiment 5, within the video displaying apparatus according to the embodiment 13. Other elements or structures thereof are same to those of the video displaying apparatus according to the embodiment 13, and therefore the explanation thereof will be omitted herein.

Also, the detailed operations of the video signal processing unit 3504 are as described in the embodiment 1, the embodiment 3 or the embodiment 5, and therefore the explanation thereof will be omitted herein.

With the video displaying apparatus according to the embodiment 16, it is possible to produce the high resolution video, upon which the high resolution is achieved in the one-dimensional direction comparing to the input picture signal or the input video signal, with using two (2) pieces of input video frames, which are included in the input picture signal or the input video signal, and thereby to achieve the video displaying apparatus for displaying it on the display unit thereof.

Embodiment 17

Figure 36:
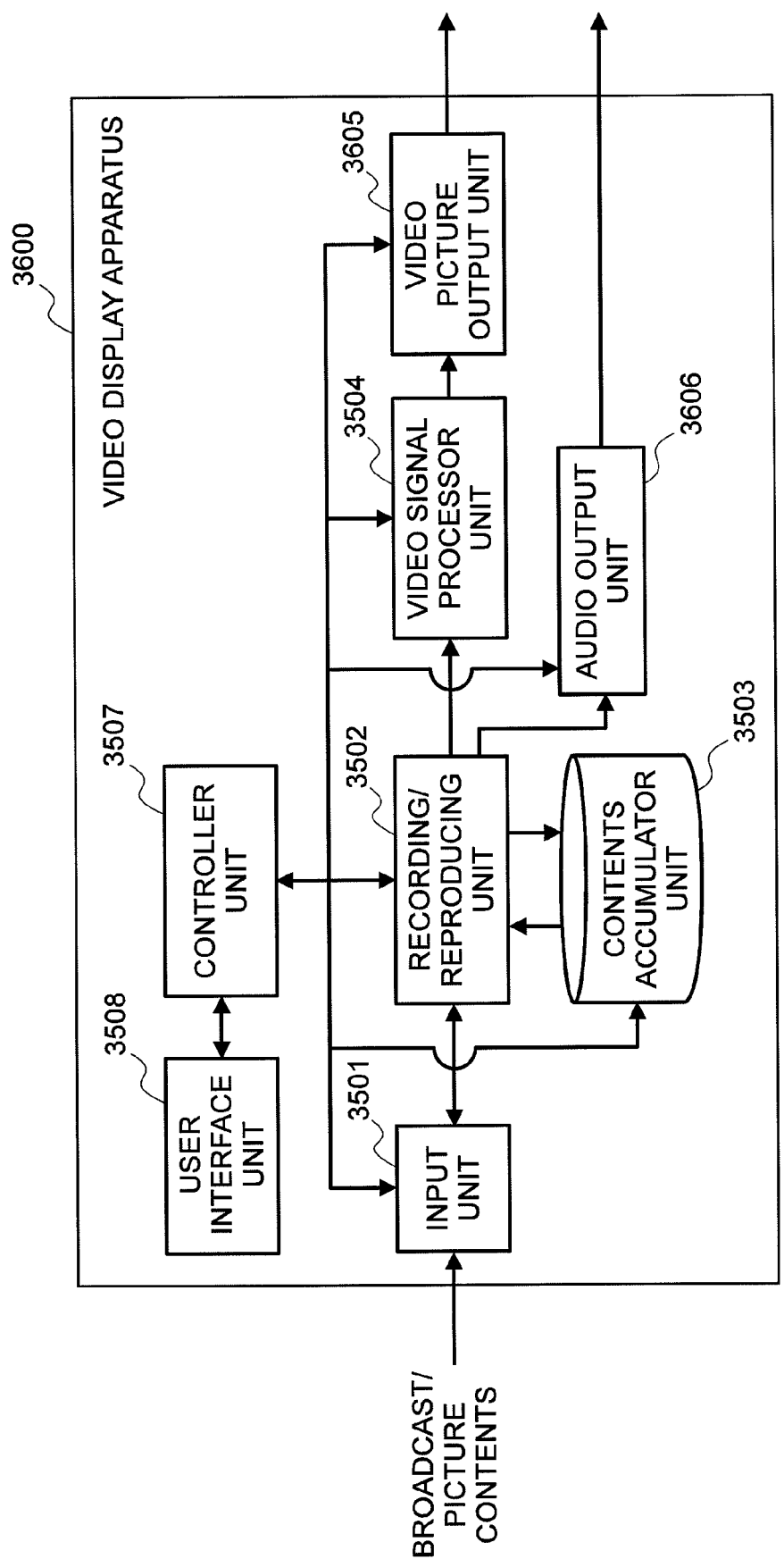
FIG. 36 is a view for explaining an embodiment 17, according to the present invention.

FIG. 36 shows a recording/reproducing apparatus, according to an embodiment 17 of the present invention. The recording/reproducing apparatus according to the present embodiment is that having the structures for conducing the video signal processing, which is described in either the embodiment 7 or the embodiment 8 mentioned above.

In the same figure, the recording/reproducing apparatus 3600 comprises the an input portion or unit 3501 for inputting the broadcast wave, including a television signal or the like, for example, and/or the broadcast signal or the picture contents or the video contents, etc., through a network, etc., the recording/reproduction unit 3502 for recording or reproducing the contents, which are inputted from the input unit 3501, the contents accumulator unit 3503, into which the recording/reproduction unit 3502 records the contents, the video signal processor unit 3504 for conducting video signal processing, which is described in any one of the embodiments, i.e., the first to the eleventh embodiments, upon the picture signal or the video signal that the recording/reproduction unit 3502 reproduces, a video/picture output portion or unit 3605 for outputting the picture signal or the video signal, which is processed within the video signal processor unit 3504, to other apparatus(es) or device(s), etc., an audio output portion or unit 3606 for outputting the audio signal, which the recording/reproducing unit 3502 reproduces, to other apparatus(es) or device(s), etc., and a user interface portion or unit 3508 for a user to conduct operations of the recording/reproducing apparatus 3600, etc.

With provision of the video signal processor unit 3504 for conducting the video signal process, which is described in either one of the embodiments, i.e., the embodiment 7 or the embodiment 8, in the recording/reproducing apparatus 3600, it is possible to output the picture signal or the video signal, which is inputted into the input unit 3501, to be the picture signal or the video signal of being more high in the resolution and high-quality, to other apparatus(es) or device(s). Therefore, it is possible to achieve a high-quality and high-resolution signal converter apparatus, preferably, for converting the picture signal or the video signal of low resolution into the picture signal or the video signal of high-quality and high-definition while achieving the high resolution thereof.

Also, when reproducing the picture contents or the video contents, which are accumulated in the contents accumulator unit 3503, it is possible to output it to other apparatus (es) or device(s), with converting it into the picture signal or the video signal, which is high in the resolution and high in the quality thereof.

Therefore, it is possible to achieve the recording/reproducing apparatus, preferably, for outputting the picture signal or the video signal after converting it into that having the high picture quality and high definition with achieving the high resolution when reproducing/outputting, while inputting the picture signal or the video signal of low resolution for accumulating therein.

Also, by conducting the video processing of the video signal processor unit 3504 after reproduction of the picture contents or the video contents, which are accumulated in the contents accumulator unit 3503, the data accumulated within the contents accumulator unit 3503 is relatively low in the resolution, comparing to that resolution displayed on the display unit 3505. Therefore, there can be obtained an effect of accumulating the data of contents to be small in the volume thereof, relatively.

Also, with containing the video signal processor unit 3504 into the recording/reproducing unit 3502, it is possible to conduct the video signal processing mentioned above when recording. In this case, there is no necessity of conducting the video signal processing mentioned above when reproducing, there can be obtained an effect of lowering a process load when reproducing.

Herein, although the explanation was made that the video signal processing mentioned above is conducted within the video signal processor unit 3504, but it may be achieved by means of the controller unit 3507 and the software. In this case, it is enough to conduct the video signal processing with the method, which is described in either one of the embodiments, i.e., the embodiment 7 or the embodiment 8.

In the present embodiment, when recording, it is enough for the recording/reproducing unit 3502 to record the contents, such as, the picture or the like, which is inputted from the input unit 3501, into the contents accumulator unit 3503, after conducting the coding thereon, depending on the condition thereof.

Also, in the present embodiment, it is enough for the recording/reproducing unit 3502 to reproduce the contents, such as, the picture or the like, which is inputted from the input unit 3501, by conducting the decoding thereon, if the contents are under the condition of being coded.

Also, the video/picture output unit 3605 according to the present embodiment may be formed with the audio output unit 3606 in one body. In this case, there may be applied a connector configuration for outputting the picture signal and the audio signal on one piece of a cable.

Also, the recording/reproducing apparatus 3600 may be, for example, a HDD recorder, a DVD recorder, or an apparatus adapting other memory apparatus therein. In the similar manner, the contents accumulator unit 3503 may be, for example, a hard disk drive, or a flash memory, or a removable media disk drive.

Also, the input unit 3501 may be that having a tuner for receiving the broadcast wave, or that having a LAN connector for connecting with the network, or that having a USB connector. Further, it may be that having terminals for digital inputting of the picture signal and the audio signal, or may be that having analog input terminals, such as, composite terminals and/or component terminals, for example. Or, it may be a receiver portion or unit for transmitting data in a wireless manner.

Also, the video/picture output unit 3605 may be equipped with a terminal for outputting the digital picture signal thereon, or equipped with a composite terminal or a component terminal, for outputting an analog signal thereon. Or, it may be equipped with a LAN connector for connecting with the network, or may be equipped with a USB cable. Further, it may be a transmitter portion or unit for transmitting data in a wireless manner. In relation to the audio output unit 3606, it is also similar to the video/picture output unit 3605.

Further, the input unit 3501 may comprises an image pickup optical system and a light-receiving element therein. In this instance, the recording/reproducing apparatus 3600 can be applied into, such as, a digital camera, a video camera, an observation camera (or an observation camera system), etc., for example. In this case, the input unit 3501 takes a picture of a target of photographing on the light-receiving element through the image pickup optical system, and the video data or the picture data may be produced upon basis of the signal outputted from the light-receiving element, to be outputted to the recording/reproducing unit 3502.

When the recording/reproducing apparatus 3600 is applied into the digital camera, it is possible to obtain one (1) piece of high-quality picture with high-resolution, by recording a plural number of videos, differing in time sequence, by one (1) time of photographing, and thereafter conducting the video signal processing of the video signal processor unit 3504, upon the plural number of video data. However, the video signal processing of the video signal processor unit 3504 may be conducted upon the video to be recorded into the contents accumulator unit 3503, when outputting the data from the digital camera. Or, the video signal processing of the video signal processor unit 3504 may be conducted before recording the data into the contents accumulator unit 3503, by unifying recording/reproducing unit 3502 and the video signal processor unit 3504 as a unit, or so on. In this instance, it is enough to store only an enlarged or expanded video to be treated by the user, finally, in the contents accumulator unit 3503, and therefore a management comes to be easy when the user treats the video data later.

With the digital camera explained in the above, it is possible to obtain the video data of high picture quality, having the resolution exceeding the resolution of a light or photo receiving element(s) of that digital camera.

Also, when the recording/reproducing apparatus 3600 is applied into the video camera, for example, the picture being photographed on the light-receiving element through the image pickup optical system of the input unit 3501 may be outputted to the recording/reproducing unit 3502, in the form of the picture data. The recording/reproducing unit 3502 may record the video data into the contents accumulator unit 3503, and the video signal processor unit 3504 may produce the pictured at a of high-resolution, from the video data recorded. With doing this, it is possible to obtain the high-quality picture data, which has the resolution exceeding the resolution power of the light-receiving element of the video camera. And in this instance, the video signal processor unit 3504 may produce a one (1) piece of still picture data, with using the data of the plural number of frames contained within the picture data recorded. With doing so, it is possible to obtain a one (1) piece of video data of high-quality from the picture data. Or, in the similar manner to the case of the digital camera mentioned above, the video processing of the video signal processor unit 3504 may be conducted before recording the picture data into the contents accumulator unit 3503, or after recording thereof.

With such the video camera as was mentioned above, it is possible to obtain the high-quality picture data, having the resolution exceeding the resolution power of the light-receiving element of the video camera, and/or the high-quality still video data, with using the picture data photographed.

Also when the recording/reproducing apparatus 3600 is applied into the observation camera (or the observation camera system), for example, in the similar manner to the case of the video camera mentioned above, it is possible to obtain the high-quality picture data, having the resolution exceeding the resolution power of the light-receiving element of the observation camera, and/or the high-quality still video data, with using the picture data photographed. In this instance, for example, even in case where the input unit 3501, which has the image pickup optical system and the light-receiving element therein, is separated from the recording/reproducing unit 3502 in the distance there between, and they are connected with each other through a network cable or the like, the picture data can be transmitted in the form of low resolution until the recording/reproducing unit 3502, and thereafter, the high-resolution can be obtained through the video signal processing within the video signal processor unit 3504. With this, it is possible to obtain the picture data of high-resolution, while using a band area of the transmission network for transmitting data from the input unit 3501 having the image pickup optical system and the light-receiving element therein.

With the video displaying apparatuses according to the embodiments 13 through 16 and the recording/reproducing apparatus according to the present embodiment, it is possible to obtain another embodiment of the present invention, by unifying or combining the operations and the structures of both of them. In this case, it is possible to display the picture signal or the video signal, upon which the video signal processing mentioned above was conducted, or to output it to other apparatus(es) or device(s); i.e., it can be used as any one of the display apparatus, the recording/reproducing apparatus, or the output apparatus, so that it is superior in the usability thereof.

With the video signal processing apparatus according to the embodiment 17, which was explained in the above, two (2) signals are produced from the each video signal, respectively, by conducting the phase shifting on the each video signal of two (2) pieces of the input video frames, which are included in the input picture signal or the input video signal. With this, four (4) signals can be produced from the two (2) pieces of the input video frames. Herein, upon basis of the phase difference between the two (2) pieces of the input video frames, the coefficient is calculated out, respectively, for composing those four (4) signals while canceling the aliasing components thereof, for each pixel, for each one of that four (4) signals. For each pixel of the video to be produced, a sum is calculated upon products of the pixel values of the corresponding pixels owned by each signal of the four (4) signals mentioned above, each being multiplied by each coefficient, respectively, and thereby producing pixel values of a new high resolution video. With conducting this upon each of the pixels of the video to be produced, it is possible to produce a video achieving high-resolution in one-dimensional direction more than the input video frame.

With conducting this upon the horizontal direction and the vertical direction, respectively, it is possible to produce a video achieving high resolution in the horizontal direction and a video achieving high resolution in the vertical direction. Upon that video achieving high resolution in the horizontal direction and that video achieving high resolution in the vertical direction is conducted the up-rating process in the vertical direction and the horizontal direction, respectively, and thereafter both are combined with or mixed up.

With this, it is possible to produce a high resolution video achieving the high resolution in both the vertical direction and the horizontal direction, from the each video signal of the two (2) pieces of input video frames, which are included in the input picture signal or the input video signal. Thus, 2-dimensional high-resolution video can be produced, and this can be outputted therefrom.

Also, while recording the input picture signal or the input video signal into the recording unit, it is possible to reproduce the 2-dimensional high-resolution video, upon which the high resolution is achieved in both directions, i.e., the vertical direction and the horizontal direction, from each of the video signals of the two (2) pieces of input video frames, which are included in the picture signal or the video signal, when reproducing from that recording unit, and thereby to output it therefrom.

Also, with the video signal processing apparatus according to the embodiment 17, since two (2) pieces of input video frames are used, therefore it is possible achieve the output of high resolution video with a lesser amount of necessity processes. With this, it is possible to achieve the recording/reproducing apparatus, for outputting the picture or the video, being high in the resolution thereof in both directions, i.e., the horizontal direction and the vertical direction, with less aliasing components therein.

Embodiment 18

The recording/reproducing apparatus, according to an embodiment 18, is that replacing the video signal processing unit 3504 shown in FIG. 36, with the video signal processing apparatus described in the embodiment 9, within the recording/reproducing apparatus according to the embodiment 17. Other elements or structures thereof are same to those of the recording/reproducing apparatus according to the embodiment 17, and therefore the explanation thereof will be omitted herein.

Also, the detailed operations of the video signal processing unit 3504 are as described in the embodiment 9, and therefore the explanation thereof will be omitted herein.

With the video displaying apparatus according to the embodiment 18, it is possible to produce the 2-dimensional high resolution video, upon which the high resolution is achieved in the horizontal direction, the vertical direction and the oblique direction, than the input picture or the input video, with using two (2) pieces of input video frames, which are included in the input picture signal or the input video signal, and thereby to output this.

Also, while recording the input picture signal or the input video signal into the recording unit, it is possible to reproduce the 2-dimensional high-resolution video, upon which the high resolution is achieved in both directions, i.e., the vertical direction and the horizontal direction, from each of the video signals of the two (2) pieces of input video frames, which are included in the picture signal or the video signal, when reproducing from that recording unit, and thereby to output it therefrom.

Embodiment 19

The recording/reproducing apparatus, according to an embodiment 19, is that replacing the video signal processing unit 3504 shown in FIG. 36, with the video signal processing apparatus described in the embodiment 11, within the recording/reproducing apparatus according to the embodiment 17. Other elements or structures thereof are same to those of the recording/reproducing apparatus according to the embodiment 17, and therefore the explanation thereof will be omitted herein.

Also, the detailed operations of the video signal processing unit 3504 are as described in the embodiment 11, and therefore the explanation thereof will be omitted herein.

With the video displaying apparatus according to the embodiment 19, it is possible to achieve the recording/reproducing apparatus, for enabling to produce the 2-dimensional high resolution video, upon which the high resolution is achieved in the horizontal direction, the vertical direction and the oblique direction, than the input picture or the input video, with using four (4) pieces of input video frames, which are included in the input picture signal or the input video signal, and thereby to output it therefrom.

Also, while recording the input picture signal or the input video signal into the recording unit, it is possible to reproduce the 2-dimensional high-resolution video, upon which the high resolution is achieved in both directions, i.e., the vertical direction and the horizontal direction, from each of the video signals of the two (2) pieces of input video frames, which are included in the picture signal or the video signal, when reproducing from that recording unit, and thereby to output this therefrom.

Also, the effect of improving the resolution, with the recording/reproducing apparatus according to the embodiment 19, in particular, in the oblique direction, is enable an increase of the resolution up to the frequency components higher than that can achieved by the recording/reproducing apparatus according to the embodiment 18; i.e., it is possible to produce the high resolution video being higher in the picture quality.

Embodiment 20

The recording/reproducing apparatus, according to an embodiment 20, is such that the video signal processing unit 3504 shown in FIG. 36 is replaced by the video signal processing apparatus described in any one of the embodiments, i.e., the embodiment 1, the embodiment 3, or embodiment 5, within the recording/reproducing apparatus according to the embodiment 17. Other elements or structures thereof are same to those of the recording/reproducing apparatus according to the embodiment 17, and therefore the explanation thereof will be omitted herein.

Also, the detailed operations of the video signal processing unit 3504 are as described in the embodiment 1, the embodiment 3 or the embodiment 5, and therefore the explanation thereof will be omitted herein.

With the video displaying apparatus according to the embodiment 20, it is possible to achieve the recording/reproducing apparatus, for enabling to produce the high resolution video, upon which the high resolution is achieved in the one-dimensional direction comparing to the input picture or the input video, with using two (2) pieces of input video frames, which are included in the input picture signal or the input video signal, and thereby to output it therefrom.

Also, while recording the input picture signal or the input video signal into the recording unit, it is possible to reproduce the high-resolution video, upon which the high resolution is achieved in one-dimensional direction, from each of the video signals of the two (2) pieces of input video frames, which are included in the picture signal or the video signal, when reproducing from that recording unit, and thereby to output this therefrom.

Embodiment 21

Figure 45:
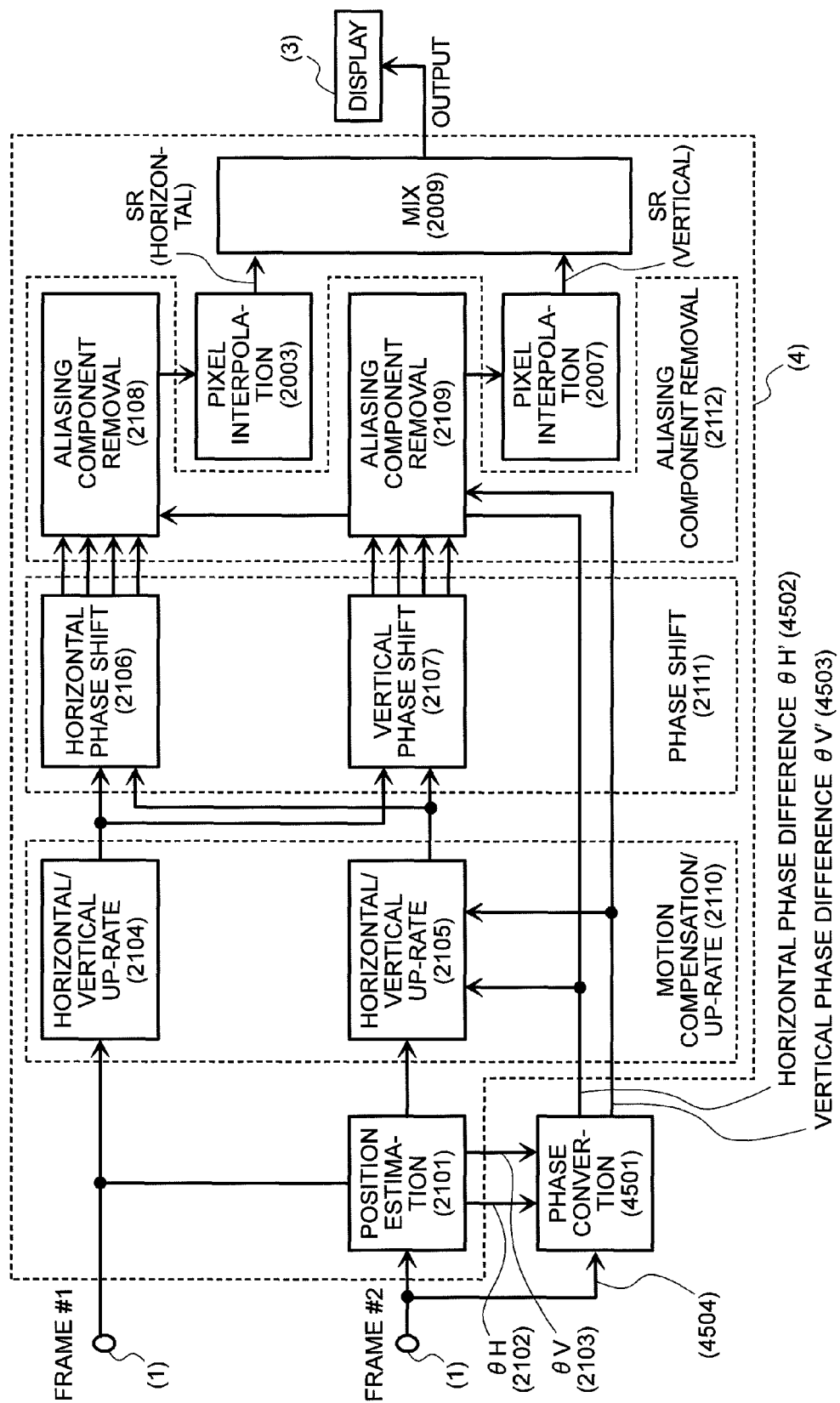
FIG. 45 is a view for explaining an embodiment 21 according to the present invention.

FIG. 45 shows the video signal processing apparatus according to an embodiment 21 of the present invention. The video signal processing apparatus, according to the present embodiment, comprises an input unit (1), into which is inputted frame lines of the moving picture, such as, the television broadcast signal, for example, a resolution converter unit (4) for obtaining two (2) dimensional high resolution frames, by combining the frames inputted from that input unit (1) in the horizontal/vertical directions, a display unit (3) for displaying a video upon basis of the frames, which are high resolved in that resolution converter unit (4) further, and a phase converter unit (4501) for converting the phase difference information to be used in that resolution converter unit (4) mentioned above. Herein, the resolution converter unit (4), to be applied within the video signal processing apparatus according to the present embodiment, is same to the resolution converter unit (4) shown in FIG. 8, as the embodiment 8 of the present invention, and therefore the explanation thereof will be omitted.

Within the video signal processing apparatus according to the embodiment 21 of the present invention, the information of movement of the object (i.e., the horizontal phase difference θH (2102) and the vertical phase difference θV (2103)), which cannot be used in the high resolution within the video signal processing apparatus according to the embodiment 8 of the present invention, is converted into the information that can be used in the high resolution (i.e., the horizontal phase difference θH' (4502) and the vertical phase difference θV' (4503)). Hereinafter, explanation will be made on the details of the phase converter unit (4501).

FIGS. 46A to 46E show the operation principle of the phase converter unit (4501). FIG. 46A shows a situation that the object moves into the right-hand direction. Herein, as an example, it is assumed that the movement (4602) of the object includes only the movement in the horizontal direction, but not the movement in the vertical direction. FIG. 46B shows an enlarged view of a part (4603) of the picture shown in FIG. 46A, and shows the situation that an outline (4610) of the object changes to the position (4611).

Herein, a pixel (4607) at the position (x0,y0) on the video frame (4601) is the pixel (4606) at the position (x1,y1) on the frame previous by one (1), moving thereto accompanying with the movement (4602) of the object. In this instance, the vertical phase difference θV (2103) outputted by the position estimation unit (2101) shown in FIG. 45 comes to zero (0), and then in accordance with the equation shown in FIG. 9, the coefficient(s) C1 (and C3) are unstable, which is/are necessary for the high resolution in the vertical direction. Therefore, it is impossible to remove the aliasing components by means of the aliasing component removal unit (2109) shown in FIG. 45, with using only the vertical phase difference θV (2103) as it is.

On the other hand, as is shown in FIG. 46B, if the brightness value (i.e., the signal level) of the pixel on the outline (4610) of the object is same, then the pixel (4607) at the position (x0,y0) on the video frame (4601) can be considered that it is the pixel (4608) at the position (x2,y2) on the frame previous by one (1), moving into the lower direction (4604), or that it is the pixel (4609) at the position (x3,y3) on the frame previous by one (1), moving upper-right direction (4605). Thus, with using the movement information of the lower direction (4604) or the upper-right direction (4605), the vertical phase difference θV' (4503) can be obtained, but not zero (0) in the value thereof, and therefore it is possible to remove the aliasing components by means of the aliasing component removal unit (2109) shown in FIG. 45. Then, by assuming the direction, in which the brightness is same, in the vicinity of the pixel (4606) at the position (x1,y1) corresponding to the original or primary movement (4602) of the object, it is possible to convert the information of movement of the object (i.e., the horizontal phase difference θH (2102) and the vertical phase difference θV (2103)), which cannot be used in the high resolution, into the information that can be used in the high resolution (i.e., the horizontal phase difference θH' (4502) and the vertical phase difference θV' (4503)).

FIGS. 46C to 46E show the operations of the phase converter unit (4501), collectively. FIG. 46C shows the original or primary horizontal phase difference θH (2102) and the vertical phase difference θV (2103), and they have the values (x0−x1) and (y0−y1), respectively. FIG. 46D shows the operation of the phase conversion into the same-brightness direction, wherein the pixel (4606) at the position (x1,y1) corresponding to the original or primary movement (4602) of the object is converted into the pixel (4608) at the position (x2,y2) on the outline (4610) of the object. FIG. 46E shows the operation for obtaining the horizontal phase difference θH' (4502) and the vertical phase difference θV' (4503) after the phase conversion, upon basis of the operations shown in FIGS. 46C and 46D, wherein they are (x0−x1) and (y0−y1), respectively, i.e., θH (2102)+(x1−x2) θH+ΔθH and θV (2103)+(y1−y2)=θV+ΔθV. Thus, it is enough to conduct the aliasing component removal, by using the horizontal phase difference θH' (4502) and the vertical phase difference θV' (4503) after the phase conversion, within the resolution converter unit (4) shown in FIG. 45. Further, the pixels (4606), (4608) and (4609) shown in FIG. 46B, not only the actual pixels (i.e., real pixels), but may pixels, each being interpolated with using the real pixels in the vicinity thereof (i.e., interpolated pixels). Or, each of the pixels (4606), (4608) and (4609) has no necessity of lying on the outline of the object, and it may be in a relationship to have the same brightness value to each other.

Figure 47:
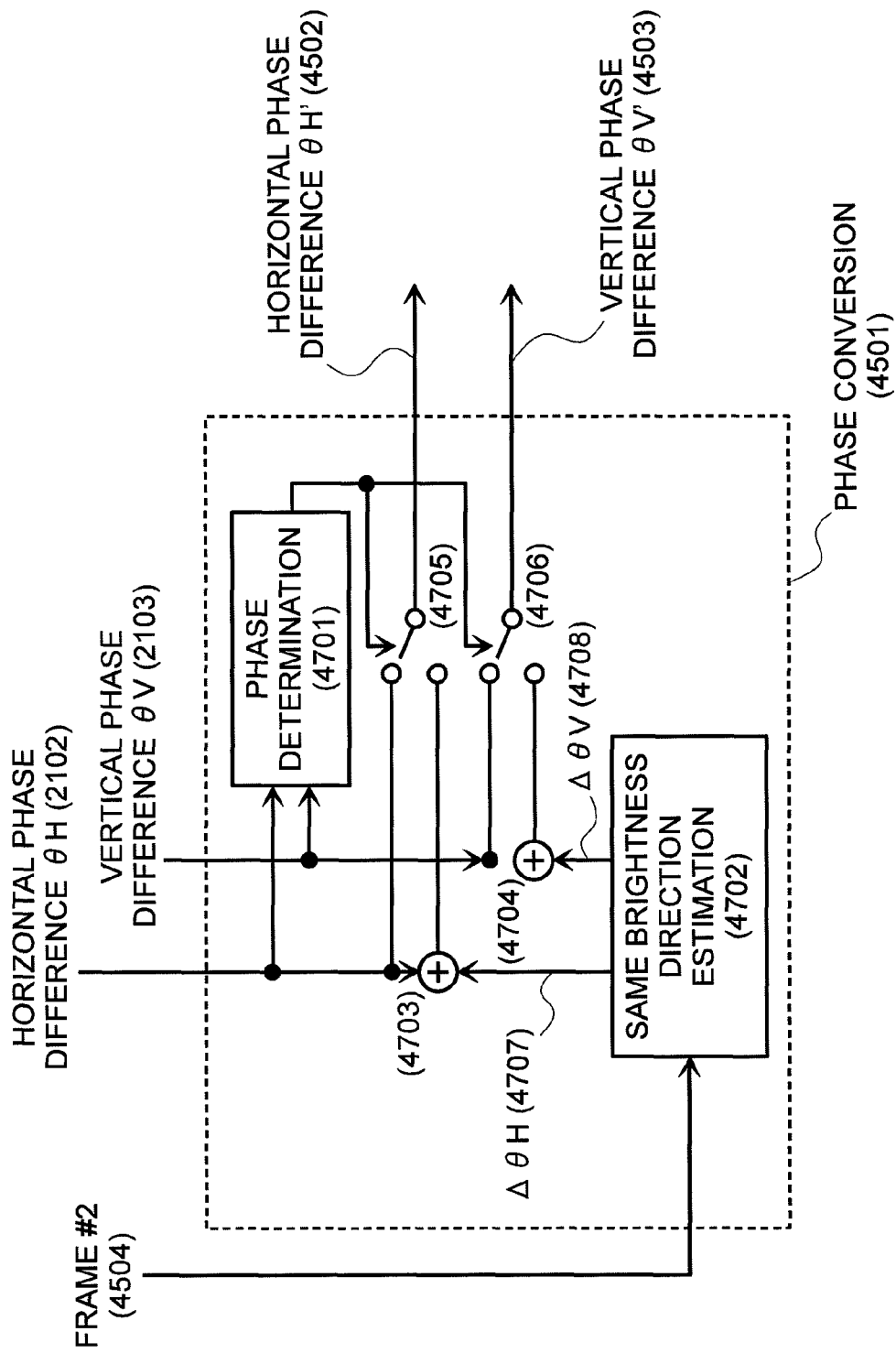
FIG. 47 is a view for explaining the embodiment 21 according to the present invention.

FIG. 47 shows an example of structures of the phase converter unit (4501), for achieving the operation of the phase conversion shown in FIG. 46E. In the same figure, firstly, upon basis of the frame #2 (4604) inputted from the input unit (1) shown in FIG. 45, the phase correction value ΔθH (4707) in the horizontal direction and the phase correction value ΔθV (4708) in the vertical direction are produced within a same-brightness direction estimation unit (4702), and are added with the horizontal phase difference θH (2102) and the vertical phase difference θV (2103) outputted from the phase estimation unit (2101) shown in FIG. 45, respectively, by adders (4703) and (4704), to be inputted into exchangers (4705) and (4706), respectively. In parallel with this, the horizontal phase difference θH (2102) and the vertical phase difference θV (2103) are inputted into a phase determination unit (4701), so as to determine on whether they can be used or not, in the aliasing component removal within the resolution converter unit (4) shown in FIG. 45, as they are. If being determined "they can be used, as they are", the exchangers (4705) and (4706) are changed to the upper side, so as to output the horizontal phase difference θH (2102) and the vertical phase difference θV (2103) from the phase converter unit (4501), as they are, but as the horizontal phase difference θH' (4502) and the vertical phase difference θV' (4503) after the phase conversion. On the other hand, if being determined "they cannot be used, as they are", in the phase determination unit (4701), then the exchangers (4705) and (4706) are changed to the lower side, so as to output the outputs of the adders (4703) and (4704) from the phase converter unit (4501), as the horizontal phase difference θH' (4502) and the vertical phase difference θV' (4503) after the phase conversion, respectively.

FIG. 48 shows therein a method for determining on whether the horizontal phase difference θH (2102) or the vertical phase difference θV (2103) can be used or not, as it is, within the phase determination unit (4701). In the same figure, it is determined on whether the coefficient(s) C1 (and C3) can be obtained or not with using the equation shown in FIG. 9, and it is determined "the horizontal phase difference θH (2102) or the vertical phase difference θV (2103) cannot be used, as it is", in case where the coefficient(s) C1 (and C3) is/are indefinite because either one of the horizontal phase difference θH (2102) or the vertical phase difference θV (2103) is zero (0), or in case where there is brought about weakness to noises, etc., because the coefficient(s) C1 (and C3) come(s) to be large as either one of the horizontal phase difference θH (2102) or the vertical phase difference θV (2103) comes close to zero (0).

Herein, explanation will be made on the case where the signal is an interlace-scanning signal, which is inputted into the input unit (1) shown in FIG. 45.

Figure 37A:
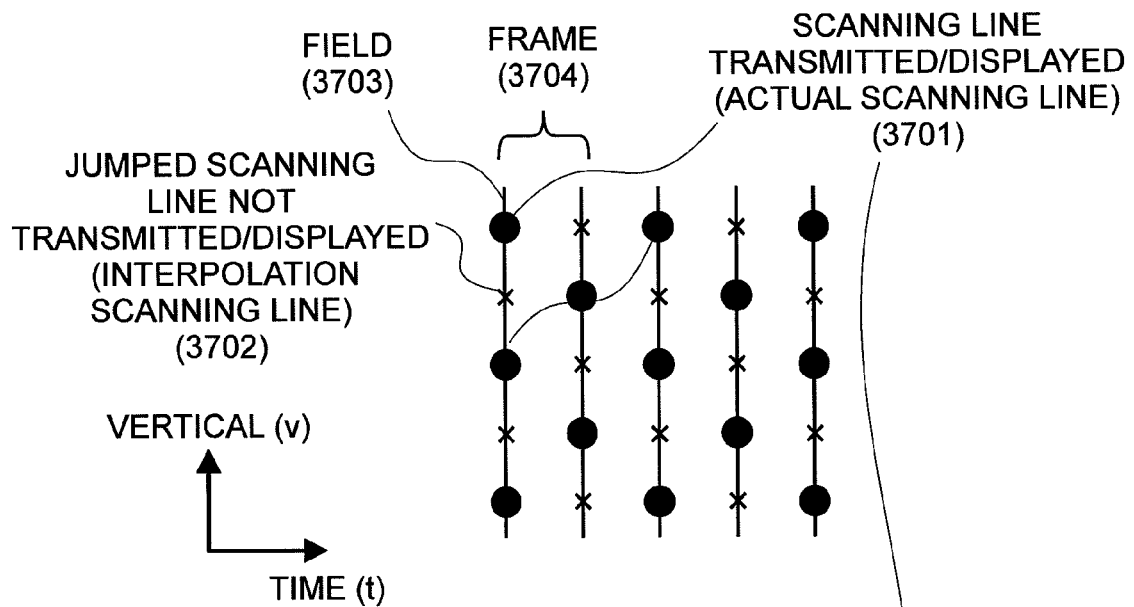
FIGS. 37A and 37B are views for explaining the prior art.

First of all, explanation will be made about the interlace scanning and the progressive scanning, in general, by referring to FIGS. 37A and 37B. FIG. 37A shows a positional relationship of the scanning lines of the interlace scanning (2:1 interlace), and FIG. 37B the positional relationship of the scanning lines of the progressive scanning, respectively. In each of them, the horizontal axis of the figure presents a position (t) of the time direction (i.e., frame direction), and the vertical axis thereof presents the vertical position (v), respectively.

Figure 37B:
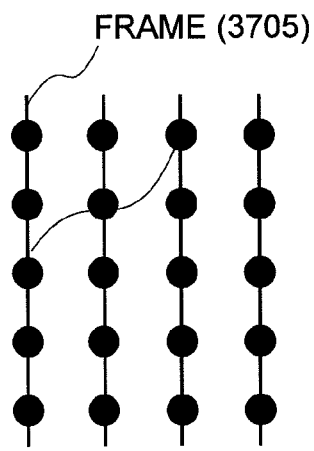

In the progressive scanning in FIG. 37B, the scanning lines on the frame (3705) are scanned, successively. On the contrary to this, in the interlace scanning in FIG. 37A, a filed (3703) is made up, in such a form that a scanning line (i.e., an actual or real scanning line) (3701) to be transmitted or displayed and a scanning line (3702) to be jumped over or not displayed repeat each other. Also, in the next field, positions of the scanning line (3701) and the scanning line (3702) are reversed (i.e., complementary), and therefore one (1) piece of the frame (3704) is made up by combining two (2) pieces of the fields (3703) and (3704).

For this reason, with the present embodiment, in case when the signal is the interlace scanning one, which is inputted into the input unit (1) shown in FIG. 45, there is necessity of replacing the phase difference θ (i.e., θH or θV) of each of the coefficients C0, C1, C2 and C3, by (θ±π) in the value thereof.

Accordingly, it is enough to determine "the horizontal phase difference θH (2102) or the vertical phase difference θV (2103) cannot be used, as it is", in case where the coefficients C1 and C3 are indefinite because the phase difference θ comes to ±π or in case where there is brought about the weak to noises, etc., because the coefficient(s) C1 (and C3) come(s) to be large as the phase difference θ comes close to zero (0).

Figure 49B:
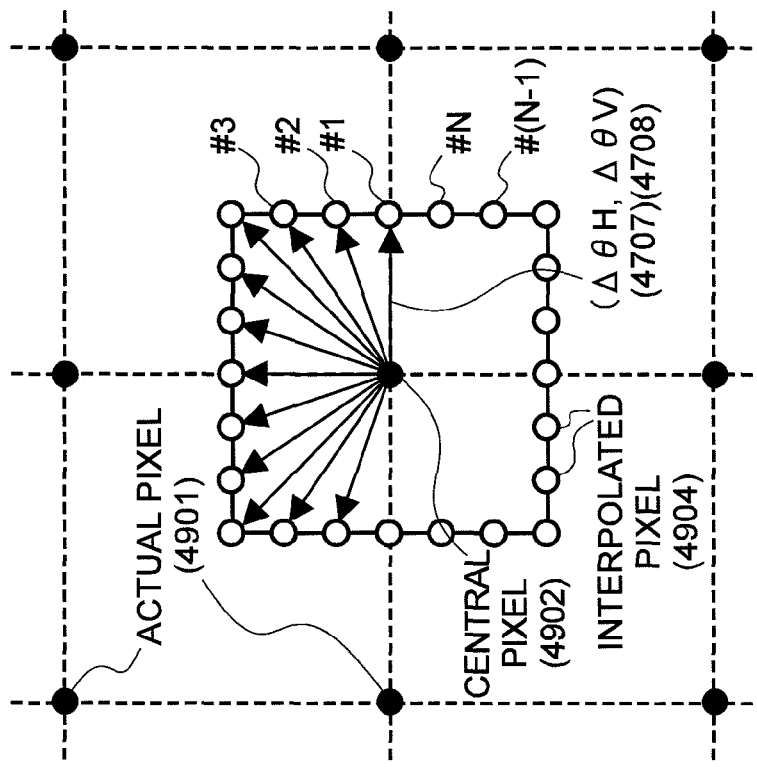
FIGS. 49A and 49B are views for explaining the embodiment 21 according to the present invention.
Figure 49A:
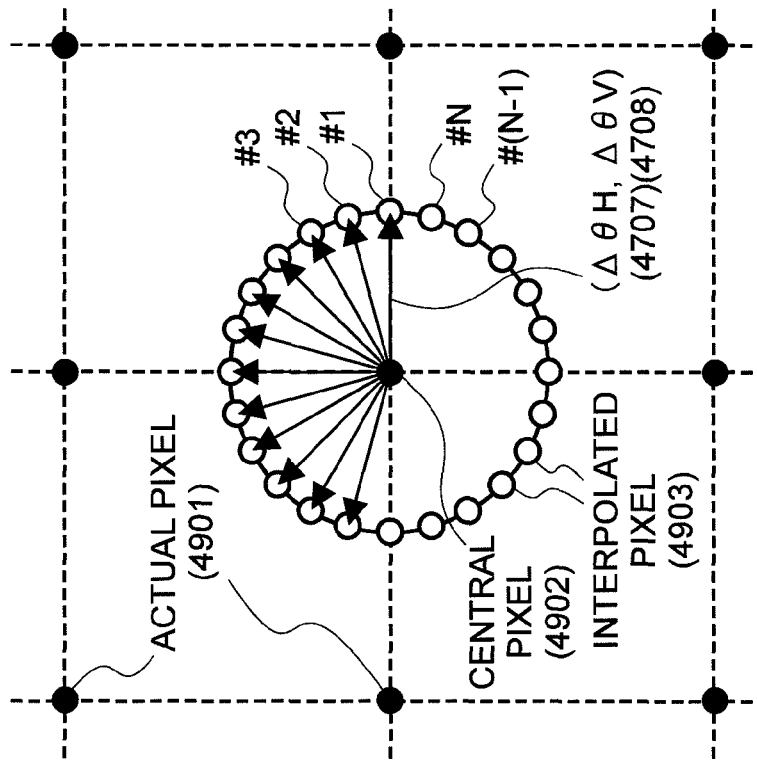

By referring to FIGS. 49A and 49B, explanation will be made on an example of the operations of the same-brightness direction estimation unit (4702) shown in FIG. 47. In FIG. 49A, the actual pixels (4901) aligned in a grid manner present the pixels, which are lying on the frame originally. Also, interpolated pixels (4903) indicate N points, i.e., from #1 to #N (N: a positive integer), which are disposed or arranged on the circumference of a circle around the pixel (4092) of the process target, and are pixels, which are interpolated with using a plural number of actual pixels (4901) in the vicinity thereof. However, the positions of the interpolated pixels (4903) should not be restricted to those shown in FIG. 49A, but as shown in FIG. 49B, the interpolated pixels (4904) at the N points, i.e., from #1 to #N may be disposed or arranged in a rectangular manner around a central pixel (4902). Among those interpolated pixels (4903) or (4904) disposed or arranged in this manner, one is selected, which is the smallest in the difference from the brightness value of the central pixel (4902), and the phase correction value ΔθH (4707) in the horizontal direction and the phase correction value ΔθV (4708) in the vertical direction are obtained from the directions of the straight lines, combining the central pixel (4902) and the selected interpolated pixels (4903) or (4904).

Figure 50:
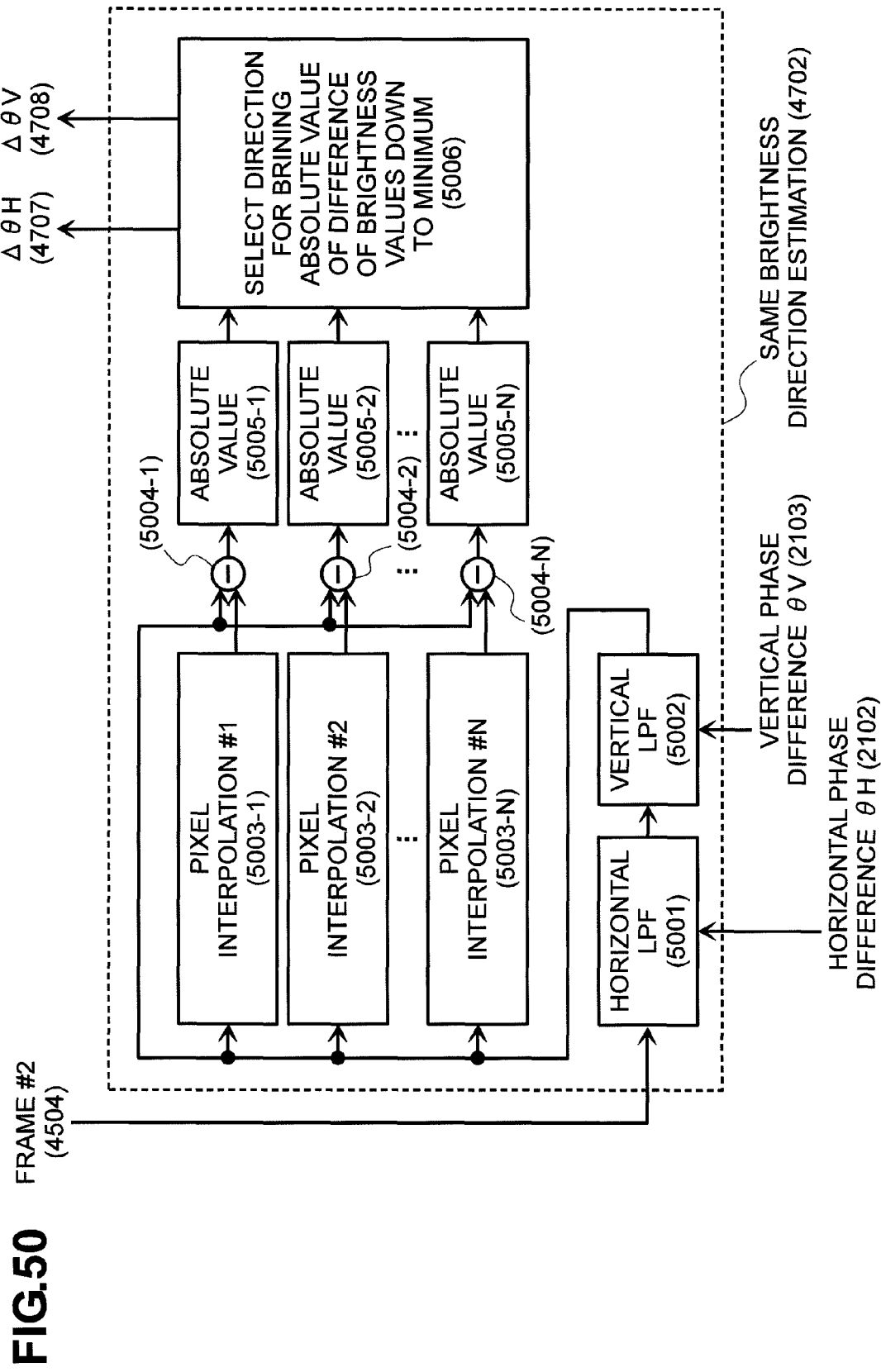
FIG. 50 is a view for explaining the embodiment 21 according to the present invention.

FIG. 50 shows therein an example of structures of the same-brightness direction estimation unit (4702). In the same figure, first of all, a horizontal low-pass filter (hereinafter, being called "LPF") (5001) and a vertical LPF (5002) are applied on a signal of frame #2 (4504) inputted, and thereby obtaining the central pixel. Those are the filters provided for lowering ill influences of the aliasing components, which may be a reason of assuming or estimating the same-brightness direction, erroneously, and it is enough to set the frequency of about ½-¼ of the Nyquist frequency band of the input signal, as the cutoff frequency for each LPF. Following to the above, with using pixel interpolators #1 (5003-1) to #N (5003-N), a signal is produced at the position of the interpolated pixel (4903) shown in FIG. 49A or the interpolated pixel (4904) shown in FIG. 49B. As those pixel interpolators #1 (5003-1) to #N (5003-N) may be applied a general interpolation LPF for conducting the pixel interpolation from the actual pixel (4901) locating in the vicinity of the central pixel (4902) with using the sinc function mentioned above, as it is, and therefore the detailed illustration and explanation thereof will be omitted. Each of outputs of the interpolators #1 (5003-1) to #N (5003-N) produces a difference signal from the signal before the pixel interpolation (i.e., an output of the actual pixel=vertical LPF (5002)), respectively, with using subtractors (5004-1) to (5004-N), and an absolute value of the difference in the brightness values for each of the interpolation pixels #1 to #N with using absoluters (5005-1) to (5005-N). Selection is made on the interpolated pixels by means of a direction selector (5006) in such a manner that the value (i.e., the absolute value of brightness value) goes down to the minimum, and differences in the horizontal direction and the vertical direction are outputted, between the position of the interpolated pixel selected and the position of the actual pixel at the center, as the phase correction value ΔθH (4707) in the horizontal direction and the phase correction value ΔθV (4708) in the vertical direction. However, if setting the cutoff frequency for each of the horizontal LPF (5001) and the vertical LPF (5002) to be low (i.e., narrowing the passing band), though the aliasing components come to be small, but at the same time are also reduced the signal components of fine or minute textures (or, patterns) presenting the original same-brightness direction. On the contrary, if setting the cutoff frequency to be high (i.e., widening the passing band), although the signal components of fine or minute textures (or, patterns) remain, but the ill influences of aliasing components come to be large. Accordingly, both of them are in a relationship of tradeoff, then it is preferable that the characteristics of the horizontal LPF (5001) and the vertical LPF (5002) are designed, appropriately, while ascertaining the actual picture of the frame (4504) inputted and also the results of the phase correction value ΔθH (4707) in the horizontal direction and the phase correction value ΔθV (4708) in the vertical direction.

However, in FIGS. 49A and 49B, for simplicity, the central pixel (4902) is illustrated at the position same to that of the actual pixel, but actually, the position is obtained of the pixel on the frame #2 corresponding to the pixel of the process target on the frame #1, by means of the position estimation unit (2101) shown in FIG. 45, and this is assumed to be the portion of the central pixel (4902). Accordingly, the value of the horizontal phase difference θH (2102) or the vertical phase difference θV (2103) does not come to the distance of actual pixels multiplied by an integer (including zero (0)), then the central pixel (4902) also does not comes to the same position. In this instance, it is enough to shift a tap coefficient of the horizontal LPF (5001) shown in FIG. 50 by the horizontal phase difference θH (2102), and also to shift the tap coefficient of the vertical LPF (5002) by the vertical phase difference θV (2103). In more details, in case where the cutoff frequency of the horizontal LPF (5001) is fc(H) and the Nyquist frequency is fn(H), for example, then the tap coefficient Ck(H) (however, "k" is an integer) of the horizontal LPF (5001) comes to the sinc function, which is generally well-known, i.e., it is enough to set it to $Ck(H)=2\sin(\pi \times fc(H) \times k/fn(H)-\theta H)/(\pi \times fc(H) \times k/fn(H)-\theta H)$. Also, the tap coefficient $Ck(V)$, in the similar manner, it is enough to et it to $Ck(V)=2\sin(\pi \times fc(V) \times k/fn(V)-\theta V)/(\pi \times fc(V) \times k/fn(V)-\theta V)$.

Also, the distance (=a radius of a circle) between the central pixel (4902) and the interpolated pixel (4903) in FIG. 49A, or the distance (=½ of each side of a rectangular) between the central pixel (4902) and the interpolated pixel (4904) in FIG. 49B corresponds to a magnitude of each value of the phase correction value ΔθH (4707) in the horizontal direction and the phase correction value ΔθV (4708) in the vertical direction, but those distances (i.e., the radius of the circle, and ½ of each side of the rectangular) may be fixed values or variable values. Thus, when conducting the removal of aliasing components with using the horizontal phase difference θH' (4502) and the vertical phase difference θV' (4503) after the phase conversion shown in FIG. 46E, it is possible to set the phase correction value ΔθH (4707) in the horizontal direction and the phase correction value ΔθV (4708) in the vertical direction to be about ½ of the distance of the actual pixel (4901), so as to obtain the coefficient C1 (and the coefficient C3) with using the equation shown in FIG. 9, or it is possible to increase or decrease each value, appropriately, while maintaining the ratio between ΔθH (4707) and ΔθV (4708) to be constant, so as not to change the same-brightness direction, which is indicated by the phase correction value ΔθH (4707) in the horizontal direction and the phase correction value ΔθV (4708) in the vertical direction.

Also, there may be a case where it is impossible to obtain the coefficient C1 (and the coefficient C3) with using the equation shown in FIG. 9, if increasing/decreasing each value, appropriately, while maintaining the ratio between the ΔθH (4707) and ΔθV (4708) to be constant, so as not to change the same brightness, which is indicated by the phase correction value ΔθH (4707) in the horizontal direction and the phase correction value ΔθV (4708) in the vertical direction. For example, in FIG. 49A, in particular, in case where the same-brightness direction is horizontal (#1), for example, the phase correction value ΔθV (4708) in the vertical direction is always zero (0), therefore it is impossible to remove the aliasing components in the vertical direction within the aliasing component removal unit (2109) shown in FIG. 45, even with using the vertical phase difference θV' (4603) after the phase conversion, similar to the case of using the vertical phase difference θV (2103) as it is. In this case, similar to the video signal processing apparatus according to the embodiment 5 of the present invention, it is enough to construct such that; i.e., while preparing the general interpolation low-pass filter (1101) shown in FIG. 11, as a bypass route, in each of the aliasing component removal unit (2108) or (2109), newly, C4 is produced within a coefficient determining unit (1103), other than the coefficients C0 and C1 mentioned above, so as to multiply the coefficient C4 onto the output of the interpolation low-pass filter (1101) within the multiplier (1102) to be added to the signal high resolved, within the adder (1104), thereby to be outputted. Further, the structures, but other than the interpolation low-pass filter (1101), the multiplier (1102), the coefficient determining unit (1103), the adder (1104) and the auxiliary pixel compensation portion or unit (1105), are same to that of the embodiment 3 shown in FIG. 10, and therefore the explanation thereof will be omitted. Also, the operations, as well as, the structures of the interpolation low-pass filter (1101), the multiplier (1102), the coefficient determining unit (1103), the adder (1104) and the auxiliary pixel compensation portion or unit (1105) are same to the operations and the structures of the embodiment 5 shown in FIGS. 12 and 13, and therefore the explanation thereof will be omitted.

Also, in case where the minimum value of difference in the signal values, between the central pixel (4902) and the interpolated pixels (4903) and (4904) shown in FIGS. 49A and 49B, is larger than a predetermined threshold value, then it is determined that no same-brightness direction can be assumed, and then it is enough to prevent the aliasing component removal units (2108) and (2109) shown in FIG. 45 from the mal-functions thereof, for example, by setting the phase correction value ΔθH (4707) and ΔθV (4708) within the direction selector (5006) in the same-brightness direction estimation unit (4702) shown in FIG. 50, etc.

With the video signal processing apparatus according to the embodiment 21, which was explained in the above, in addition to the effect(s) of the video signal processing apparatus according to the embodiment 8, there can be obtained an effect that the high resolution can be achieved even in the case of the movement of the object, which cannot be used in the high resolution within the video signal processing apparatus according to the embodiment 8.

However, the structures shown in FIG. 45, for explaining the video signal processing apparatus according to the present embodiment, it is based on the structures shown in FIG. 21 for explaining the video signal processing apparatus according to the embodiment 8 of the present invention, but it should not be restricted to this, and since it is apparent that the similar effect(s) can be obtained with provision of the phase converter unit (4501) shown in FIG. 45, within the video signal processing apparatus according to other embodiment (s) of the present invention, therefore the explanation thereof will be omitted.

Embodiment 22

An embodiment 22 relates to a video signal processing method for achieving the processing, being equal to the video signal processing within the video signal processing apparatus according to the embodiment 21, by means of the controller unit cooperating with software. Since the video signal processing apparatus for conducting the video signal processing method of the present embodiment is the same to the video signal processing apparatus shown in FIG. 18, similar to the embodiment 2, therefore the explanation thereof will be omitted.

Figure 51:
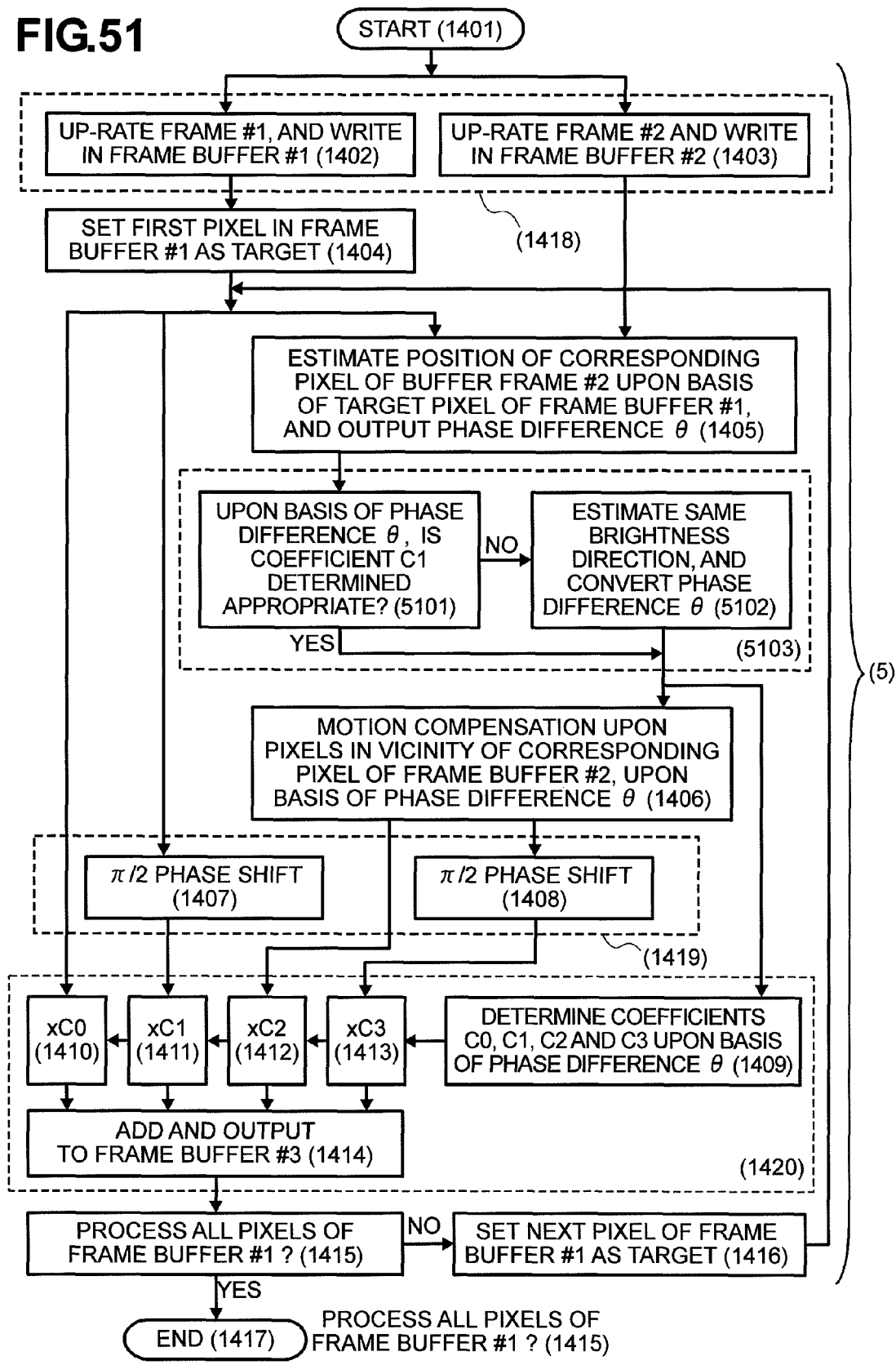
FIG. 51 is a view for explaining an embodiment 22 according to the present invention.

FIG. 51 shows an example of flowchart for explaining the operation of the present embodiment. The flowchart shown in this FIG. 51 can be obtained by adding a step (5103) to the flowchart shown in FIG. 14, according to the embodiment 2 of the present invention, wherein steps (1401) to (1420) are similar to those of the embodiment 2 of the present invention, and therefore the explanation thereof will be omitted.

In a step (5103), first of all, in a step (5101), upon basis of the phase difference θ (i.e., the horizontal phase difference θH or the vertical phase difference θV), which is obtained in the step (1405), it is determined on whether the coefficient C1 determined upon the basis of the equation shown in FIG. 9 is appropriate or not, and if it is appropriate, the process advances to the step (1406) and the step (1409), on the other hand, if it is inappropriate, the process advances to a step (5102). Herein, when determining on whether the coefficient C1 is appropriate or not, it is enough to determine "the coefficient C1 is in appropriate", in case where the phase difference θ is zero (0) and therefore the coefficient C1 is indefinite, or in case where the C1 comes to be large as the phase difference θ comes close to zero (0), thereby bringing about the weakness to the noises, etc.

However, as was explained in the embodiment 21, in case where the signal inputted into the input unit (1) shown in FIG. 18 is the interlace scanning one, since each of the coefficients C0, C1, C2 and C3 shown in FIG. 9 has the value by replacing the phase difference θ by (θ±π), therefore it is enough to determined "the coefficient C1 is in appropriate", in case where the phase difference θ comes to ±π and therefore the coefficient C1 is indefinite, or in case where the C1 comes to be large as the phase difference θ comes close to ±π, thereby bringing about the weakness to the noises, etc.

In a step (5102), similar to the operation that was explained by referring to FIGS. 46 to 50, the same-brightness direction is estimated, and to the original phase difference θ (i.e., the horizontal phase difference θH or the vertical phase difference θV) is added the phase correction value ΔθH (4707) in the horizontal direction or the phase correction value ΔθV (4708) in the vertical direction, thereby converting it into a new phase difference θ, and with using this new phase difference θ, the process advances to the step (1406) and the step (1409).

Upon basis of the flowchart mentioned above, the process is started from the step (1401) shown in FIG. 51, and if the process is ended at the step (1417), then the signal, which is buffered in the frame buffer #3 shown in FIG. 18, can be outputted to the display unit (3) by a unit of frame or pixel.

With conducting such the processes as mentioned above, it is possible to output the high resolved signal to the frame buffer #3, with using the pixel data of the frame buffer #1 and the frame buffer #2. When applying to the moving picture, it is enough to repeat the processes shown in FIG. 51, in particular, starting from the step (1401) and reaching to the step (1417), for each frame.

However, the flowchart shown in FIG. 51, for explaining the operation according to the present embodiment, is obtained by adding the step (5103) to the flowchart shown in FIG. 14, according to the embodiment 2 of the present invention, however since it is apparent there is/are the similar effect(s) if adding the step (5103) to the flowchart shown in FIG. 15, according to the embodiment 4 of the present invention, and therefore the explanation thereof will be omitted.

Also, there may be a case where it is impossible to obtain the coefficient C1 (and the coefficient C3) with using the equation shown in FIG. 9, even if increasing/decreasing each value, while maintaining the ratio between ΔθH (4707) and ΔθV (4708) to be constant, so as not to change the same-brightness direction, which is indicated by the phase correction value ΔθH (4707) in the horizontal direction and the phase correction value ΔθV (4708) in the vertical direction. For example, in FIG. 49A, in case where the same-brightness direction is in the horizontal (#1), the phase correction value ΔθV (4708) in the vertical direction is always zero (0), and it is impossible to remove the aliasing component(s) in the vertical direction in the step (1420), similar to the case when using the vertical phase difference θV (2103) as it is, even if using the vertical phase difference θV' (4603) after the phase conversion. In this case, similar to the video signal processing method according to the embodiment 6 of the present invention, it is enough to prepare the step (1605) and the step (1606) shown in FIG. 16, so that a process result of the step (1606) is outputted to the frame buffer #3 when the phase difference θ after the conversion is zero (0) or in the vicinity thereof, in the structures thereof. This step (1605) and the step (1606) are same to the operations of the embodiment 6, and therefore the explanation thereof will be omitted.

With the video signal processing method, according to the embodiment 22 explained in the above, in addition to the effect(s) of the video signal processing method according to the embodiment 2, there is an effect that the high resolution can be achieved even in case of the movement of the object, which cannot be used for the high resolution within the video signal processing method according to the embodiment 2. Thus, there can be achieved the high resolution process that can response to various movements of the object much more.

Embodiment 23

A video display apparatus according to the embodiment 23 of the present invention can be obtained, by replacing the video signal processor unit 3504 shown in FIG. 35 with the video signal processing apparatus, which is described in the embodiment 21 or the embodiment 22, within the video display apparatus according to the embodiment 13. Other structures than that are similar to those of the video display apparatus according to the embodiment 13, and therefore the explanation thereof will be omitted.

Also, since the detailed operations of the video signal processor unit 3504 are as described in the embodiment 21 or the embodiment 22, therefore the explanation thereof will be omitted.

With the video display apparatus according to the embodiment 23, in addition to the effect(s) of the video display apparatus according to the embodiment 13, there is an effect that the high resolution can be achieved even in case of the movement of the object, which cannot be used for the high resolution within the video signal processing method according to the embodiment 13. Also, it is possible to achieve the video display apparatus for displaying the picture or video, which is produced with this high resolution process. Thus, it is possible to produce the high resolution video or picture, responding to various movements of the object much more, and also to display the high-resolution picture produced.

Embodiment 24

A recording/reproducing apparatus according to the embodiment 24 is that obtained by replacing the video signal processor unit 3504 shown in FIG. 36 with the video signal processing apparatus, which is described in the embodiment 21 or the embodiment 22, within the recording/reproducing apparatus according to the embodiment 17. Other structures than that are similar to the recording/reproducing apparatus according to the embodiment 17, and therefore the explanation thereof will be omitted.

Also, the detailed operations of the video signal processor unit 3504 are as was described in the embodiment 21 or the embodiment 22, and therefore the explanation thereof will be omitted.

According to the recording/reproducing apparatus according to the embodiment 24, in addition to the effect(s) of the recording/reproducing apparatus according to the embodiment 17, there is an effect that that the high resolution can be achieved even in case of the movement of the object, which cannot be used for the high resolution within the video signal processing method according to the embodiment 17. Also, it is possible to output the picture or video, which is produced with this high resolution process. Thus, it is possible to produce the high resolution video or picture, responding to various movements of the object much more, and also to output the high resolution picture produced.

Embodiment 25

Figure 52:
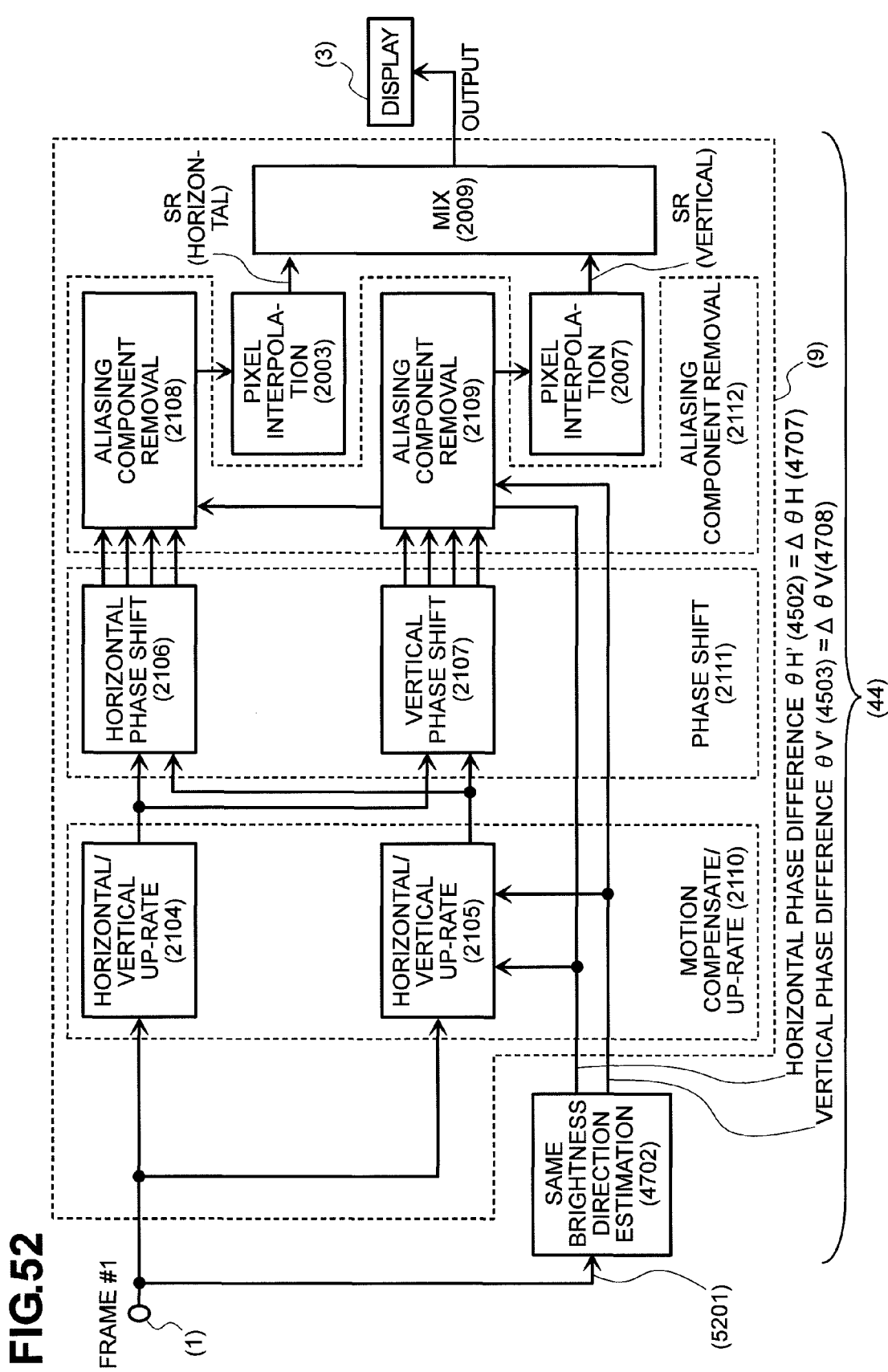
FIG. 52 is a view for explaining an embodiment 25 according to the present invention.

FIG. 52 shows the video signal processing apparatus according to an embodiment 25 of the present invention. The video signal processing apparatus, according to the present embodiment, comprises the input unit (1), into which the video frame is inputted, such as, the television broadcast signal, etc., for example, the resolution converter units (9) for conducting the 2-dimensional high resolution upon the frame inputted from this input unit (1), with combining the horizontal/vertical directions, and further the display unit (3) for displaying the video or picture upon basis of the frame, which is high resolved within this resolution converter units (9), and the same-brightness direction estimation unit (4702) for producing the phase difference information to be used within the resolution converter units (9) mentioned above. Herein, the video signal processing apparatus, according to the present embodiment, is that obtained by removing the input unit (1) for inputting the signal of frame #2 from the video signal processing apparatus shown in FIG. 45 similar to the embodiment 21 of the present invention, as well as, by replacing the position estimation unit (2101) with the same-brightness direction estimation unit (4702). Other structures and operations thereof are similar to those of the video signal processing apparatus shown in FIG. 45, and therefore the explanation thereof will be omitted.

The video signal processing apparatus, according to the embodiment 25 of the present invention, comprises a resolution converter unit (44) for achieving the process of high resolution by using only the signal of frame #1, which is inputted from the input unit (1). Hereinafter, explanation will be made on the details thereof.

Within the video signal processing apparatus according to the embodiment 21 mentioned above, information of the movement of the object (i.e., the horizontal phase difference θH (2102) and the vertical phase difference θV (2103)), which cannot be used within the video signal processing apparatus according to the embodiment 8 of the present invention, is converted into the information (i.e., the horizontal phase difference θH' (4502) and the vertical phase difference θV' (4503)), which can be used in the high resolution, with using the phase converter unit (4501) shown in FIG. 45.

On the other hand, within the embodiment 25 of the present invention, by considering that the signal of frame #2 is the same to the signal of frame #1, i.e., the video is completely standing still, the information of movement of the object (i.e., the horizontal phase difference θH (2102) and the vertical phase difference θV (2103)) is turned to zero (0), compulsively, while chaining the video signal, which is inputted into the phase converter unit (4501) shown in FIG. 45, to the frame #1 (5201), thereby replacing the structures of the phase converter unit (4501) shown in FIG. 47 with only the same-brightness direction estimation unit (4702). Hereinafter, explanation will be given on this operation, in details thereof.

FIGS. 53A to 53E show the principle of operations of the same-brightness direction estimation unit (4702), within the video signal processing apparatus according to the present embodiment. FIG. 53A shows the condition that the object appears on the video frame (5301). However, the video signal processing apparatus according to the present embodiment deals with only the signal of one (1) piece of the video frame (5301), differing from the video frame (4601) shown in FIG. 46A. FIG. 53B, enlarging a portion (5302) of the video shown in FIG. 53A, shows the condition of an outline (5303) of the object.

Herein, as is shown in FIG. 53B, if the brightness values (i.e., the signal levels) are same of the pixels on the outline (5303) of the object, then the pixel (5304) at the position (x1,y1) can be considered that the pixel (5305) at the position (x2,y2) moves down into the lower-left direction (5306). Thus, considering one (1) piece of the video frame (5301) to be two (2) pieces of imaginary video frames, and if producing the horizontal phase difference θH' (4502) and the vertical phase difference θV' (4503) with considering the positional difference between the pixel (5305) of the same brightness in the vicinity of the process target lying on the other one (1) piece of the video frame (5301), for each pixel (5304) of the process target on the video frame (5301), then it is possible to achieve the high resolution, in the similar manner to that in the video signal processing apparatus, according to the embodiment 21 motioned previously. However, the pixels (5304) and (5305) shown in FIG. 53B may be, not only the actual pixels (or, the real pixels), but also the pixels interpolated with using the real pixels in the vicinity thereof (i.e., the interpolated pixels). Also, for each pixel (5304) or (5305), it is not necessary to lie on the outline of the target, and may be in a relationship to have the same brightness value to each other.

FIGS. 53C to 53E show the operations of the same-brightness direction estimation unit (4702), collectively. FIG. 53C shows the original horizontal phase difference θH (2102) and the vertical phase difference θV (2103), and since one (1) piece of the video frame is considered to be two (2) pieces of the video frames standing still, the original horizontal phase difference θH (2102)=(x1−x1)=0, and the original vertical phase difference θV (2103)=(y1−y1)=0. FIG. 53D shows the operation of the phase conversion into the same-brightness direction, and it shows the operation of converting the pixel (5304) at the position (x1,y1) into the pixel (5305) at the position (x2,y2) on the outline (5303) of the object. FIG. 53E shows the operation for obtaining the horizontal phase difference θH' (4502) and the vertical phase difference θV' (4503) after the phase conversion, upon basis of the operations shown in FIGS. 53D and 53D, wherein the horizontal phase difference θH' (4502) after the phase conversion=(x1−x2)=ΔθH and the vertical phase difference θV' (4503) after the phase conversion=(y1−y2)=ΔθV.

Herein, the same-brightness direction estimation unit (4702) shown in FIG. 52 is same to the same-brightness direction estimation unit (4702) shown in FIG. 50, in the structures and operations thereof, and ΔθH and ΔθV shown in FIG. 53E are same to the phase correction value ΔθH (4707) in the horizontal direction and the phase correction value ΔθV (4708) in the vertical direction, which are outputted from the same-brightness direction estimation unit (4702) shown in FIG. 50.

Within the resolution converter units (9) shown in FIG. 52, it is enough to remove the aliasing component(s) with using the horizontal phase difference θH' (4502)=ΔθH (4707) and the vertical phase difference θV' (4503)=ΔθV (4708), which are produced within the same-brightness direction estimation unit (4702).

However, there may be a case where it is impossible to obtain the coefficient C1 (and the coefficient C3) with using the equation shown in FIG. 9, even if increasing/decreasing each value, while maintaining the ratio between ΔθH (4707) and ΔθV (4708) to be constant, so as not to change the same-brightness direction, which is indicated by the phase correction value ΔθH (4707) in the horizontal direction and the phase correction value ΔθV (4708) in the vertical direction. For example, in case where the same-brightness direction is horizontal, since the phase correction value ΔθV (4708) in the vertical direction is always zero (0), then it is impossible to remove the aliasing component(s) in the vertical direction within the aliasing component removal unit (2109) shown in FIG. 52. In this case, similar to the video signal processing apparatus according to the embodiment 5 of the present invention, it is enough to construct such that; i.e., while preparing the general interpolation low-pass filter (1101) shown in FIG. 11, as a bypass route, in each of the aliasing component removal unit (2108) or (2109), newly C4 is produced within a coefficient determining unit (1103), other than the coefficients C0 and C1 mentioned above, so as to multiply the coefficient C4 onto the output of the interpolation low-pass filter (1101) within the multiplier (1102) to be added to the signal high resolved, within the adder (1104), and thereby to be outputted. Further, the structures, but other than the interpolation low-pass filter (1101), the multiplier (1102), the coefficient determining unit (1103), the adder (1104) and the auxiliary pixel compensation portion or unit (1105), are same to that of the embodiment 3 shown in FIG. 10, and therefore the explanation thereof will be omitted. Also, the operations, as well as, the structures of the interpolation low-pass filter (1101), the multiplier (1102), the coefficient determining unit (1103), the adder (1104) and the auxiliary pixel compensation portion or unit (1105) are same to the operations and the structures of the embodiment 5 shown in FIGS. 12 and 13, and therefore the explanation thereof will be omitted.

With the video signal processing apparatus, according to the embodiment 25, which was explained in the above, it is possible to produce the video high-resolved comparing to the input video, less in the aliasing component(s), with using one (1) piece of input video frame, smaller than that of the conventional art. Accordingly, there can be obtained an effect of enabling to achieve the high resolution, in case where the video frame inputted is only one (1) piece, the still portion, in particular, when all or apart (i.e., an area) of the video frame inputted are/is standing still, in case where the corresponding pixel cannot be estimated between the frames in the front and the back due to strong movement of the object, etc., and in case where the corresponding pixel cannot be estimated between the frames in the front and the back due to the contents of the video frames differing from each other one by one, in spite of a continuous frame line, etc.

Also, with the video signal processing apparatus, according to the embodiment 25, since it uses only one (1) piece of the input video frame, smaller than the conventional art, there can be obtained an effect of reducing the volume of the necessary video processing, comparing to the conventional art.

However, the structures shown in FIG. 52, for explaining the video signal processing apparatus according to the present embodiment, it is based on the structures shown in FIG. 45 for explaining the video signal processing apparatus according to the embodiment 21 of the present invention, but it should not be restricted to this, and since it is apparent that the similar effect(s) can be obtained with provision of the phase converter unit (4702) shown in FIG. 52, within the video signal processing apparatus according to other embodiment(s) of the present invention, therefore the explanation thereof will be omitted.

Embodiment 26

An embodiment 26 relates to a video signal processing method for achieving the processing, being equal to the video signal processing within the video signal processing apparatus according to the embodiment 21, by means of the controller unit cooperating with software. Since the video signal processing apparatus for conducting the video signal processing method of the present embodiment is the same to the video signal processing apparatus shown in FIG. 18, similar to the embodiment 2, but removing the input unit (1) and the buffer #2 (22) from the video processing apparatus shown in FIG. 18, therefore the explanation thereof will be omitted.

Figure 55:
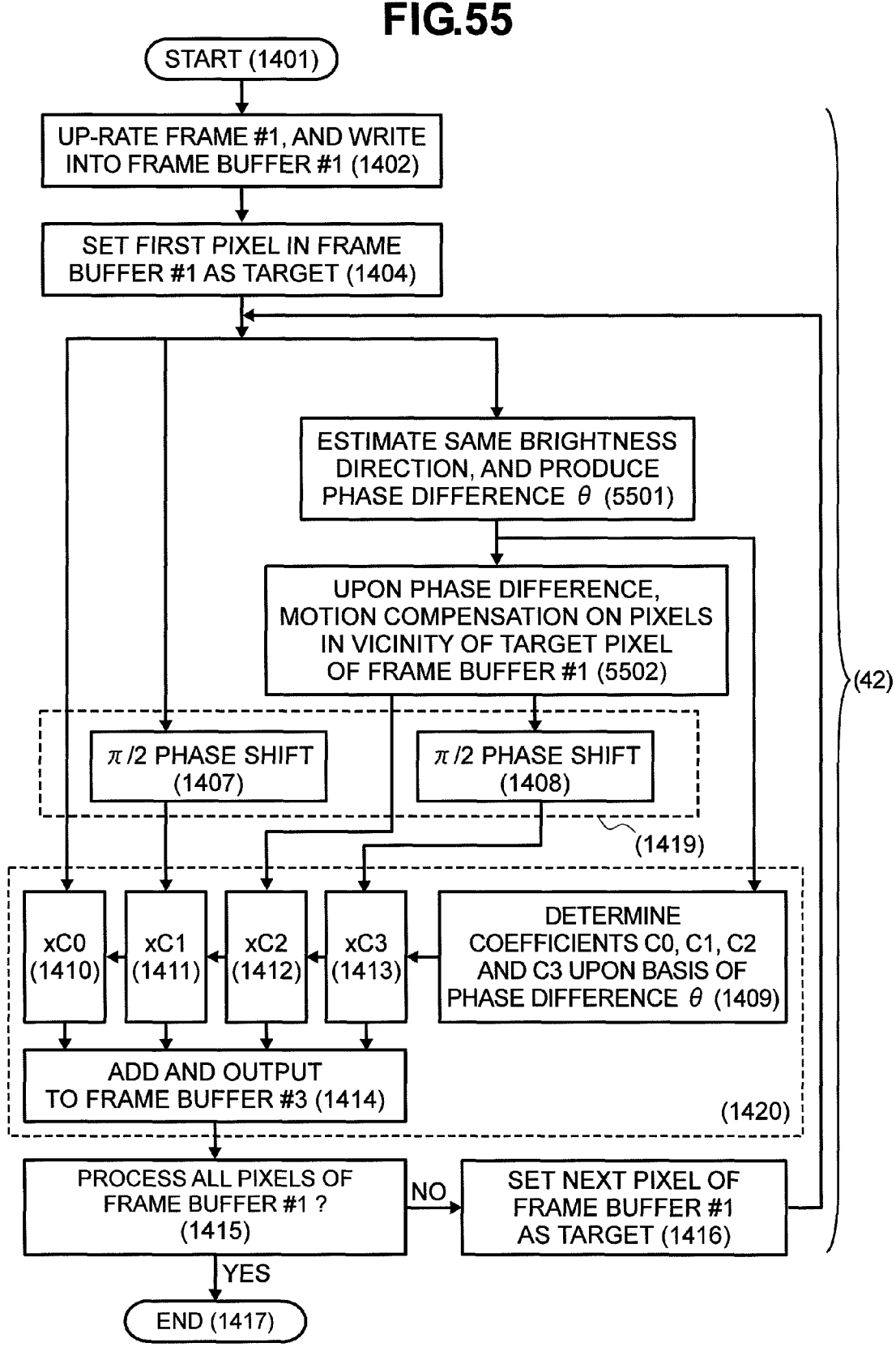
FIG. 55 is a view for explaining an embodiment 26 according to the present invention.

FIG. 55 shows an example of flowchart for explaining the operation of the present embodiment. The flowchart shown in this FIG. 55 can be obtained by adding new steps (5501) and (5502), while deleting the steps (1403), (1405), (1406) and (1418) from the flowchart shown in FIG. 14, according to the embodiment 2 of the present invention. Hereinafter, explanation will be made about the changes in the flowchart shown in FIG. 14.

First of all, within the video signal processing method according to the present embodiment, the process of the high resolution is achieved with using only the signal of frame #1, which is inputted from the input unit (1) of the video signal processing apparatus shown in FIG. 18. For this reason, since there is no necessity of the process steps relating to the frame #2 and the frame buffer #2 in the flowchart shown in FIG. 14, then the steps (1403), (1405), (1406) and (1418) are deleted.

Following to the above, in a step (5501) provided in the place of the step (1405), the same-brightness direction is estimated for the pixel of the process target, which is set in the step (1404), with the operation explained by referring to FIGS. 53A to 53E, so as to produce the phase difference θ (i.e., the horizontal phase difference θH (4502) or the vertical phase difference θV (4503)), and the process advances into a step (5502) and the step (1409). In the step (5502), considering the phase difference θ produced within the step (5501) to be the motion information, the motion compensation is conducted upon the pixels in the vicinity of the target pixel of the frame buffer #1. In this instance, with the pixels in the vicinity, it is enough to conduct the motion compensation upon the pixel data to be used in the process of π/2 phase shift in the step (1408), i.e., the pixel data within a region where the finite tap number can function. This operation of the motion compensation is same to the operation, which was explained by referring to FIGS. 5 and 6.

Other steps (1401), (1402), (1407) to (1417), and (1419) and (1420) are same to those of the embodiment 2 of the present invention, in the operations thereof, and therefore the explanation thereof will be omitted.

With conducting such the processes as was mentioned above, it is possible to output the high resolution signal to the frame buffer #3, with using the video data of the frame buffer #1. When applying this onto the moving picture, it is enough to repeat the processes, starting from the step (1401) and reaching to the step (1417), for each frame.

With the video signal processing method according to the embodiment 26, which was explained in the above, it is possible to produce the video high-resolved comparing to the input video, less in the aliasing component(s), with using one (1) piece of input video frame, smaller than that of the conventional art.

Also, the video signal processing method, according to the embodiment 26, brings about an effect of reducing the volume of the necessary video processing, comparing to the conventional art, since it uses only one (1) piece of the input video frame, smaller than the conventional art.

Embodiment 27

Figure 54:
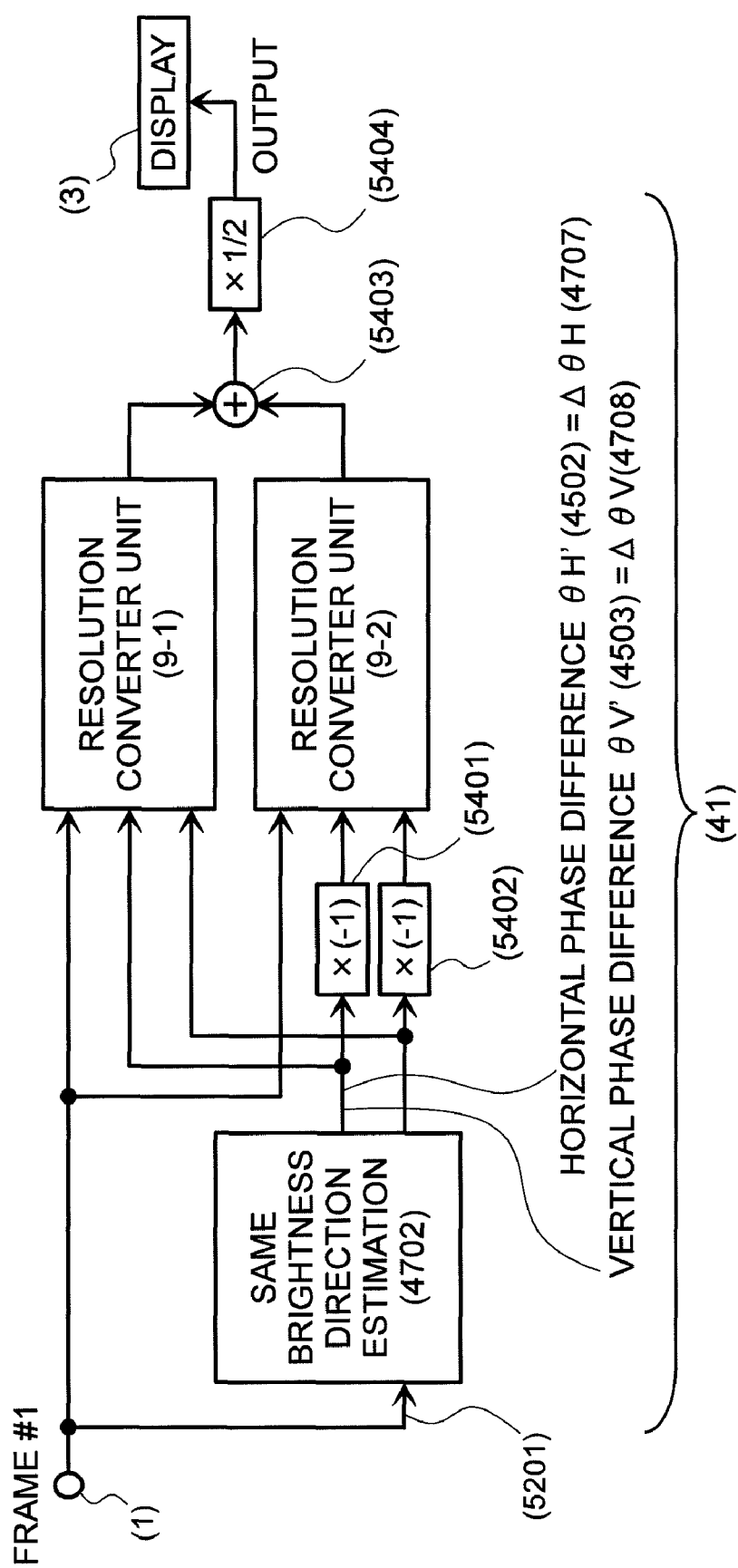
FIG. 54 is a view for explaining an embodiment 27 according to the present invention.

FIG. 54 shows the video signal processing apparatus according to an embodiment 27 of the present invention. The video signal processing apparatus, according to the present embodiment, comprises the input unit (1), into which the video frame, such as, the television broadcast signal, etc., for example, is inputted, the resolution converter unit (41) for conducting the 2-dimensional high resolution upon the frame inputted from this input unit (1), with combining the horizontal/vertical directions, and further the display unit (3) for displaying the video or picture upon basis of the frame, which is high resolved within this resolution converter unit (41).

Within the resolution converter unit (41) in FIG. 54, the horizontal phase difference $\theta H'$ (4502)=$\Delta\theta H$ (4707) and the vertical phase difference $\theta V'$ (4503)=$\Delta\theta V$ (4708) are produced within the same-brightness direction estimation unit (4702) mentioned above, and those phase difference information are inputted into the resolution converter unit (9-1), and at the same time, the polarity of each of the phase difference information is reversed with using the multiplexer (5401) or (5402) (i.e., multiply (−1)) to be outputted into the resolution converter unit (9-2). After conducting the process of high resolution within each of the resolution converter units (9-1) and (9-2), each output of the resolution converter units (9-1) and (9-2) is equalized with using the adder (5403) and the multiplexer (5404), to be outputted. However, since the operations and the structures of the same-brightness direction estimation unit (4702) and the resolution converter units (9-1) and (9-2) are same to those of the same-brightness direction estimation unit (4702) and the resolution converter units (9) according to the embodiment 25 mentioned above, therefore the explanation thereof will be omitted.

With the same-brightness direction estimation unit (4702), in FIG. 53B mentioned above is shown the condition, i.e., estimating the direction of the pixel (5305) in the vicinity thereof, such that the brightness is same to that of the pixel (5304) of the process target. On the other hand, as was shown in FIGS. 49A and 49B, if paying an attention onto the vicinity of the central pixel (4902) to be the process target, since the direction of the same brightness can be considered to be a straight line, within a minute area or region, this straight line may be extended, so as to be point-symmetric around the pixel (4902) of the process target.

Then, if reversing the values of the horizontal phase difference $\theta H'$ (4502) and the vertical phase difference $\theta V'$ (4503), which are produced within the same-brightness direction estimation unit (4702), in the polarity thereof, by means of the multiplexers (5401) and (5402), and inputting them into there solution converter unit (9-2), it is possible to obtain an output result, being similar to that obtained within the resolution converter unit (9-1), using the values of the horizontal phase difference $\theta H'$ (4502) and the vertical phase difference $\theta V'$ (4503) as they are.

Surpassingly, even in case where the values of the horizontal phase difference $\theta H'$ (4502) and the vertical phase difference $\theta V'$ (4503), which are produced within the same-brightness direction estimation unit (4702), contain errors and/or noises therein, since ill influences thereof appears within the resolution converter unit (9-1) and the resolution converter unit (9-2), in the reversed polarity thereof, therefore it is possible to reduce the errors and the noses by equalizing outputs of the both.

Further, with increasing a number of sets of the resolution converter units (9), it is also possible to equalize the output of each resolution converter unit (9), after conducting the high resolution process through conversion of the values of the horizontal phase difference $\theta H'$ (4502) and the vertical phase difference $\theta V'$ (4503) by various magnifying powers, but not restricting the magnifying power to (−1) within the multipliers (5401) and (5402). For example, the number of the resolution converter units (9) may be increased from two (2) sets shown in FIG. 54 to six (6) sets, and the magnifying powers for the horizontal phase difference $\theta H'$ (4502) and the vertical phase difference $\theta V'$ (4503) may be added with 0.5-time, (−0.5)-time, 1.5-time and (−1.5)-time, in addition to the two (2) kinds, 1-time and (−1)-time as shown in FIG. 54, i.e., preparing six (6) kinds in total, and wherein all the outputs of the resolution converter units (9) may be multiplied by ⅙ in total, for equalization, so as to provide an output signal. In this manner, with increasing the set number of the resolution converter units (9), it is possible to reduce the errors and/or the noises, which are generated within the same-brightness direction estimation unit (4702).

With the video signal processing apparatus according to the embodiment 27, which was explained in the above, in addition to the effect(s) of the video signal processing apparatus according to the embodiment 25, there can be obtained an effect of enabling to reduce the errors and/or the noises, which are generated within the same-brightness direction estimation unit (4702).

Embodiment 28

A video display apparatus according to the embodiment 28 of the present invention can be obtained, by replacing the video signal processor unit 3504 shown in FIG. 35 with the video signal processing apparatus, which is described in the embodiment 25 through 27, within the video display apparatus according to the embodiment 13. Other structures than that are similar to those of the video display apparatus according to the embodiment 13, and therefore the explanation thereof will be omitted.

Also, since the detailed operations of the video signal processor unit 3504 are as described in the embodiment 25 through 27, therefore the explanation thereof will be omitted.

The video signal processing method, according to the embodiment 28, brings about an effect of reducing the volume of the necessary video processing, much more, since it uses only one (1) piece of the input video frame, smaller than the conventional art.

Embodiment 29

The recording/reproducing apparatus according to an embodiment 29 is that obtained by replacing the video signal processor unit 3504 shown in FIG. 36 with the video signal processing apparatus, which is described in the embodiments 25 through 27, within the recording/reproducing apparatus according to the embodiment 17. Other structures than that are similar to the recording/reproducing apparatus according to the embodiment 17, and therefore the explanation thereof will be omitted.

Also, the detailed operations of the video signal processor unit 3504 are as was described in the embodiment 25 through 27, and therefore the explanation thereof will be omitted.

The video signal processing method, according to the embodiment 29, brings about an effect of reducing the volume of the necessary video processing, much more, since it uses only one (1) piece of the input video frame, smaller than the conventional art.

Embodiment 30

Figure 56:
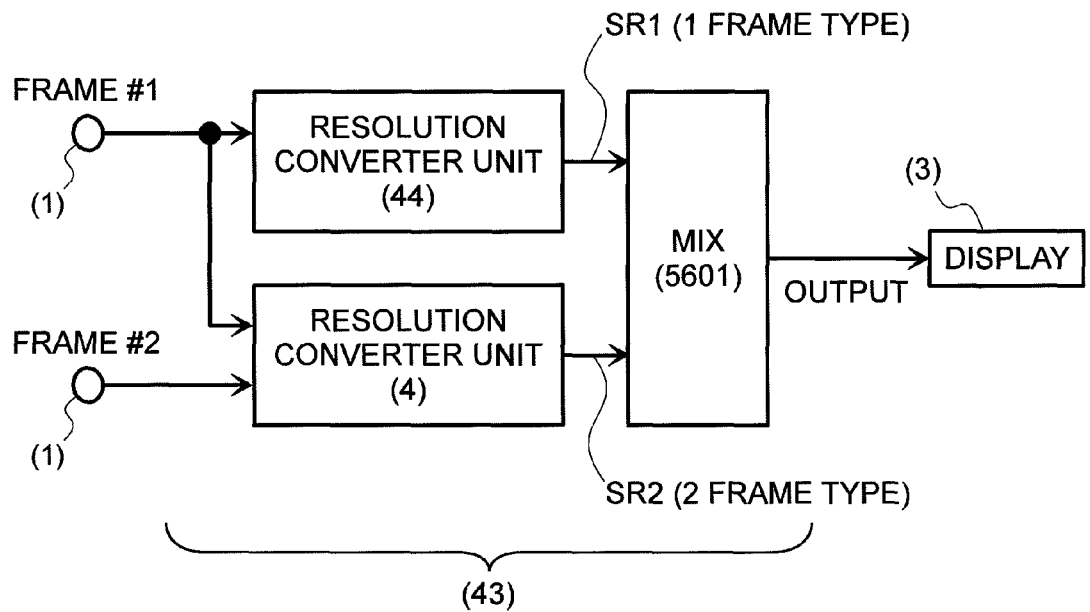
FIG. 56 is a view for explaining an embodiment 30 according to the present invention.

FIG. 56 shows the video signal processing apparatus according to an embodiment 30 of the present invention. The video signal processing apparatus, according to the present embodiment, comprises the input unit (1), into which a frame line of the moving pictures is inputted, such as, the television broadcast signal, etc., for example, the resolution converter unit (43) for conducting the 2-dimensional high resolution upon the frames inputted from this input unit (1), with combining the horizontal/vertical directions, and further the display unit (3) for displaying the video or picture upon basis of the frame, which is high resolved within this resolution converter unit (43).

The resolution converter unit (43), provided within the video signal processing apparatus according to the embodiment 30, comprises the resolution converter unit (44), similar to the video signal processing apparatus according to the embodiment 25 of the present invention, the resolution converter unit (4), similar to the video signal processing apparatus according to the embodiment 8 of the present invention, and a mixer unit (5601) for mixing the output signals of the both. The resolution converter unit (44) and the resolution converter unit (4) are same to those of the resolution converter unit shown in FIGS. 52 and 21, and therefore the explanation thereof will be omitted. Hereinafter, explanation will be made about the details of the operations and the structures of the resolution converter unit (43).

First of all, the resolution converter unit (44), similar to the video signal processing apparatus according to the embodiment 25 of the present invention, is able to achieve the high resolution, only with using the signal of frame #1, which is inputted from the input unit (1). On the other hand, as was mentioned previously, depending on the horizontal phase difference $\theta H'$ (4502)=$\Delta\theta H$ (4707) and the vertical phase difference $\theta V'$ (4503)=$\Delta\theta V$ (4708), which are produced within the same-brightness direction estimation unit (4702) in the resolution converter unit (44), it is impossible to obtain the coefficient C1 (and the coefficient C3) with using the equation shown in FIG. 9; therefore, there are cases where the effect of high resolution cannot be obtained. For example, the same-brightness direction is in the horizontal direction or the vertical direction, the effect of high resolution cannot be obtained.

Also, the resolution converter unit (4), similar to the video signal processing apparatus according to the embodiment 8 of the present invention, achieves the high resolution with using both signals of frame #1 and frame #2, which are inputted from the input unit (1). In this instance, as was mentioned previously, depending upon the values of the horizontal phase difference $\theta H$ (2102) and the vertical phase difference $\theta V$ (2103), which are produced within the position estimation unit (2101) in the resolution converter unit (4), it is impossible to obtain the coefficient C1 (and the coefficient C3) with using the equation shown in FIG. 9; therefore, there are cases where the effect of high resolution cannot be obtained. For example, the input video is the progressive scanning signal, it is impossible to obtain the effect of high resolution, in particular, in an area where the object is standing still, or an area where the movement of the object is just in a unit of pixels of an integer. Also, when the input video is the interlaced scanning signal, the effect of high resolution cannot be obtained, in an area where the signal value does not change between the fields, for example.

Accordingly, within the resolution converter unit (43) provided within the video signal processing apparatus according to the embodiment 30, the effect of high resolution is increased or enhanced by combining or mixing the output signal (SR1 (1 frame type)) of the resolution converter unit (44) and the output signal (SR2 (2 frame type)) of the resolution converter unit (4) within the mixer unit (5601).

Figure 57:
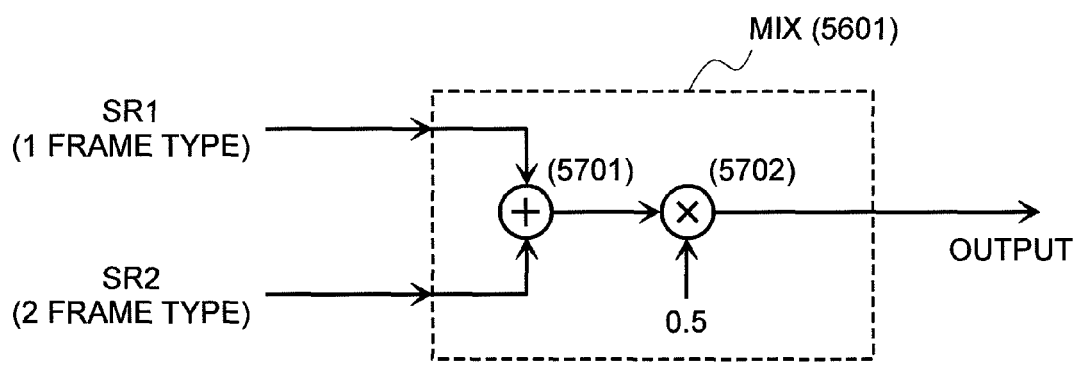
FIG. 57 is a view for explaining the embodiment 30 according to the present invention.

FIG. 57 shows therein an example of a first structure of the mixer (5601). In the same figure, with using an adder (5701) and a multiplier (5702), an averaged value for each of the signals, SR1 (1 frame type) and SR2 (2 frame type) which are inputted into the mixer (5601), and it is outputted. With the structure shown in FIG. 57, the effect of increasing the each resolution of SR1 (1 frame type) and SR2 (2 frame type) goes down to ½, respectively, but since the mixer (5601) is the most simple structure, and therefore it is possible to achieve a low cost.

Figure 58:
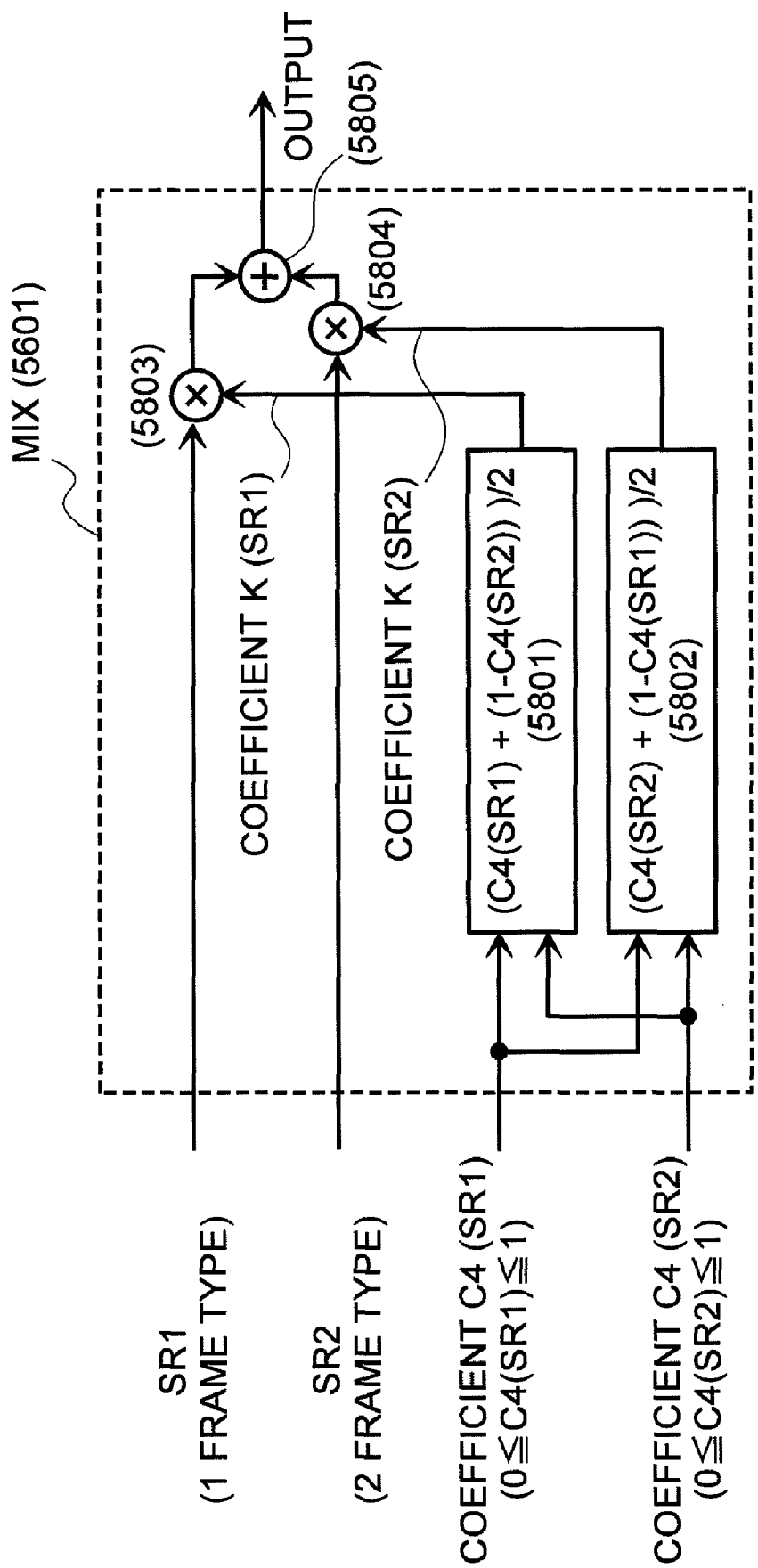
FIG. 58 is a view for explaining the embodiment 30 according to the present invention.

FIG. 58 shows therein an example of a second structure of the mixer (5601). In the same figure, a coefficient K(SR1) and a coefficient K(SR2) are multiplied onto the signals, SR1 (1 frame type) and SR2 (2 frame type) which are inputted into the mixer (5601), with using multiplier (5803) and a multiplier (5804), and both are added within an adder (5805), thereby outputting. The coefficient K(SR1) and the coefficient K(SR2) are produced within coefficient determining units (5801) and (5802), respectively. Hereinafter, explanation will be given about the operations of those coefficient determining units (5801) and (5802).

As was explained in the operation of the embodiment 7 of the present invention, the aliasing component removal units (2108) and (2109) shown in FIG. 21 conduct the operation for removing the aliasing component(s), with generating the coefficients C0 to C3 shown in FIG. 9 within the coefficient determining unit (109) shown in FIG. 1, upon basis of the horizontal phase difference $\theta H$ (2102) and the vertical phase difference $\theta V$ (2103) shown in the same figure. In this instance, for preventing the coefficient C1 or C3 from becoming indefinite when the phase difference $\theta H$ (2102) or $\theta V$ (2103) is zero (0), or from becoming weak to the noises, etc., because the coefficient C1 or C3 comes to be large as the phase difference $\theta H$ (2102) or $\theta V$ (2103) comes close to zero (0), it is preferable to conduct an auxiliary pixel interpolation, as the structures shown in FIG. 11, by introducing the coefficient C4 ($0 \leq C4 \leq 1$) shown in FIG. 13. On the contrary thereto, when the value of C4 is 0.0, there can be obtained the effect of improving the resolution, but the effect of improving the resolution comes to be small as the value of the coefficient C4 approaches to zero (0).

With using this characteristic, according to the embodiment 7 of the present invention, the coefficient K (horizontal) and coefficient K (vertical) are determined with using the values of the coefficients C4, respectively, in the horizontal/vertical directions, in such a manner that SR (vertical) of the vertical resolution conversion result is strongly reflected when the horizontal phase difference θH (2102) is in the vicinity of zero (0) (i.e., the coefficient C4 (horizontal) is in the vicinity of 1.0), on the other hand, SR (horizontal) of the horizontal resolution conversion result is strongly reflected, when the vertical phase difference θV (2103) is in the vicinity of zero (0) (i.e., the coefficient C4 (vertical) is in the vicinity of 1.0). For the purpose of achieving this operation, within the coefficient determining unit (2301) shown in FIG. 23, K (horizontal) is determined by conducting the operation, i.e., K (horizontal)=C4 (horizontal)+(1−C4 (vertical))/2, and within the coefficient determining unit (2303), K (vertical) is determined by conducting the operation, i.e., K (vertical)=C4 (vertical)+(1−C4 (horizontal))/2.

Similar to this, within the present embodiment, the coefficients C4 (horizontal) and C4 (vertical) are produced upon basis of the phase difference θH' (4502) and the phase difference θV' (4503), which are used within the resolution converter unit (44), and an averaged value of those is produced as C4 (SR1). Also, the coefficients C4 (horizontal) and C4 (vertical) are produced upon basis of the phase difference θH (2102) and the phase difference θV (2103), which are used within the resolution converter unit (4), and an averaged value of those is produced as C4 (SR2). Namely, the coefficients C4 (SR1) and C4 (SR2) can be used, as an index for indicating the degree of the effect of high resolution, within the resolution converter unit (4) and the resolution converter unit (44), respectively.

Then, in the mixer (5601) shown in FIG. 58, K (SR1) is determined within the coefficient determining units (5801), by conducting the operation, i.e., K(SR1)=C4(SR1)+(1−C4 (SR2)/2, and K (SR2) is determined within coefficient determining units (5802), by conducting the operation, i.e., K(SR2)=C4(SR2)+(1−C4(SR1)/2, and thereafter, upon basis of the coefficients K(RS1) and K(RS2), the output (SR1) of the resolution converter unit (44) and the output (SR2) of the resolution converter unit (4) are mixed, by weighting and adding, to be outputted. Then, it is possible to increase the ratio of being occupied by the signal, upon which the effect of the resolution converter unit (4) and the resolution converter unit (44) is large, within the output signal, and thereby enabling to increase the effect of high resolution.

With the video signal processing apparatus according to the embodiment 30, which was explained in the above, in addition to the effect(s) of the video signal processing apparatus according to the embodiment 25 and the embodiment 8, it is possible to achieve the high resolution, even in the case of the same-brightness direction of the object and the movement of the object, which cannot be used for the high resolution within the video signal processing apparatus according to the embodiment 25 and the embodiment 8, and thereby bringing about an effect that the effect of increasing the resolution can be made much larger.

However, the structures shown in FIG. 56, for explaining the video signal processing apparatus according to the present embodiment, it is based on the resolution converter unit (44), similar to the video signal processing apparatus according to the embodiment 25 of the present invention, and the resolution converter unit (4), similar to the video signal processing apparatus according to the embodiment 8 of the present invention, but it should not be restricted to this, and since it is apparent that the similar effect(s) can be obtained with provision of the mixer (5601) shown in FIG. 56, for the video signal processing apparatus of 1 frame input type and the video signal processing apparatus of 2 frame input type according to other embodiment(s), therefore the explanation thereof will be omitted.

Embodiment 31

The video display apparatus according to an embodiment 31 is that obtained by replacing the video signal processor unit 3504 shown in FIG. 35 with the video signal processing apparatus, which is described in the embodiment 30, within the video displaying apparatus according to the embodiment 13. Other structures than that are similar to the recording/reproducing apparatus according to the embodiment 13, and therefore the explanation thereof will be omitted.

Also, the detailed operations of the video signal processor unit 3504 are as was described in the embodiment 30, and therefore the explanation thereof will be omitted.

With the video displaying apparatus according to the embodiment 31, in addition to the effect(s) of the video displaying apparatus according to the embodiment 28 and the embodiment 13, it is possible to achieve the high resolution, even in the case of the same-brightness direction of the object and the movement of the object, which cannot be used for the high resolution within the video signal processing apparatus according to the embodiment 25 and the embodiment 8, and thereby bringing about an effect that the effect of increasing the resolution can be made much larger.

Embodiment 32

The recording/reproducing apparatus according to an embodiment 32 is that obtained by replacing the video signal processor unit 3504 shown in FIG. 36 with the video signal processing apparatus, which is described in the embodiment 30, within the recording/reproducing apparatus according to the embodiment 17. Other structures than that are similar to the recording/reproducing apparatus according to the embodiment 13, and therefore the explanation thereof will be omitted.

Also, the detailed operations of the video signal processor unit 3504 are as was described in the embodiment 30, and therefore the explanation thereof will be omitted.

With the recording/reproducing according to the embodiment 32, in addition to the effect(s) of the recording/reproducing apparatus according to the embodiment 29 and the embodiment 17, it is possible to achieve the high resolution, even in the case of the same-brightness direction of the object and the movement of the object, which cannot be used for the high resolution within the video signal processing apparatus according to the embodiment 29 and the embodiment 17, and thereby bringing about an effect that the effect of increasing the resolution can be made much larger.

Further, each embodiment of the present invention may be applied into, other than the apparatuses explained in the embodiments given in the above, for example, a DVD player, a magnetic disc player, or a semiconductor memory player, in the similar manner. Also, it may be applied into a mobile video display terminal (for example, a portable telephone) for receiving one-segment broadcasting, for example.

Also, as the video frame may be applied the video frame of the signal other than the television broadcasting signal. Also, a streaming video transmitted through the Internet may be applied, for example, or the video frame reproduced from the DVD player or a HDD player.

Also, each embodiment mentioned above was explained by listing up the high resolution thereof, by a unit of frame, for example. However, the target of the high resolution should not always be the frame as a whole. For example, the high resolution may be made on the target, such as, an input video or a part of frame of the input video. Thus, with conducting the video processing of one of the embodiments of the present invention mentioned above, upon the target, i.e., a plural frames of a part of frames of the input video, it is possible to obtain an enlarged picture of high picture quality of the input video or the part of the input video. This can be applied into, such as, an enlarging display of a part of the video, for example.

Also, each of the embodiments of the present invention can be applied, not only onto the brightness signal (Y), but also onto the color signal, such as, red (R), green (G) and blue (B), etc., and also the color-difference signal, such as, Cb, Cr, Pb, Pr, U and V, which are converted from the RGB signal through a general process of color-space conversion, for example. In this instance, it is enough to replace "brightness" in the above explanation, with "color" or "color-difference".

Further, if combining any one of the embodiments mentioned above, it is also possible to obtain another embodiment of the present invention.

With each of the embodiments of the present invention mentioned above, it is possible to conduct the process, preferably, for converting the video of low resolution into the enlarged video, thereby obtaining the high-resolution video of high picture quality. Thus, it is possible to obtain the high resolution of the video signal, preferably.

Also, with each of the embodiments of the present invention mentioned above, it is possible to reduce the frame number of the video necessary for obtaining the high-resolution picture of high picture quality.

What is claimed is:

1. A video signal processing apparatus, comprising:
an input unit, into which a video frame is inputted; and
a resolution converter unit, which is configured to obtain an output video frame by increasing a number of pixels building up said input video frame,
wherein said resolution converter unit has a same-brightness direction estimation unit, which is configured to produce a sampling phase difference for each video data, by estimating a same-brightness direction for said each video data on said input video frame, and said resolution converter unit conducts a high resolution process of video with using the sampling phase difference, which is produced by said same-brightness direction estimation unit.

2. The video signal processing apparatus, as described in claim 1, wherein
said resolution converter unit comprises:
a motion compensation/up-rate unit, which is configured to compensate video data of each input video frame with using said sampling phase difference after the conversion and also to increase a number of pixels;
a phase shifter unit, which is configured to shift the video data of each video frame in phase thereof, the pixel number of which is increased by a predetermined amount;
a coefficient determining unit, which is configured to determine a coefficient with using information of said sampling phase difference; and
an aliasing component removal unit, which is configured to remove an aliasing component by multiplying said coefficient upon each video data before and after said phase shifting, thereby providing an output.

3. A video signal processing method, comprising the following steps of:
an inputting step for inputting one (1) piece of video frame; and
a resolution converting step for obtaining an output video frame by increasing a number of pixels building up said input video frame,
wherein, within said resolution converting step, a same-brightness direction estimation is conducted for producing a sampling phase difference of said each video data by estimating a same-brightness direction for each video data on said input video frame, and thereby conduction a high resolution process with using the sampling phase difference produced by said same-brightness direction estimation.

4. The video signal processing method, as described in claim 3, wherein
the followings are conducted in said resolution converting step:
conducting the same-brightness direction estimation for producing the sampling phase difference of said each video data by estimating the same-brightness direction, for each video data on said input video frame;
conducting a motion compensation/up-rate process for compensating movement of the video data of the each input video frame with using information of the sampling phase difference after said conversion, as well as, increasing the pixel number;
conducting a phase shifting process for shifting the video data of each video frame in phase thereof, the pixel number of which is increased, by a predetermined amount;
determining a coefficient with using the information of said sampling phase difference; and
conducting an aliasing component removal process for removing an aliasing component by multiplying said coefficient upon each video data before and after said phase shifting, and thereby providing an output.

5. A video display apparatus, comprising:
an input unit, into which a video frame is inputted;
a resolution converter unit, which is configured to increase a number of pixels building up said input video frame, and thereby to obtain an output video frame; and
a display unit, which is configured to display a video, which is produced by said resolution converter unit,
wherein said resolution converter unit has a same-brightness direction estimation unit, which is configured to produce a sampling phase difference of said each video data by estimating a same-brightness direction for each video data on said input video frame, and
wherein said resolution converter unit conducts a high resolution process of video with using the sampling phase difference, which is produced by said same-brightness direction estimation unit.

6. The video display apparatus, as described in claim 5, wherein said resolution converter unit comprises:
a motion compensation/up-rate unit, which is configured to compensate movement of the video data of each input video frame with using information of the sampling phase difference before and after said conversion, as well, as to increase the pixel number;
a phase shifter unit, which is configured to shift the video data of each video frame in phase thereof, which is increased in said pixel number thereof, by a predetermined amount;
a coefficient determining unit, which is configured to determined a coefficient with using the information of the sampling phase difference; and
an aliasing component removal unit, which is configured to remove an aliasing component by multiplying said coefficient upon each video data before and after said phase shifting, thereby to provide an output.

7. A video signal processing apparatus, comprising:
- an input unit, into which a plural number of video frames are inputted;
- a resolution converter unit, which is configured to obtain an output video frame with increasing the number of pixels building up the video frame, by composing said plural number of video frames inputted,
- wherein said resolution converter unit comprises:
- a position estimation unit, which is configured to estimate a sampling phase difference with using video data on said input video frame as a reference and each video data corresponding thereto on other input video frame;
- a phase shifter unit, which is configured to convert said sampling phase difference, so as to output a sampling phase difference after conversion;
- a motion compensation/up-rate unit, which is configured to compensate movement of the video data of each input video frame with using information of said sampling phase difference before and after the conversion, as well as, to increase the pixel number thereof;
- a phase shifter unit, which is configured to shift the video data of each video data in phase thereof, said pixel number of which is increased; and
- an aliasing component removal unit, which is configured to remove an aliasing component by multiplying and adding a coefficient determined with using the information of said sampling phase difference upon each video data before and after said phase shifting.

8. The video signal processing apparatus, as described in claim 7, wherein
- said phase converter unit comprises:
- a same-brightness direction estimation unit, which is configured to estimate a process target pixel within said input video frame and a same-brightness direction, to as to output a phase correction value upon basis of a result of said estimation,
- wherein said phase correction value is added to said sampling phase difference, thereby obtaining a sampling phase difference after said conversion.

9. A video signal processing method, comprising the following steps of:
- an inputting step for inputting a plural number of video frames;
- a resolution converting step for obtaining an output video frame with increasing the number of pixels building up the video frame, by composing said plural number of video frames inputted,
- wherein said resolution converting step conducts the following processes:
- a position estimation process for estimating a sampling phase difference with using video data on said input video frame as a reference and each video data corresponding thereto on other input video frame;
- a phase shifting process for converting said sampling phase difference, so as to output a sampling phase difference after conversion;
- a motion compensation/up-rate process for compensating movement of the video data of each input video frame with using information of said sampling phase difference before and after the conversion, as well as, to increase the pixel number thereof;
- a phase shifting process for shifting the video data of each video data in phase thereof, said pixel number of which is increased; and
- an aliasing component removing process for removing an aliasing component by multiplying and adding a coefficient determined with using the information of said sampling phase difference upon each video data before and after said phase shifting.

10. The video signal processing method, as described in claim 9, wherein
- said phase converting step includes the following steps of:
- a same-brightness direction estimating step for estimating a process target pixel within said input video frame and a same-brightness direction, to as to output a phase correction value upon basis of a result of said estimation; and
- a step for providing a sampling phase difference after said conversion by adding said phase correction value onto said sampling phase difference.

11. A video display apparatus, comprising:
- an input unit, into which a plural number of video frames are inputted;
- a resolution converter unit, which is configured to increase a number of pixels building up said input video frame, by composing said plural number of video frames inputted, and thereby obtaining an output video frame; and
- a display unit, which is configured to display a video, which is produced by said resolution converter unit,
- wherein said resolution converter comprises:
- a position estimation unit, which is configured to estimate a sampling phase difference with using video data on said input video frame as a reference and each video data corresponding thereto on other input video frame;
- a phase shifter unit, which is configured to convert said sampling phase difference, so as to output a sampling phase difference after conversion;
- a motion compensation/up-rate unit, which is configured to compensate movement of the video data of each input video frame with using information of said sampling phase difference before and after the conversion, as well as, to increase the pixel number thereof;
- a phase shifter unit, which is configured to shift the video data of each video data in phase thereof, said pixel number of which is increased; and
- an aliasing component removal unit, which is configured to remove an aliasing component by multiplying and adding a coefficient determined with using the information of said sampling phase difference upon each video data before and after said phase shifting.

12. The video signal processing apparatus, as described in claim 11, wherein
- said phase converter unit comprises:
- a same-brightness direction estimation unit, which is configured to estimate a process target pixel within said input video frame and a same-brightness direction, to as to output a phase correction value upon basis of a result of said estimation,
- wherein said phase correction value is added to said sampling phase difference, thereby obtaining a sampling phase difference after said conversion.

* * * * *